(12) United States Patent
Evans

(10) Patent No.: US 8,452,776 B2
(45) Date of Patent: *May 28, 2013

(54) SPATIAL DATA PORTAL

(75) Inventor: Scott A. Evans, Lenexa, KS (US)

(73) Assignee: Celeritasworks, LLC, Overland Park, KS (US)

( * ) Notice: Subject to any disclaimer, the term of this patent is extended or adjusted under 35 U.S.C. 154(b) by 1039 days.

This patent is subject to a terminal disclaimer.

(21) Appl. No.: 10/439,167

(22) Filed: May 15, 2003

(65) Prior Publication Data

US 2004/0030706 A1 Feb. 12, 2004

Related U.S. Application Data

(63) Continuation-in-part of application No. 10/004,346, filed on Nov. 1, 2001, which is a continuation-in-part of application No. 09/470,553, filed on Dec. 22, 1999, now Pat. No. 6,343,290.

(60) Provisional application No. 60/381,045, filed on May 15, 2002.

(51) Int. Cl.
*H04Q 7/20* (2006.01)
*G06F 17/30* (2006.01)

(52) U.S. Cl.
USPC ........ 707/743; 455/556; 455/456.3; 455/457; 455/414.3; 707/724; 707/729; 707/731; 707/736

(58) Field of Classification Search
USPC ................... 455/446, 416, 449, 456.1, 456.6, 455/556.1, 404.1, 566; 707/10, 101, 104.1, 707/3; 701/200, 208; 709/204, 217, 203, 709/219, 218
See application file for complete search history.

(56) References Cited

U.S. PATENT DOCUMENTS

| 4,932,022 A | 6/1990 | Keeney et al. |
| 5,032,989 A | 7/1991 | Tornetta |

(Continued)

FOREIGN PATENT DOCUMENTS

| EP | 0 412 692 | 2/1991 |
| EP | 0 614 151 | 9/1994 |

(Continued)

OTHER PUBLICATIONS

Hildebrandt, John and Robert Hollamby, Dynamic Geospatial Image Mosaics Using JAVA, JAI, RMI and CORBA, Information Technology Division. Defence Science and Technology Organisation, DSTO C3 Research Centre, Fernhill Park, Department of Defence, Canberra Act 2600 Australia, 1999.

(Continued)

*Primary Examiner* — Dai A Phuong
*Assistant Examiner* — Huy Q Phan
(74) *Attorney, Agent, or Firm* — Konrad Raynes Davda & Victor LLP; Janaki K. Davda

(57) ABSTRACT

A system and method linking one or more disparate datasets with one or more spatial layers to create linked datasets. One or more data attributes common to the dataset and the spatial layer are identified, and the linkage is defined between the dataset and the spatial layer. The spatial layer and the linked data set then may be queried using a single input query. Features from the spatial layer and features from the linked dataset that match the query are generated for display.

52 Claims, 53 Drawing Sheets

U.S. PATENT DOCUMENTS

| | | | |
|---|---|---|---|
| 5,095,500 A | | 3/1992 | Tayloe et al. |
| 5,193,185 A | * | 3/1993 | Lanter .......................... 707/101 |
| 5,285,494 A | * | 2/1994 | Sprecher et al. .............. 455/423 |
| 5,418,906 A | * | 5/1995 | Berger et al. ...................... 702/5 |
| 5,451,839 A | | 9/1995 | Rappaport et al. |
| 5,488,715 A | | 1/1996 | Wainwright |
| 5,490,285 A | | 2/1996 | Ahlenius et al. |
| 5,543,788 A | * | 8/1996 | Mikuni ......................... 340/990 |
| 5,610,839 A | | 3/1997 | Karolak et al. |
| 5,659,731 A | * | 8/1997 | Gustafson ........................ 707/4 |
| 5,712,899 A | | 1/1998 | Pace, II |
| 5,726,979 A | | 3/1998 | Henderson et al. |
| 5,742,762 A | | 4/1998 | Scholl et al. |
| 5,761,429 A | | 6/1998 | Thompson |
| 5,774,689 A | | 6/1998 | Curtis et al. |
| 5,796,951 A | | 8/1998 | Hamner et al. |
| 5,799,154 A | | 8/1998 | Kuriyan |
| 5,812,750 A | | 9/1998 | Dev et al. |
| 5,848,373 A | | 12/1998 | DeLorme et al. |
| 5,870,558 A | | 2/1999 | Branton, Jr. et al. |
| 5,884,147 A | | 3/1999 | Reudink et al. |
| 5,897,619 A | | 4/1999 | Hargrove, Jr. et al. |
| 5,909,217 A | | 6/1999 | Bereiter |
| 5,920,257 A | | 7/1999 | Commerford |
| 5,930,474 A | | 7/1999 | Dunworth et al. |
| 5,946,687 A | | 8/1999 | Gehani et al. |
| 5,956,573 A | | 9/1999 | Dinan et al. |
| 5,960,439 A | | 9/1999 | Hamner et al. |
| 5,966,135 A | | 10/1999 | Roy et al. |
| 5,978,804 A | * | 11/1999 | Dietzman ........................ 707/10 |
| 5,980,096 A | * | 11/1999 | Thalhammer-Reyero .... 707/100 |
| 5,990,886 A | | 11/1999 | Serdy et al. |
| 5,991,690 A | | 11/1999 | Murphy |
| 6,006,161 A | | 12/1999 | Katou |
| 6,049,827 A | | 4/2000 | Sugauchi et al. |
| 6,064,393 A | * | 5/2000 | Lengyel et al. ................ 345/427 |
| 6,091,956 A | | 7/2000 | Hollenberg |
| 6,119,125 A | * | 9/2000 | Gloudeman et al. ....... 707/103 R |
| 6,151,309 A | | 11/2000 | Busuioc et al. |
| 6,161,105 A | | 12/2000 | Keighan et al. |
| 6,202,023 B1 | | 3/2001 | Hancock et al. |
| 6,247,019 B1 | * | 6/2001 | Davies ...................... 707/103 R |
| 6,266,529 B1 | | 7/2001 | Chheda |
| 6,266,615 B1 | | 7/2001 | Jin |
| 6,278,994 B1 | | 8/2001 | Fuh et al. |
| 6,282,547 B1 | | 8/2001 | Hirsch |
| 6,304,754 B1 | | 10/2001 | DeSantis et al. |
| 6,307,573 B1 | * | 10/2001 | Barros .......................... 715/764 |
| 6,330,008 B1 | | 12/2001 | Razdow et al. |
| 6,343,290 B1 | | 1/2002 | Cossins et al. |
| 6,408,300 B1 | * | 6/2002 | Bergman et al. .............. 707/101 |
| 6,429,868 B1 | | 8/2002 | Dehner, Jr. et al. |
| 6,463,374 B1 | * | 10/2002 | Keller et al. ..................... 701/50 |
| 6,490,620 B1 | | 12/2002 | Ditmer et al. |
| 6,505,205 B1 | * | 1/2003 | Kothuri et al. ................ 707/100 |
| 6,587,787 B1 | | 7/2003 | Yokota |
| 6,625,132 B1 | | 9/2003 | Boettger et al. |
| 6,681,231 B1 | | 1/2004 | Burnett |
| 6,684,219 B1 | | 1/2004 | Shaw et al. |
| 6,873,998 B1 | * | 3/2005 | Dorum et al. .............. 707/104.1 |
| 6,892,132 B2 | * | 5/2005 | Nagamune ................... 701/208 |
| 6,944,614 B1 | * | 9/2005 | Ramasamy et al. .................. 1/1 |
| 6,956,573 B1 | * | 10/2005 | Bergen et al. ................. 345/473 |
| 6,985,929 B1 | * | 1/2006 | Wilson et al. ................. 709/217 |
| 7,047,103 B2 | * | 5/2006 | Hornbaker et al. ........... 700/225 |
| 7,107,286 B2 | | 9/2006 | Burnett |
| 7,117,208 B2 | * | 10/2006 | Tamayo et al. .................... 707/6 |
| 7,142,820 B1 | | 11/2006 | Rajala |
| 7,243,054 B2 | | 7/2007 | Rappaport et al. |
| 7,302,430 B1 | * | 11/2007 | Nagda et al. ...................... 707/9 |
| 7,324,953 B1 | | 1/2008 | Murphy |
| 7,447,509 B2 | | 11/2008 | Cossins et al. |
| 7,469,247 B2 | | 12/2008 | Cossins et al. |
| 8,224,867 B2 | | 7/2012 | Evans |
| 2001/0051503 A1 | * | 12/2001 | Lush ............................ 455/2.01 |
| 2001/0052006 A1 | | 12/2001 | Barker et al. |
| 2002/0080181 A1 | | 6/2002 | Razdow et al. |
| 2002/0091758 A1 | | 7/2002 | Singh et al. |
| 2002/0147729 A1 | * | 10/2002 | Balfour ...................... 707/104.1 |
| 2002/0152303 A1 | | 10/2002 | Dispensa |
| 2003/0004995 A1 | * | 1/2003 | Novaes .......................... 707/513 |
| 2003/0005038 A1 | * | 1/2003 | Codella et al. ................ 709/203 |
| 2003/0005053 A1 | * | 1/2003 | Novaes .......................... 709/204 |
| 2003/0033155 A1 | * | 2/2003 | Peerson et al. ..................... 705/1 |
| 2004/0075697 A1 | | 4/2004 | Maudlin |
| 2004/0117358 A1 | * | 6/2004 | von Kaenel et al. .............. 707/3 |
| 2004/0260720 A1 | | 12/2004 | Cossins et al. |
| 2005/0004944 A1 | | 1/2005 | Cossins et al. |
| 2005/0165788 A1 | * | 7/2005 | Yang et al. ...................... 707/10 |
| 2009/0055719 A1 | | 2/2009 | Cossins et al. |

FOREIGN PATENT DOCUMENTS

| | | |
|---|---|---|
| WO | 99/15950 | 4/1999 |
| WO | 99/15976 | 4/1999 |
| WO | 99/16207 | 4/1999 |
| WO | 99/20034 | 4/1999 |
| WO | 99/20034-2 | 4/1999 |

OTHER PUBLICATIONS

Nelson M. Mattos, et al., Integrating Spatial Data with Business Data, DB2 Magazine, Quarter 1, 1999, 7 pages.

*CeleritasWorks, LLC*v. *WatchMark, Corp.*, d/b/a WatchMark-Comnitel, Complaint filed Feb. 3, 2004, in the United States District Court for the District of Kansas, 3 pages.

*CeleritasWorks, LLC*v. *WatchMark, Corp.*, d/b/a WatchMark-Comnitel, Answer, Affirmative Defenses and Counter Claims filed Jul. 21, 2004, in the United States District Court for the District of Kansas, 7 pages.

*CeleritasWorks, LLC*v. *WatchMark, Corp.*, d/b/a WatchMark-Comnitel, Answer to Defendant WatchMark Corp.'s Counterclaim filed Aug. 10, 2004, in the United States District Court for the District of Kansas, 3 pages.

*CeleritasWorks, LLC*v. *WatchMark, Corp.*, d/b/a WatchMark-Comnitel, Stipulation of Dismissal with Prejudice and Without Costs, Dec. 27, 2004, filed in the United States District Court for the District of Kansas, 2 pages.

International Preliminary Examination Report, dated Feb. 10, 2002, PCT/US00/34500, Geographic Network Management System, 3 pages.

International Preliminary Examination Report, dated Nov. 18, 2003, PCT/US02/34610, Geographic Management System, 10 pages.

International Search Report, dated Jul. 26, 2002, PCT/US00/34500, Geographic Network Management System, 13 pages.

International Search Report, dated Dec. 10, 2002, PCT/US02/34610, Geographic Management System, 5 pages.

Official Communication from European Patent Office, dated May 7, 2006, Application No. 03 000689.4, Geographic Network Management System, 3 pages.

Official Communication from European Patent Office, dated May 7, 2006, Application No. 00 992 114.9, Geographic Network Management System, 6 pages.

Official Communication from European Patent Office, dated Feb. 27, 2008, Application No. 00 992 144.9, Geographic Network Management Systems, 8 pages.

Stojanovic et al., "GeoTT Geographic Information System Support for Telecommunication Network Planning and Design"IEEE, Oct. 13, 1999, pp. 548-551.

"US West ISG Launches WatchMark, a New Wireless Network Management Suite," Press Release, US West International Systems Group, United States of America, Feb. 23, 1998, pp. 1-5.

Written Opinion, dated Jan. 8, 2002, PCT/US00/34500, Geographic Network Management System, 2 pages.

* cited by examiner

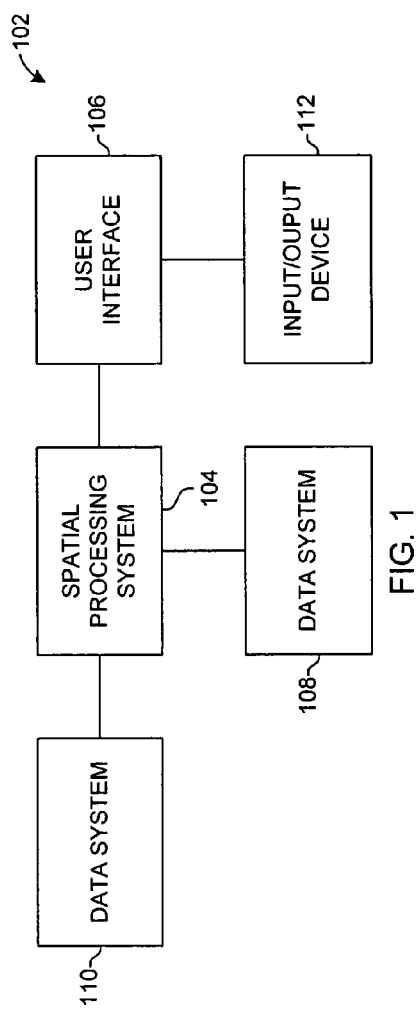
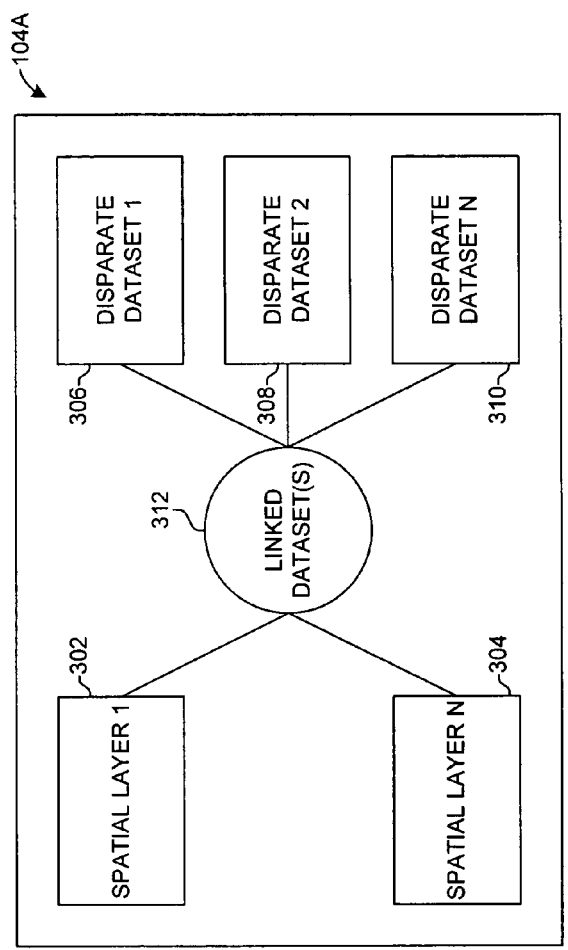

FIG. 26

SPATIAL DATA PORTAL

RELATED APPLICATIONS

The present application takes priority to U.S. Patent Application Ser. No. 60/381,045, entitled Spatial Data Portal, filed May 15, 2002, and is a Continuation-in-Part of U.S. patent application Ser. No. 10,004,346, entitled Geographic Management System, filed Nov. 1, 2001, which is a Continuation-in-Part of U.S. patent application Ser. No. 09/470,553, now U.S. Pat. No. 6,343,290, entitled Geographic Network Management System, filed Dec. 22, 1999, all of which are incorporated fully herein by reference.

FEDERALLY SPONSORED RESEARCH OR DEVELOPMENT

Not Applicable

COMPACT DISK APPENDIX

Not Applicable

FIELD OF THE INVENTION

The present invention relates to the field of spatially linking one or more disparate datasets.

BACKGROUND OF THE INVENTION

A dataset is a collection of data that relates to a topic or thing. Generally, the dataset has data attributes that describe the collection of data. The data attributes are related to each other and related to the topic or thing of the dataset. For example, a business dataset for a set of oil wells may contain a set of attributes for a lease for land on which the oil wells are located or for oil well production statistics.

Geographic information system (GIS) products provide geographic information, such as maps or other geographic data, based on some input. With most GIS products, if you want to relate data from multiple disparate datasets to geographic data you must permanently merge the data from the disparate datasets with the geographic data. However, this requires that the data be replicated. In some cases, the data may require conversion prior to replication.

Other GIS products provide the ability to join or associate one or more datasets with geographic data, but only as long as the datasets are in the same database in which the geographic data is housed. Thus, new systems and methods are needed to enable linking different datasets with spatial data without replicating the datasets and to enable a user to access the datasets spatially.

SUMMARY OF THE INVENTION

A system and method linking one or more disparate datasets with one or more spatial layers to create linked datasets. One or more data attributes common to the dataset and the spatial layer are identified, and the linkage is defined between the dataset and the spatial layer. The spatial layer and the linked data set then may be queried using a single input query. Features from the spatial layer and features from the linked dataset that match the query are generated for display.

BRIEF DESCRIPTION OF THE DRAWINGS

FIG. 1 is a diagram of a spatial system for linking a spatial layer with a dataset in accordance with an embodiment of the present invention.

FIG. 3 is a diagram of a linked datasets in a spatial system in accordance with an embodiment of the present invention.

FIGS. 7-30 are screen diagrams of a user interface for a spatial system in accordance with an embodiment of the present invention.

DETAILED DESCRIPTION

Figure 2:
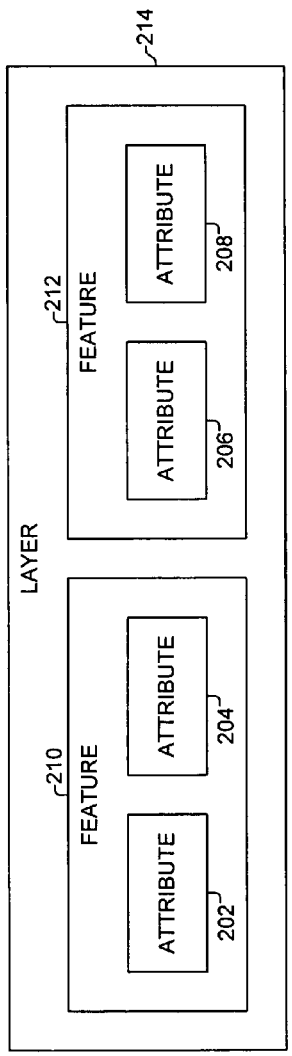
FIG. 2 is a block diagram of layers in a spatial system in accordance with an embodiment of the present invention.

The systems and methods of the present invention link one or more disparate datasets with one or more spatial layers so that data from the datasets does not have to be replicated for the spatial layer or the other datasets. Additionally, in some embodiments, one or more datasets from different data locations, including different databases and/or databases from different vendors and/or databases in different physical locations, are linked with the spatial layer. Thus, disparate data from disparate sources may be accessed using spatial data queries. In another embodiment, one or more documents are linked to one or more datasets for one or more spatial layers.

The spatial portal system 102 of FIG. 1 includes a spatial processing system 104, a user interface 106, and a data system 108. The spatial portal system 102 optionally may include another data system 110 and/or an input/output device 112 associated with the user interface 106.

The spatial processing system 104 processes spatial data and business data or other dataset data and spatially links the spatial data to the dataset data to create one or more spatially linked datasets. The spatial processing system 104 then enables performing queries of the linked dataset data using a query of the spatial data and the business data.

The spatial processing system 104 includes one or more processors to process the spatial data and the dataset data, to link the spatial data and the dataset data, and to perform queries. Memory is used to store data being processed.

The user interface 106 presents spatial data and/or dataset data for display to a user. The spatial data and/or dataset data is received at the user interface 106 from the spatial processing system 104. The user interface 106 also enables a user to enter input data to be used for queries, linking datasets and spatial layers, or otherwise building an application. The queries are sent to, and processed by, the spatial processing system 106.

The data systems 108 and 110 store and/or retrieve spatial data, dataset data, and/or other data. The data systems 108 and 110 communicate with the spatial processing system 104 to transmit data to, and/or receive data from, the spatial processing system. Although, one data system 108 and one external data system 110 are depicted in FIG. 1, the data systems each represent one or multiple data systems. The data system 110 is optional.

In one embodiment, the data system 108 and/or the data system 110 is a data system internal to the spatial processing system 104. In this embodiment, the data system 108 and/or the data system 110 can be accessed via an intranet connection. Alternately in this embodiment, the data system 108 and/or the data system 110 can be connected directly to, or be a sub-component of, the spatial processing system 104. Other data systems may be used.

In another embodiment, the data system 108 and/or the data system 110 is an external data system. In this embodiment, the external data system 108 and/or 110 communicates with the spatial processing system 104, such as over a connection, to transmit data to, and receive data from, the spatial processing system. In another embodiment, the external data system 108 and/or 110 is accessed via an internet connection. In this embodiment, the spatial processing system 104 processes a universal resource locator (URL) or another designation to connect to the external data system 108 and/or 110 and to communicate with the external data system for retrieving and/or sending data.

The input/output device 112 includes a monitor, a printer, another data output device, a mouse or pointer, a keyboard, another data entry device, other input or output devices, or a combination of the foregoing. In one embodiment, the user interface 106 is generated for display on the input/output device 112. In another embodiment, the user interface 106 receives input data from the input/output device 112.

The spatial portal system 102 links datasets with one or more spatial layers. The spatial layers and the datasets include features, and features include spatial attributes and/or data attributes.

A spatial attribute is one or more points, lines, and/or polygons that represent a geographical element or another physical element. A geographical element includes a building, a city, a county, a selected area, a state, a country, an address, a zip code, a location, point in space, or another element. Generally, a geographical element has a position, such as a position in space. Likewise, a physical element has a position, such as a position in space A data attribute is one member of a collection of data that has a relationship to an element, either directly or indirectly. For example, when grouping population data for a census for a state, the population is a data attribute that has a relationship to the state. In another example, when grouping finance information for leases of land for oil wells, the finance information is a data attribute that has a relationship to a lease for land.

A feature is an element that has one or more feature attributes, including one or more data attributes and one or more spatial attributes. The data and/or spatial attributes have a relationship to each other because of the relationship to the element. For example, a cell tower is a feature that has a height data attribute and a location spatial attribute. A second cell tower is another feature that has a height data attribute and a different location spatial attribute. Each cell tower is a different feature because each cell tower can be separately identified with its data attributes and/or spatial attributes. In another example, a specific oil well is a feature that has a well depth as a data attribute. In still another example, a first population statistic is a data attribute of a first zip code feature, and a second population statistic is a data attribute of a second zip code feature. In this example, the zip code is a spatial element because it has at least one spatial attribute, such as a position and boundaries.

Natural attributes of a feature are those attributes that are inherent to the feature. In one example, a natural attribute of a well is a well type, such as oil, gas, water, or other.

Each data attribute and each spatial attribute has a data value. Thus, in the above example, the height attribute and the location attribute of the first cell tower each are populated with a data value. These data values are collected in datasets. The datasets may be in one or more databases, in discrete data sources, or in other locations. In some instances and dependent on usage, the data value for the data attribute is referred to as the data attribute for ease.

A layer is a collection of similar features that have common types of data attributes and/or spatial attributes. Using the examples above, a cell tower layer includes the first cell tower as a first feature and the second cell tower as a second feature. The features are grouped in the cell tower layer because they have similar data attributes of cell data. In another example, a well layer for an oil well application represents a collection of wells, where each well is a separate feature having at least one data attribute in common.

Layers include a spatial layer, a dataset layer, and/or other layers. A spatial layer contains or identifies some spatial information, such as for a city, county, region, or another spatial element. Typically, spatial layers are a set of one or more features that have a set of one or more data attributes. For example, a layer of United States counties might have census related population statistics and gender and race related statistics, in addition to the spatial information that describes the polygons that make of the shape of each county.

FIG. 2 depicts an example of the above referenced relationship between attributes 202-208, features 210-212, and a layer 214. In the example of FIG. 2, a first feature 210 has a first attribute 202 to an Nth attribute 204. A second feature 212 has another first attribute 206 to another Nth attribute 208. The two features 210 and 212 are part of a layer 214.

FIG. 3 depicts an embodiment of a spatial processing system 104A process. The spatial processing system 104 spatially links one or more spatial layers 302-304 with one or more disparate datasets 306-310 to create one or more spatially linked datasets 312.

Typically, spatial layers have data attributes that are native to the spatial feature. For example, a county may have a polygon shape. But it also may have other attributes, such as population and other attributes. These natural data attributes are the data attributes that are part of the spatial layer.

A dataset contains or identifies a collection of data that relates to a topic or thing. A dataset, such as a data table, may be a dataset in a database or location other than a database containing spatial information for the spatial layer and other than a location of another dataset.

A disparate dataset refers to a dataset that is not co-located with another dataset or is not in a same data system or database as the other dataset. Disparate datasets may be located in different storage areas, such as different databases or different relational database management system (RDMS) database tables. However, some disparate datasets may be located in the same storage area, such as a same database, but organized as different data tables.

While the disparate datasets are not a part of the feature attributes of the spatial layer, the datasets can be linked to the spatial layer using data attributes from the dataset that are inherently related to the spatial layer (referred to as natural keys), such as from a common data attribute, to create linked datasets. A user then can access the disparate datasets spatially.

Accessing a dataset spatially refers to querying a linked dataset that has a natural relationship to spatial data in a spatial layer and selecting data from the linked dataset based on the selected spatial data. As an illustration, a wells spatial layer has an oil well feature that has a first dataset with production over time data attributes. An oil production statistic could be added to the data attributes of the oil well feature. However, the specific attribute for the oil production statistic would only represent one moment in time, that is oil production at the time of creation of the well spatial layer. If the oil production statistics are left in a second dataset that is disparate from the first dataset, production statistics representing different points in time may be accessed without having to change the spatial layer representing wells for each point in time that is of interest.

The linked datasets in this example may be accessed spatially, for example, by querying the wells spatial layer for all wells in a region that are producing oil from a selected formation and that have a selected oil production statistic. The production data from the resulting wells at various points in time will be produced. In this example, the production data is spatially accessed via the spatial attributes of the wells spatial layer, i.e. the wells in a region, and the data attributes for the wells, i.e. the selected formation and the selected oil production statistic.

In one embodiment, disparate datasets are dynamically linked at run time with a spatial layer to create a linked dataset, thereby extending the natural data attributes of the spatial layer with those from the linked dataset. The datasets are linked using a spatial attribute common to both datasets and are linked without copying data from one dataset to the other.

The spatial system 102 links the disparate datasets so that the datasets remain in their respective original data location, file, table, database, or other location. Thus, the need to replicate the data to get it into the same (non-disparate) database as the spatial data or the same database as another dataset is eliminated. This combination of disparate datasets and a spatial layer is referred to as a linked dataset.

In one embodiment, multiple datasets are identified from a query and the databases are merged at run time using a data attribute common to a spatial layer and to the multiple datasets. The datasets and the spatial data are linked dynamically at run time, not permanently. As a result, any number of linked datasets can be established for a spatial layer without altering the spatial and data attributes of the spatial layer or requiring any alterations of the disparate datasets. The spatial system enables linking datasets from different databases and database types.

In one embodiment, a dataset is spatially linked with a spatial layer by identifying an attribute common to the spatial layer and to the dataset and defining a linkage between the spatial layer and the dataset for that attribute. The linkage instructs the spatial processing system 104 where to find the dataset and how to relate it to the spatial layer. In one example, a common attribute is identified between the spatial layer and the dataset, the location of the data attribute for the dataset is identified, and the data attribute is linked to the same attribute of the spatial layer.

In one embodiment, a spatial layer is linked to a data attribute that is present in both the spatial layer and the dataset. In another embodiment, a spatial layer is linked to a first dataset by linking a data attribute that is present in both the spatial layer and the first dataset, and the spatial layer is linked to a second dataset by linking another data attribute that is present in both the spatial layer and the second dataset. In this embodiment, the spatial layer is spatially linked to the first dataset and the second dataset, and the first dataset and the second dataset are indirectly linked to each other via the spatial layer. In this embodiment, the first data attribute is different from the second data attribute. In still another embodiment, the spatial layer is linked to a first dataset by linking a data attribute that is present in both the spatial layer and the first dataset, and the spatial layer is linked to a second dataset by linking the same data attribute, which also is present in the second dataset.

A query may be performed for the spatially linked data. Both the spatial layer and the linked dataset are queried with an input. The spatial layer is queried to identify spatial features that match the input, if any. The linked dataset is queried to identify data attributes from the linked dataset that match the input, if any. In one embodiment, the spatial layer is queried first, and the liked dataset is queried next. In another embodiment, the liked dataset is queried first, and the spatial layer is queried next. In one embodiment, a standard query language (SQL) query is performed on the linked dataset data. In another embodiment, an SQL query is performed on the spatial layer.

If a query match is identified for the spatial layer, the spatial features associated with the match are generated to a map image. The map image is generated to a display in one embodiment. If a query match is identified for the linked dataset, the dataset features associated with the match are generated to a feature output. These features are referred to herein as selected features. The selected features are generated to a display in one embodiment as a tabular list. In another embodiment, a query match also identifies linked features and/or linked documents. The linked features and/or linked documents are generated to a display in one embodiment.

In one embodiment, the spatial portal system 102 has a GUI user interface with a configuration manager that is used to define the relationships between one or more datasets and one or more spatial layers. This may be, for example, a textual definition of the relationship that a spatial layer will have at run-time to one or more disparate datasets. The linking relationships, for example, may be defined via extensible markup language (XML) entries within the spatial portal system 102. The linked dataset configuration definitions then are stored by the configuration manager in XML for use by the spatial portal system 102. Thus, a user does not have to write code to link the datasets.

Once a user has defined linked datasets, the user may use the linked datasets within the definitions of user tools. The tools may include search, filter, or view tools that are published for use by a spatial portal system 102 application. The spatial portal system 102 application then can use these published tools to obtain information from spatial layers and linked datasets.

Linked datasets can be used within defined tools as if the features of the linked dataset were natural data attributes of a spatial layer. For example, a filter tool might be created that highlights zip codes that have household poverty levels exceeding a given level. In this example, the filter tool uses a linked dataset on the zip code layer to provide household poverty statistics because the poverty data was not present in the data attributes of the zip code layer. The tool actually uses data attributes of the linked dataset to narrow the set of spatial features that result from the tool's query operation. Thus, the data attributes of the linked dataset appear to the rest of the spatial portal system 102 as if they were just part of the native attributes of the spatial layer.

When a published query tool is used, such as a filter tool or a search tool, a map image illustrating the results of the query is generated for display, and, optionally, a tabular list of data attributes that resulted from the query operation is generated for display. These include attributes from the spatial layer feature and attributes from the datasets. When a user selects a spatial layer feature that has defined linked datasets, a tabular display of the feature's natural data attributes is generated. Each row of the table is a different feature, and each column depicts a different attribute of the feature. The table may include column headings to identify the feature attributes. A list of the linked datasets (associated with the feature's parent layer) that have available data also is generated. The user then can select any of the available linked datasets to display a tabular list of records from the selected linked dataset.

The spatial portal system 102 can dynamically link documents to spatial features to allow for the ability to organize documents and navigate to documents spatially, effectively building a run-time relationship between individual spatial features and one or more documents. For example, a document containing city level homeland security statistics for the Seminole county in Oklahoma can be linked to a "Seminole OK" feature of the Counties layer.

In this example, a user interface is used to insert a new document into a document index database and bind this index entry to a specified spatial layer. The user interface queries the user for the document location and the specific spatial layer feature to which the document will be linked. The document may be "bound" to the spatial feature of the spatial layer in a document index table. In one embodiment, SQL is used to insert the document index relationship entries to specify documents are associated with what features. Alternately, a GUI wizard can facilitate this process.

A user can access linked documents by selecting spatial features on the map. If linked documents exist for the selected feature, references identifying the document titles are displayed. The user can then display these linked documents, in their native form, by selecting the respective document reference.

Figure 4:
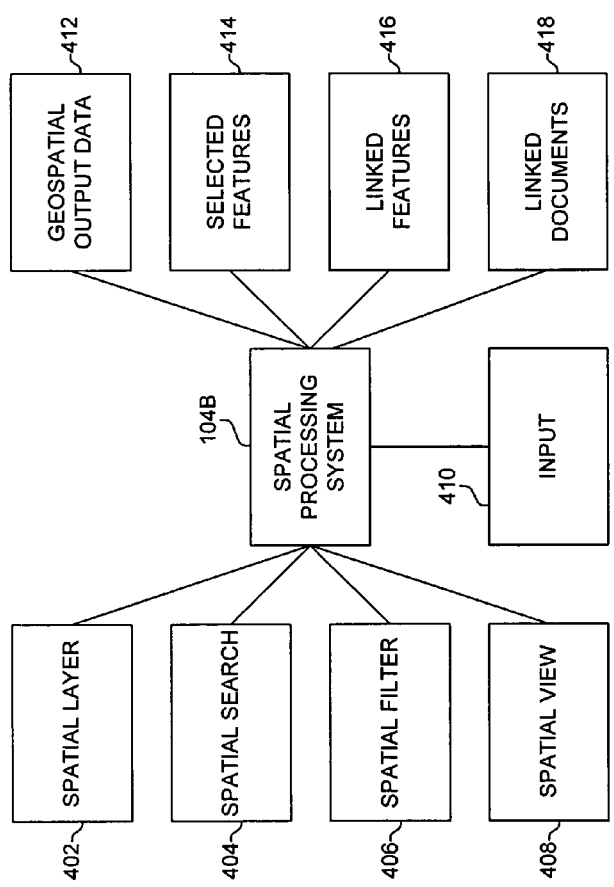
FIG. 4 is a diagram of inputs and outputs for a spatial system in accordance with an embodiment of the present invention.

FIG. 4 depicts an exemplary embodiment of selectable options and outputs of a spatial processing system 104B. The selectable options and outputs are exemplary.

One or more spatial layers 402 may be defined for an application of the spatial processing system 104B. The particular application, such as an oil well application, a population statistics application, or a cell tower application, determine the particular spatial layers that are defined. In one example for a population statistics application, spatial layers are defined for a counties layer, a states layer, a roads layer, and other layers. The spatial layers that are defined and selected for processing may be queried, and the corresponding spatial features may be generated to a map image or other image.

Typically, a set of tools will be defined for the application of the spatial processing system 104B. The particular application also will determine the particular tools that are defined. However, multiple types of tools may be available. In one embodiment, the tools include a search tool 404, a filter tool 406, and a view tool 408. The tools may be used to query one or more spatial layers and linked datasets or view spatial and data attributes of one or more spatial layers or linked datasets.

The search tool 404 enables a query for a search layer. When the search tool 404 is selected, a corresponding input is used to search the selected spatial layer or layers and the linked dataset or datasets. In one example, the input is entered via a user interface.

The filter tool 406 enables a query for a filter layer. When the filter tool 406 is selected, a corresponding input is used to search the selected spatial layer or layers and the linked dataset or datasets. In one embodiment, the input is entered via a user interface.

The view tool 408 enables viewing an item selected from the viewed tool. In one embodiment, the selected item is viewed via a user interface.

One or more outputs are generated if a match between an input and one or more spatial layers and one or more linked datasets is identified for a query. If a query match is identified for one or more spatial layers, the selected spatial layer features 412 resulting from the match are generated for display, such as in a map image. If a query match is identified for one or more datasets on which the query is performed, the selected dataset features 414 resulting from the match are generated for display, such as in a tabular list specifying each selected dataset feature and its corresponding data attributes.

If a query match is identified for one or more datasets that are linked to the spatial layer, but not the dataset on which the query was performed, the corresponding linked features 416 resulting from the match are generated for display, such as each with a linked feature reference in a list. In one embodiment, each linked feature reference can be selected to display a tabular list specifying the corresponding dataset feature and its data attributes.

If a query match is identified for one or more documents that are linked to the spatial layer or the selected dataset, the corresponding linked documents 418 resulting from the match are generated for display, such as each with a linked document reference in a list. In one embodiment, each linked document reference can be selected to display the corresponding document.

Figure 5:
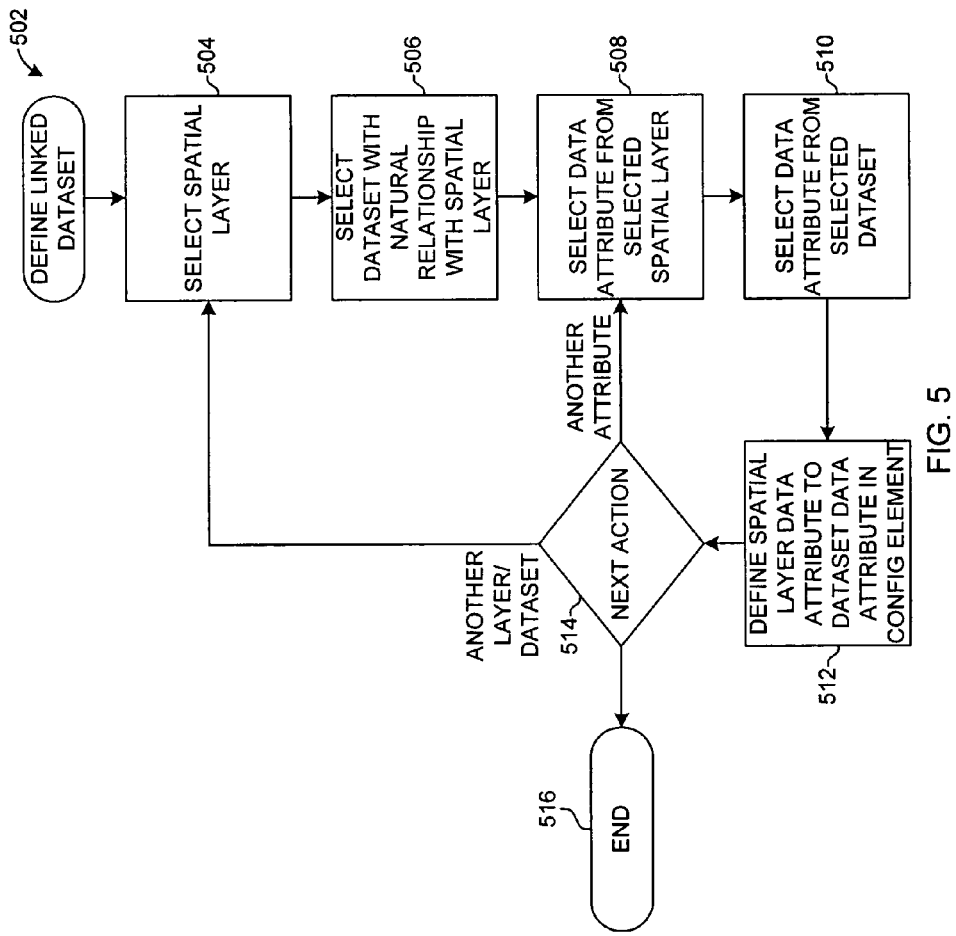
FIG. 5 is a diagram of a process for linking a spatial layer with a dataset in accordance with an embodiment of the present invention.

FIG. 5 depicts an exemplary embodiment of linked dataset definition process 502. A spatial layer is selected at step 504. A dataset having a natural relationship with the selected spatial layer, that is having one or more common data attributes, is selected at step 506. A common data attribute is selected from the selected spatial layer at step 508. The common data-attribute is selected from the selected dataset at step 510. The selected spatial layer data attribute is defined to the selected dataset data attribute in a configuration file or other configuration element at step 512.

The next step is determined at step 514. Steps 508-512 may be repeated to define another common data attribute for the selected spatial layer and the selected dataset. Steps 504-512 may be repeated to define a common data attribute for another spatial layer and/or another dataset. The process ends at step 516.

In one embodiment, after the linked datasets are defined, SQL-type statements are used to describe a query that spans the spatial layers and the linked datasets. The query is used to match an input for a search or filter to the spatial layer(s) and the linked dataset(s). In one example of this embodiment, SQL-type statements describe multiple transactions used to query the spatial layer(s) and the linked dataset(s). The statements use extensible markup language (XML) to describe how to select data fields for the query. The statements include a selection clause to identify elements that are wanted, a from clause to identify from what spatial layer(s) and/or dataset(s) the data is to be queried, a where clause to identify what criteria is used to select data, an order clause to identify the order used to present data that matches the query, and a group clause to identify how common/like data is to be grouped, such as by rows. The statements are presented with database/data system neutral definitions and vendor neutral definitions.

Figure 6:
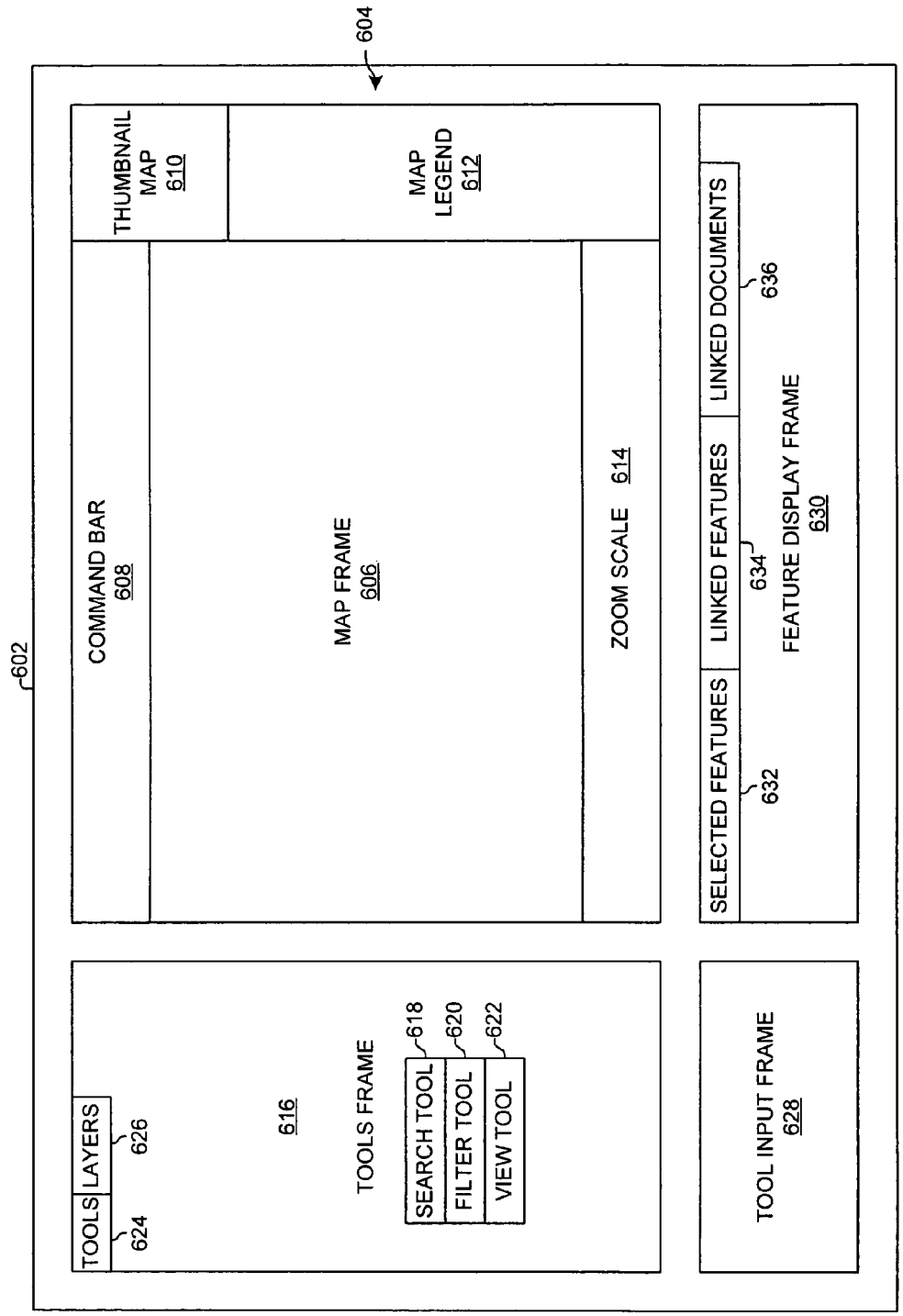
FIG. 6 is a diagram of a user interface for a spatial system in accordance with an embodiment of the present invention.

FIG. 6 illustrates an exemplary embodiment of a user interface used to enter search criteria, select tools for searches, and generate spatial data and feature data for display. The user interface may be used to configure tools, define linked datasets, and perform other operations.

The user interface 402 has a map browser 604. The map browser 604 in the example of FIG. 6 includes a map frame 606, a command bar 608, a thumbnail map 610, a map legend 612, and a zoom scale 614. In other examples, the map browser 604 includes the map frame 606. In still other examples, the map browser 604 includes the map frame 606 and a combination of one or more of the command bar 608, thumbnail map 610, map legend 612, and zoom scale 614.

The map frame 606 displays a map image. The map image may include spatial data and/or other data, such as dataset data. One or more points may be selected within the map frame 606 to cause generation of additional map displays or generation of feature data. The map frame 606 provides image display capabilities for a map image, such as pan and zoom, based on input commands from an input device, such as a mouse or pointer.

The command bar 608 includes function buttons that control the behavior of the map image display generated to the map frame 606 and what other subcomponents of the map browser 604 are available. In one embodiment, the command bar 608 includes buttons for turning the legend on and off, turning the overview map on and off, changing the unit of measurement for representing distance between miles and kilometers, and measuring distance on the map image display by selecting a point on a map and moving to another point on the map so that the distance measurement tool generates a straight line distance representation. The command bar 608 in this embodiment also includes a refresh button, a center map button to center the map where selected, a pan button, a zoom in button, a zoom out button, and a lasso button. The lasso button enables a user to draw a square or other shape or designation around an area to select feature data within that area for the selected spatial layers. The linked datasets corresponding to the selected area also are used to provide the feature data.

The thumbnail/overview map 610 displays a smaller version of the map image display zoomed out so that the user can visually identify the approximate location of the map image display relative to other spatial features. In one example, the overview map 610 displays a map area of a selected state relative to several surrounding states.

The map legend 612 identifies the spatial layers that currently are visible on the map image display. The map legend 612 also may depict colors or other feature designations for selected layers or features.

The zoom scale 614 enables a user to zoom the map image display area in or out relative to the current map image display area. The current relative zoom level may be indicated by a square or dot on the zoom scale or in another manner. The user may select a location on the zoom scale to zoom in or out.

The user interface 602 also includes a tools frame 616. In one embodiment, the tools frame 616 includes a search tool 618 to enable input for a query for a search layer, a filter tool 620 to enable an input for a query for a filter layer, and a view tool 622 to view an item selected from the viewed tool. The tools frame 616 also may include a tools tab 624 and a layers tab 626 to enable toggling between selections of tools and layers.

The tool input frame 628 enables a user to input query data. The query data may be performed on attribute data for a spatial layer and/or a linked dataset. The spatial layer may include, for example, an address, a county, a city, a state, or another spatial identification. The attribute data for the query may include a value for population, income, lease identification, well identification, statistical selection data, or other data applicable to the application in which the tool input frame 628 is located.

The user interface 602 also includes a feature display frame 630 in which the feature data is provided. Data may be displayed in the feature display frame 630 as tabular attribute information from layer features, including text data, image data, or other data.

The feature display frame 630 may include selected features data 632, linked features data 634, and linked documents 636. The selected features display the attribute data from the selected features. The linked features 634 display the attribute data for linked features of linked datasets. The linked documents 636 enables selection of documents, including word processing documents, spreadsheet documents, images, hypertext markup language (HTML) documents, PDF documents, and other documents.

FIGS. 7-30 and 31-55 illustrate exemplary embodiments of user interfaces. The exemplary screen views of FIGS. 7-30 depict a user-level user interface for an application used to select population related data for a state and spatial/geographic entities within the state, including counties, cities, urban areas, addresses, and other spatial/geographic entities. Also included is an example of an application for identifying spatial/geographic data and dataset data for gas wells. In this example, the spatial/geographic data includes location, county, and other spatial data. The dataset data in this example includes well name, well number, lease number, lease identification (ID), operator, status, formation, and other data. The screen views of FIGS. 31-55 depict embodiments of an administration assistant interface.

Figure 7:
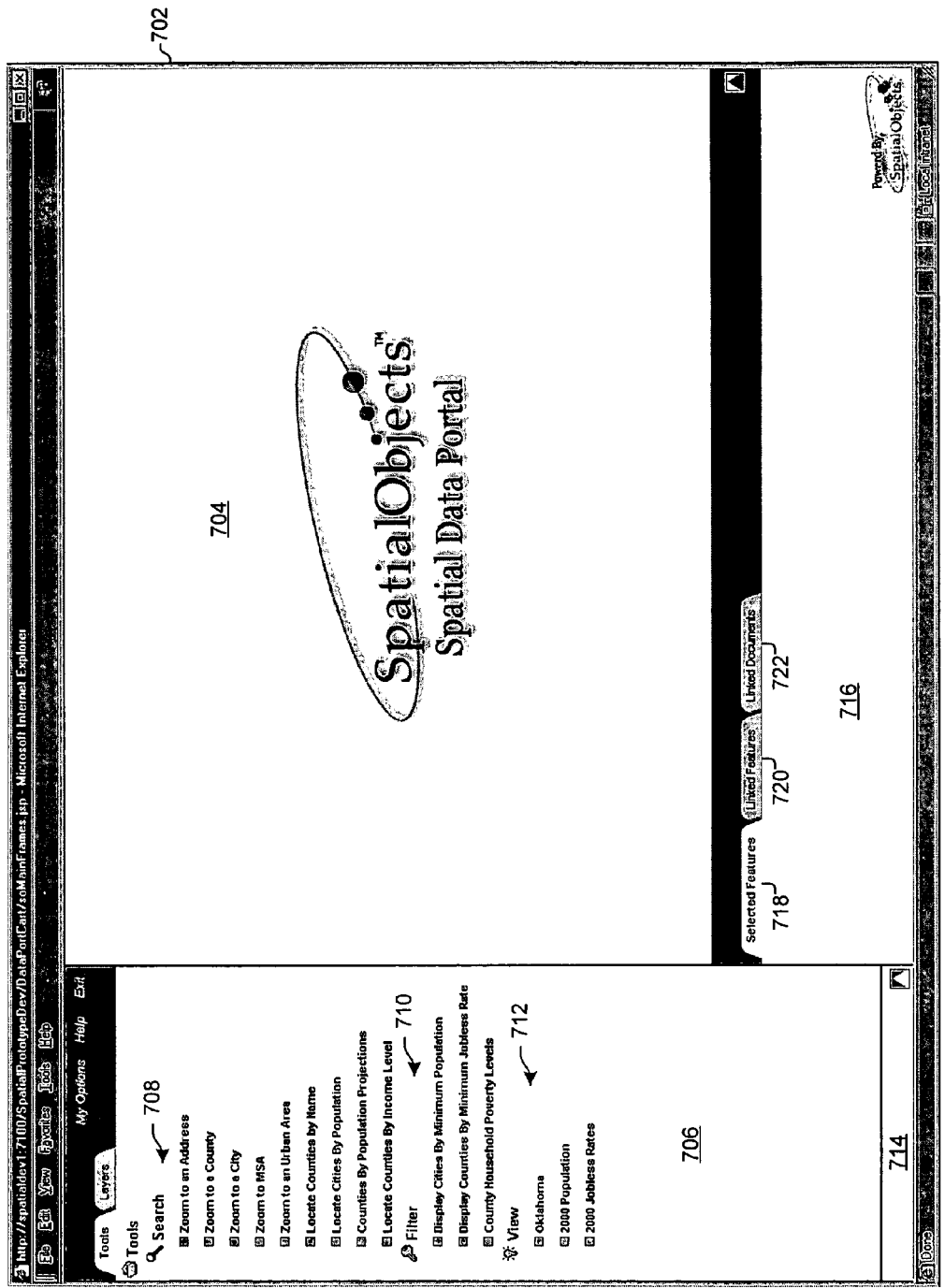

FIG. 7 depicts an example of a screen generated for display to a user for a population statistics application. The population statistics application spatially links state, county, city, and other spatial data to disparate datasets, such as population, jobless rate, other census data, and other dataset data. The population statistics application provides linked data set data to the user.

The spatial data portal user screen 702 includes a map frame 704 in which a map browser is generated. The map browser may include the map image display and, optionally, a command bar, a thumbnail map, a map button, and a zoom scale. The user screen 702 also includes a tools frame 706 that enables a user to select one or more search tools 708, filter tools 710, and/or view tools 712. A tool input frame 714 also is provided. In the example of the user screen 702, the tool input frame is collapsed.

The user screen 702 also includes a feature display frame 716. The feature display frame 716 displays, and enables selection of, selected features 718, linked features 720, and linked documents 722.

Figure 8:
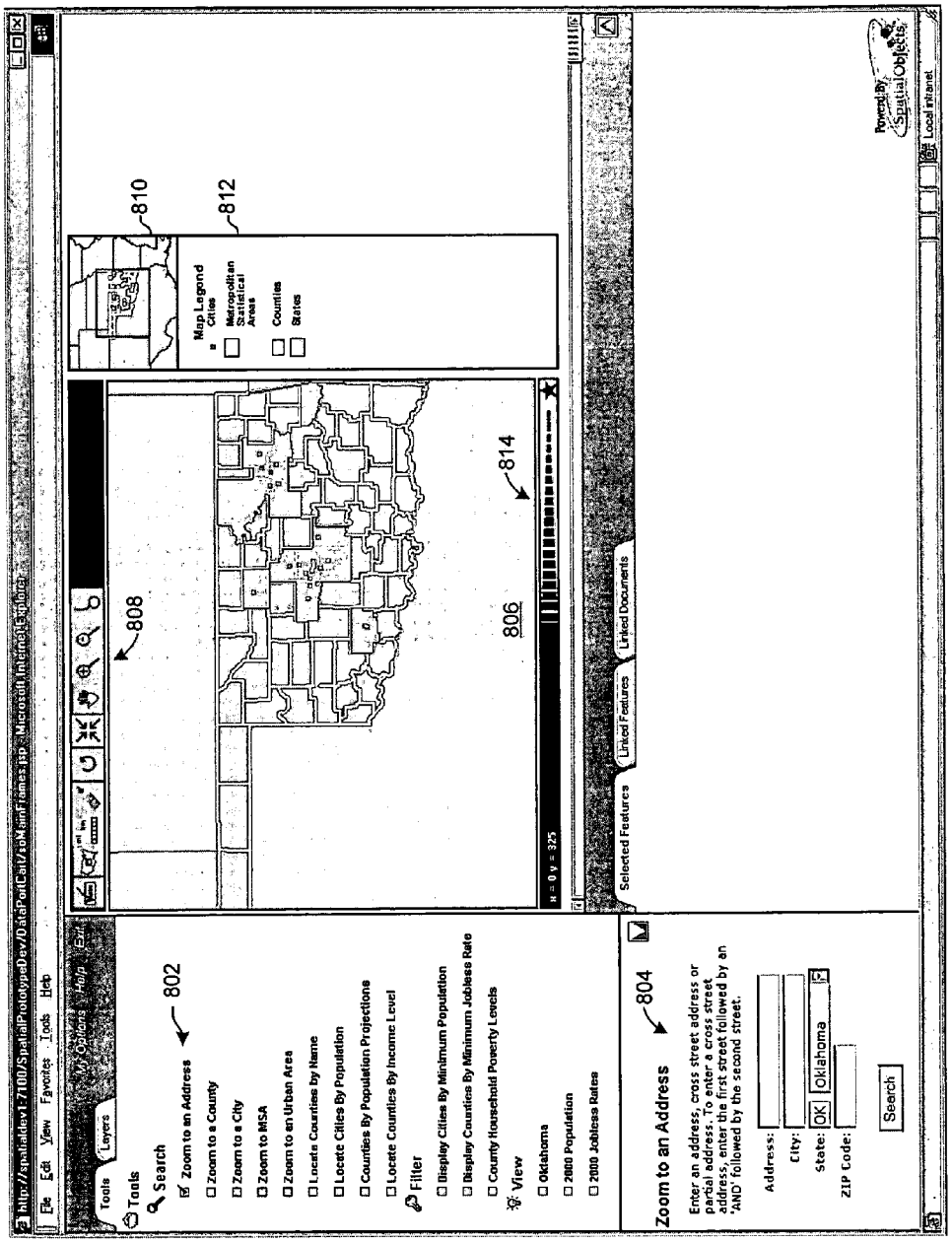

FIG. 8 depicts an exemplary embodiment of a screen in which an address search tool 802 and a corresponding address input tool 804 are used to query the spatially linked datasets. The address tool 802 enables the user to locate a street address, a cross-street address, or a sub-portion of a street address, such as state, city, or zip code. In the example of FIG. 8, the state portion of the address was entered, resulting in a map image display 806 that depicts the state entered in the address tool input 804. The map frame also includes a command bar 808, an overview map 810, a map legend 812, and a zoom scale 814.

Figure 9:
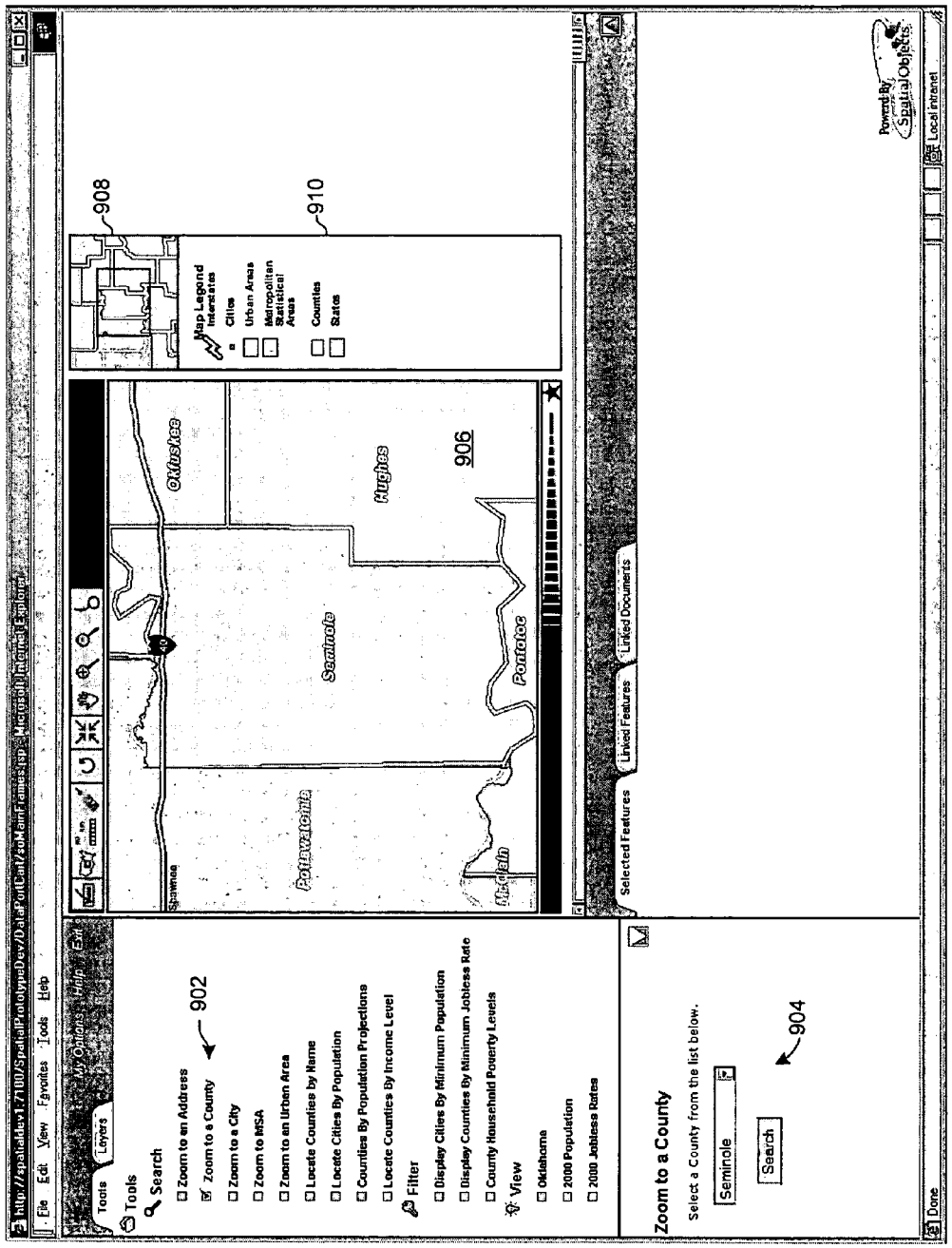

FIG. 9 depicts a screen display in which a list of values (LOV) tool is used. The LOV tool in this example is a county tool 902. LOV tools enable a user to select a feature from a list of features associated with a given spatial layer. LOV tools are applied to a unique field of a spatial layer or a data layer, enabling a user to select at least one feature contained within the layer. In the example of FIG. 9, selection of the county tool 902 results in a corresponding county tool input 904 displayed to the user.

The user may select a county from a drop down list in this example. The county tool has been applied to a name field of a county layer to enable the user to select a county by its county name. In other examples, other fields of other layers may be used.

In the screen of FIG. 9, Seminole county was selected. When the search button is selected, the map image display 906 depicts a reduced map area that more fully depicts the selected spatial attributes, which in this case is the selected county. The overview map 908 also changes to depict more closely the selected spatial element and the surrounding spatial elements. The map legend 910 also is modified to depict map legends for corresponding spatial features.

Figure 10:
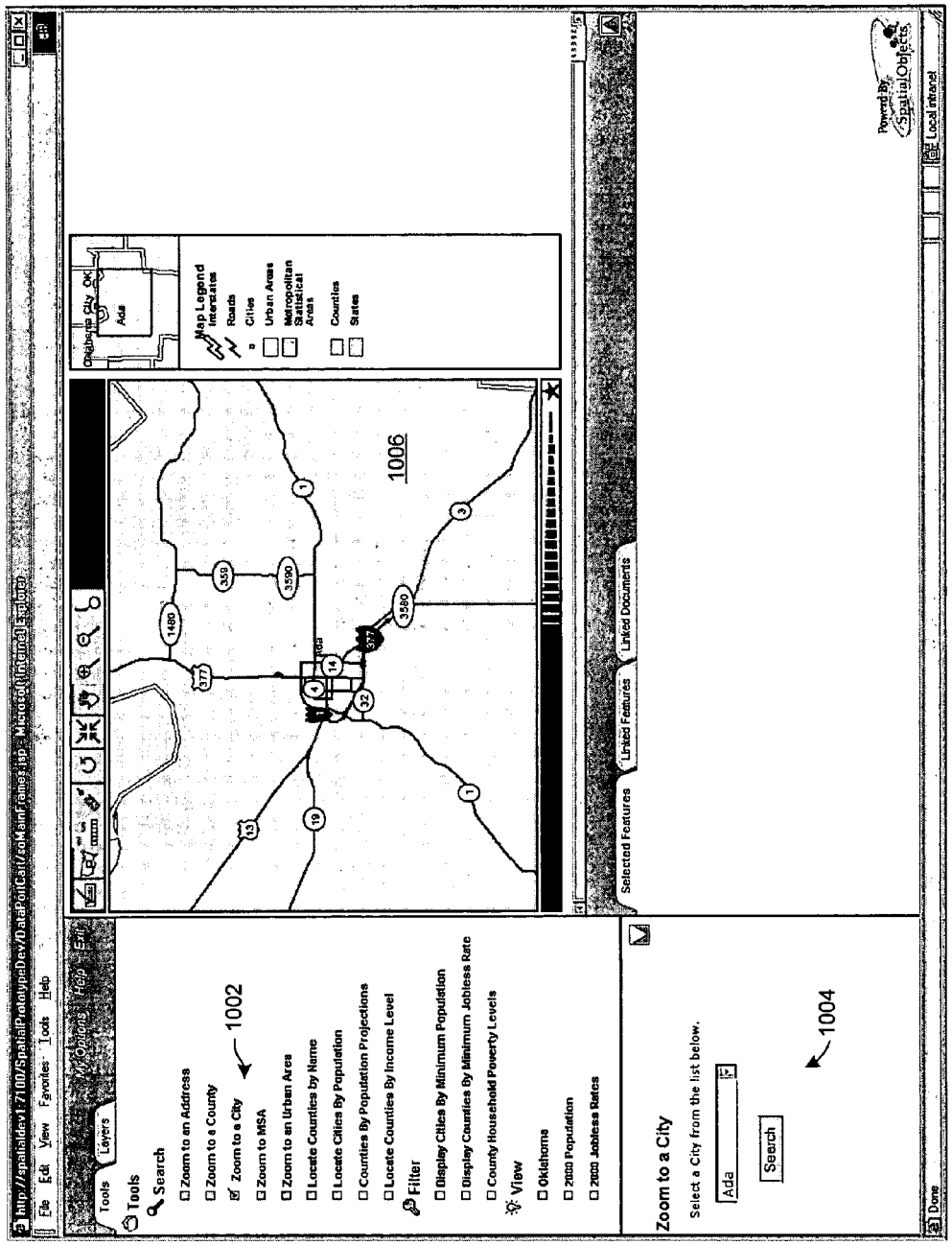

FIG. 10 depicts an example of a screen in which a city tool 1002 is selected to apply a search to a cities spatial layer. When the city tool 1002 is selected, a corresponding city tool input 1004 is provided for entry of a city. In the example of FIG. 10, an LOV tool input is provided for selection of a city from a drop-down list. In the example of FIG. 10, the city of Ada is selected, causing the spatial element of Ada and surrounding spatial features to be generated for the map image display 1006.

Figure 11:
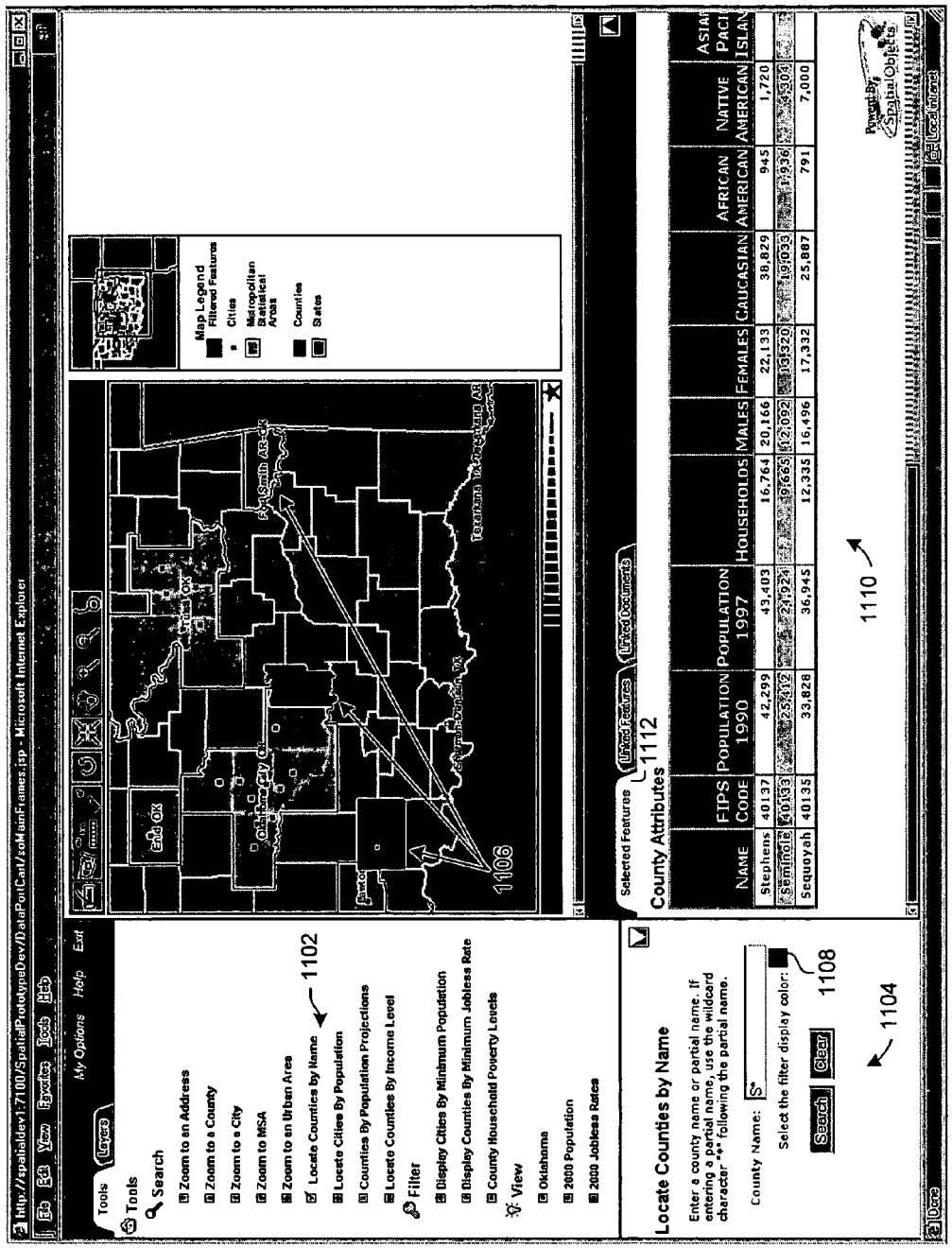

FIG. 11 depicts a screen in which a query type search tool is selected. The query tool in the example of FIG. 11 enables a user to locate a county by name 1102. A query tool enables a user to query spatial features from a selected layer. The criteria for locating spatial features are provided to the user in the query tool input 1104. The spatial data portal application will use the query input to query attributes of the associated spatial layer and/or data attributes of a linked data set that may be associated with the designated spatial layer.

In one embodiment, a query using the query search tool results in the map area of the map image display to include the minimum area that incorporates all features that are selected by the query operation. In the example of FIG. 11, an "S" with a wildcard, designated with an asterisk, is provided as the query input for a counties layer. The features located by the query 1106 are depicted with the same color or shade as selected for the filter display color 1108.

Additionally, the query tool results return a collection of data set attributes 1110 that are derived from the linked datasets. In the example of FIG. 11, the data set attributes are displayed in tabular form within the selected features tab 1112 of the feature display frame. The data attributes of FIG. 11 include name, FIPS code, population 1990, population 1997, households, males, females, Caucasian, African American, Native American, Asian Pacific Islander, and other data attributes. The data attributes are populated for the specific selected features, which include Stephens county, Seminole county, and Sequoyah county in FIG. 11.

Figure 12:
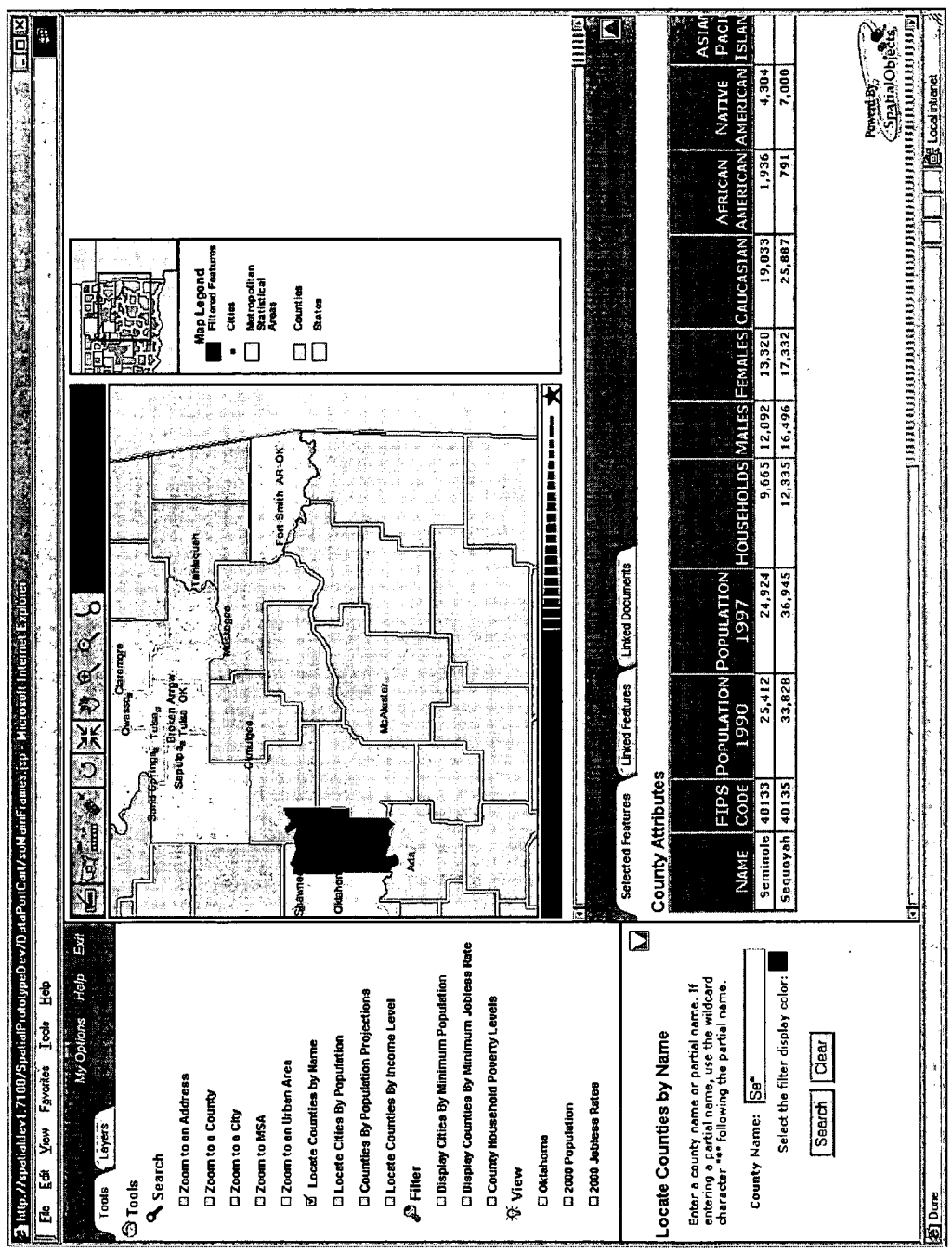

FIG. 12 depicts an example of another search for the counties layer search tool. The input for the query tool input has been modified to provide a more specific query. The resulting features and resulting data set attributes are narrowed by the query to depict data for Seminole county and Sequoyah county.

Figure 13:
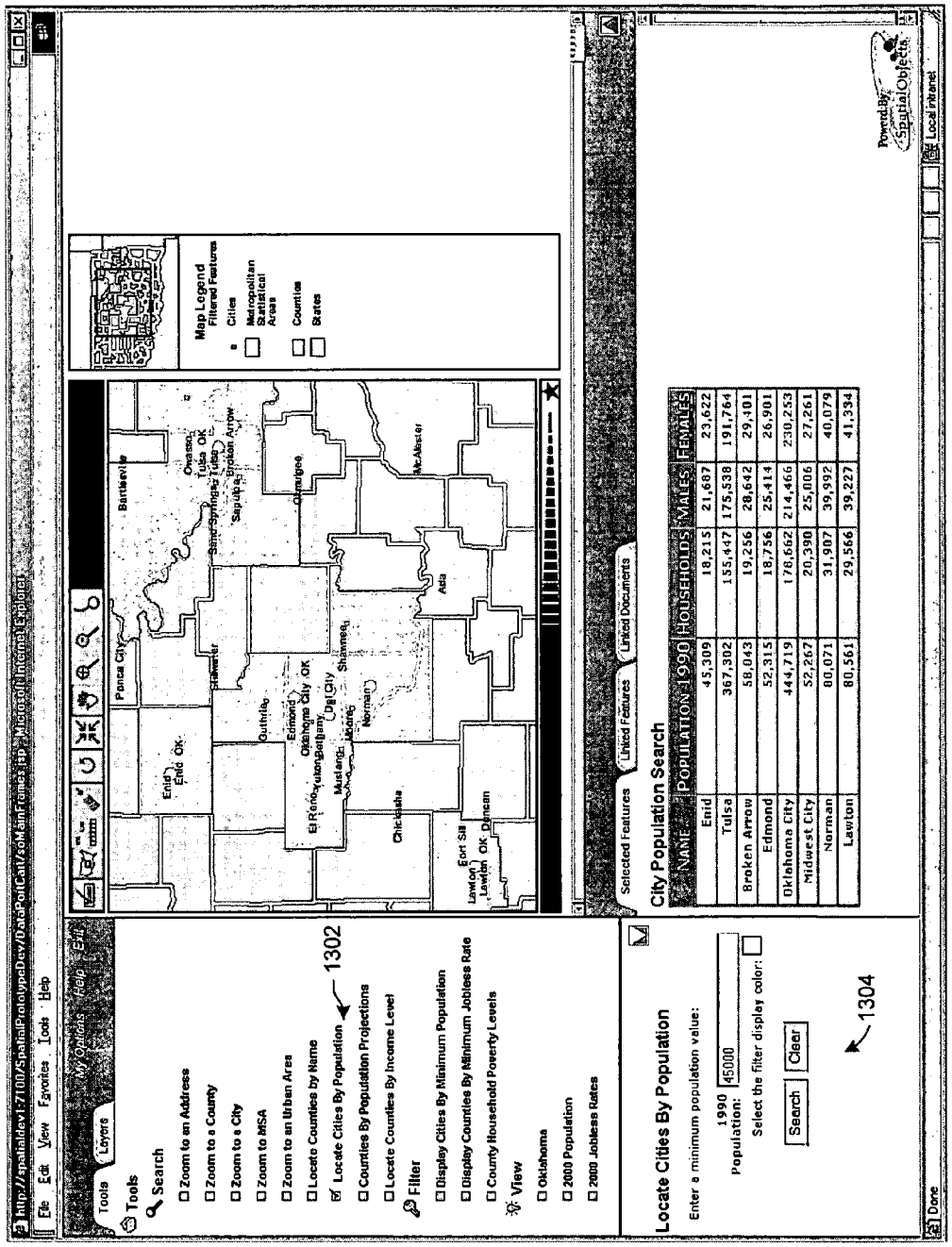

FIG. 13 depicts a query tool for locating cities by population 1302 and a corresponding query tool input 1304 for locating a city by a population. The inputs required for the locate cities by population tool 1302 are defined as part of the application. In this example, a minimum population value is used as the input. Features that match the search criteria are highlighted on the map image display. In this example, all cities with 1990 populations greater than or equal to 45000 are highlighted. Additionally, the data set attributes that result from the query can be displayed. The information displayed corresponds to the data for the data set attributes associated with the features located by the search.

Figure 14:
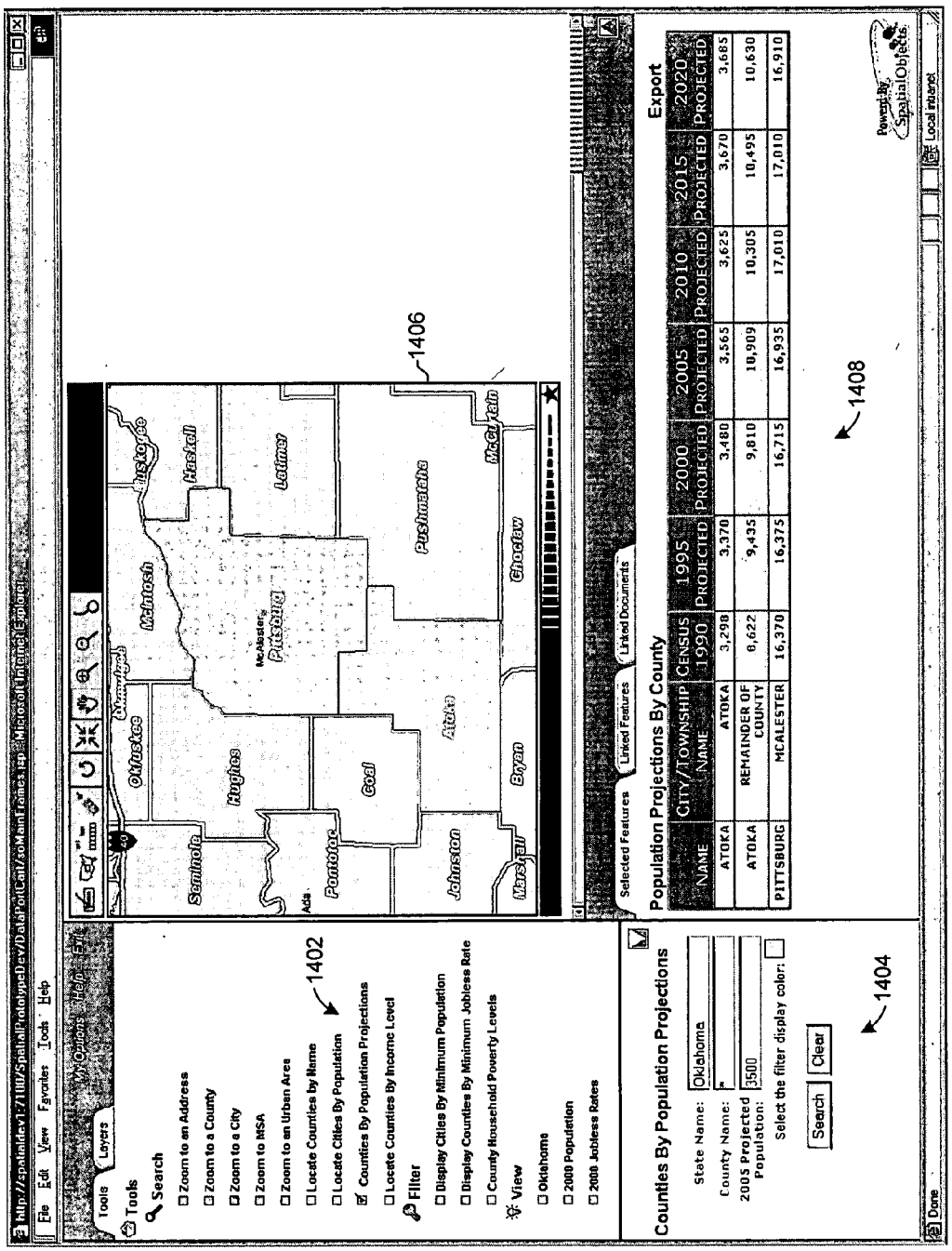

FIG. 14 depicts a screen in which a query type search tool is used to locate counties with population projections that exceed a specified limit. The counties layer has been spatially linked to a data set that contains projected population statistics by county and decade.

Because the counties layer has been spatially linked with the population statistics data set, a potential for more than one row of attribute data per county may exist. In this example, a state name and a 2005 projected population is entered for the query input tool 1404 corresponding to the counties by population projections tool 1402. Multiple features are identified in the map image display 1406, and multiple rows of attribute data corresponding to the selected features is identified in the feature display frame 1408.

Figure 15:
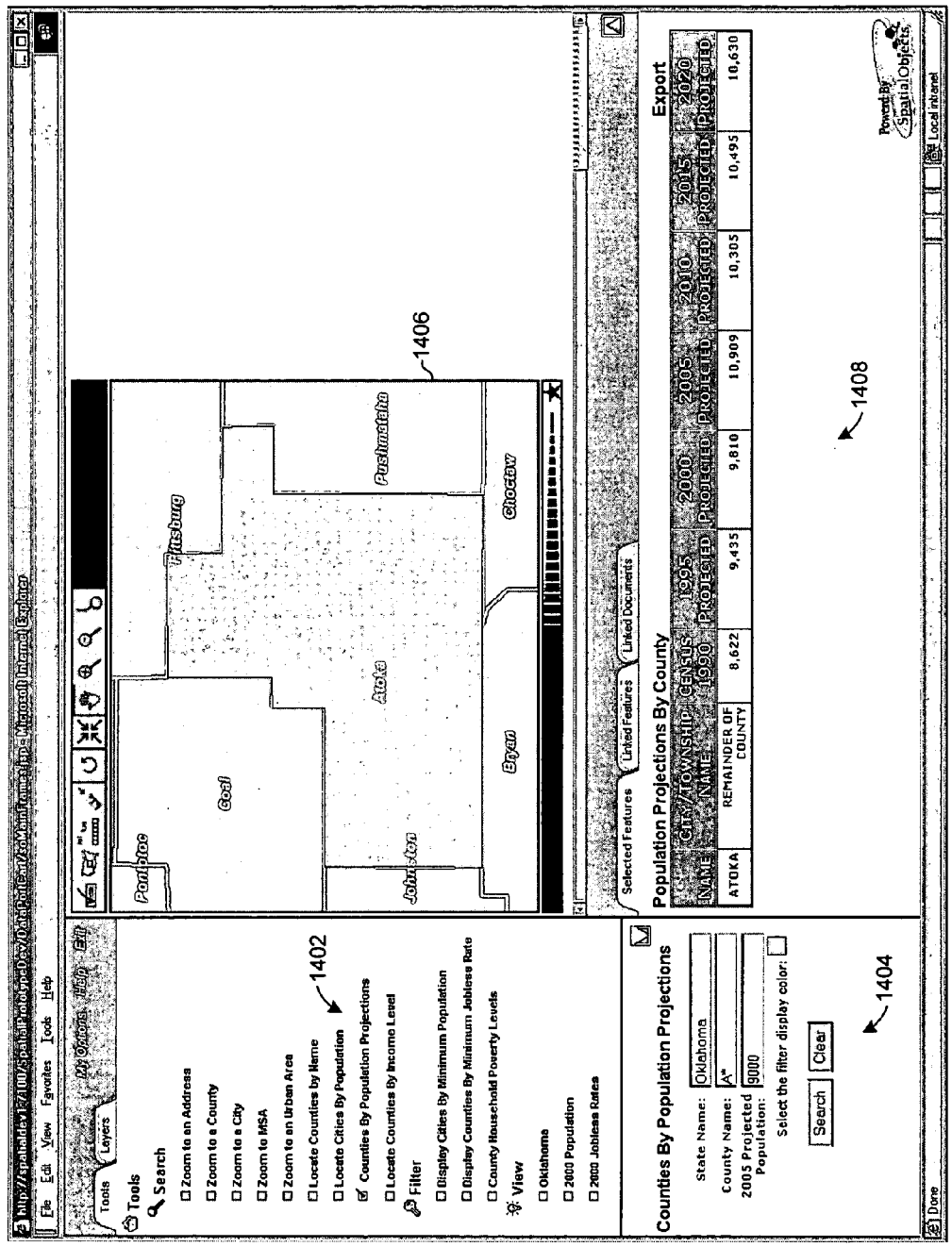

FIG. 15 depicts an example of the effect of changing a default input to the counties by population projections tool 1402. An input is added to the county name field of the query tool input 1404 resulting in a narrowed match with features in the counties layer. Thus, the map image display 1406 depicts the selected feature more fully. The attribute data is displayed in the feature display frame 1408, and the attribute data is narrowed by the search.

Figure 16:
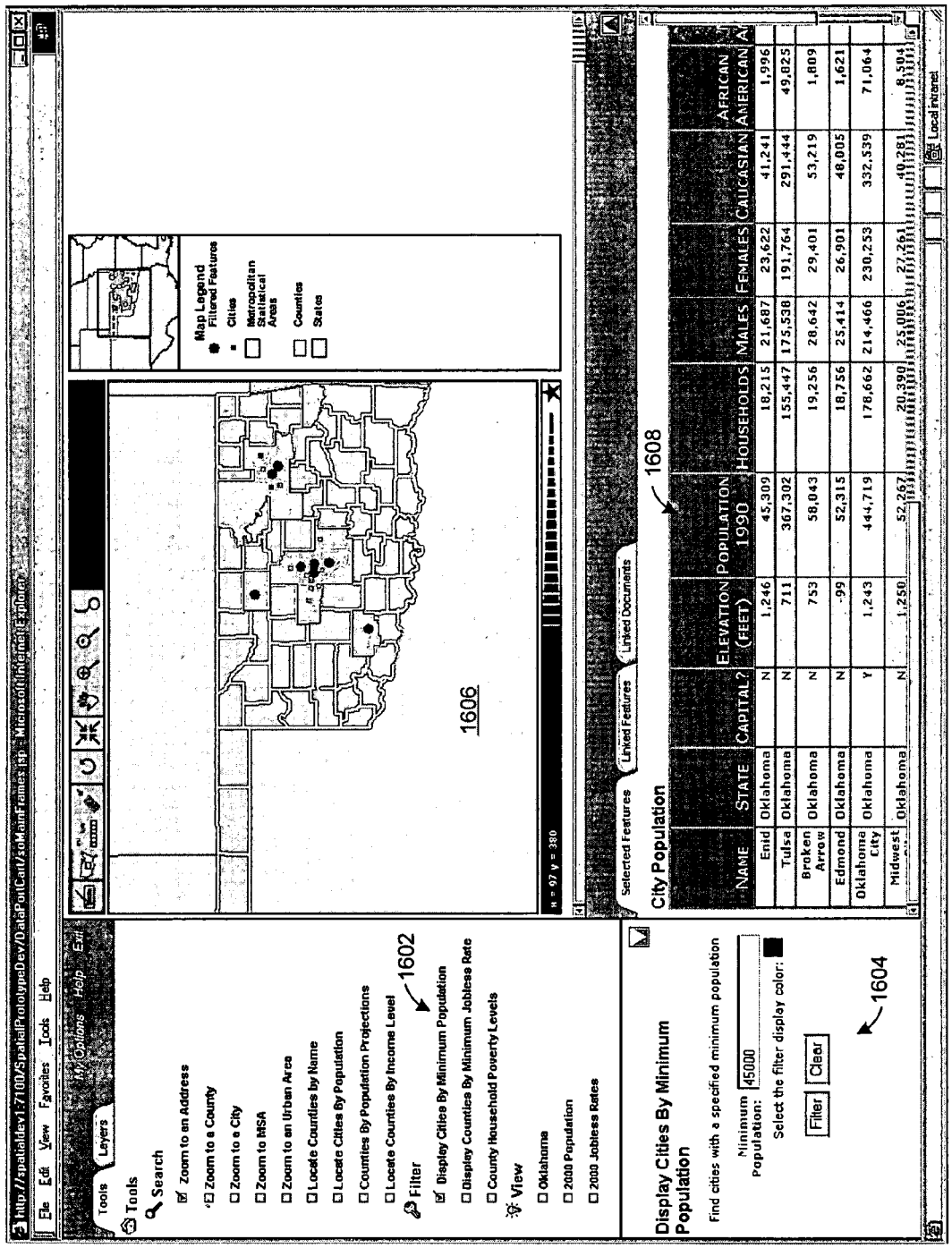

FIG. 16 depicts a screen using a spatial filter. A filter query is similar to a search query. A filter query can be configured to output a different set of data set attributes than a search query. In the embodiment of FIG. 16, the filter tool does not alter the map display area when the search is completed so that the map display area does not zoom in or out. In other embodiments, the filter tool query results in altering the map display area so that the map display area identifies more closely the features that match the filter query. In one embodiment, the spatial filter, when applied, remains in effect until removed. In still another embodiment, the spatial filter remains in effect only for a single filter query.

When a spatial filter query is effected, the features within the map display area that match the filter's search criteria are highlighted or otherwise designated, such as by placing a shape around the matching features. Spatial filters, like spatial searches, can incorporate linked datasets into the filter's query, thus allowing disparate linked datasets to affect the results of the filter query.

In the example of FIG. 16, the filter for the display cities by minimum population 1602 is selected. A minimum population of 45000 is entered for the tool input frame 1604. When the query is effected by selecting the Filter button, the features that match the spatial filter query are depicted in the map image display 1606. Additionally, the data set attributes that match the selected features are depicted in the feature display frame 1608. In the example of FIG. 16, the results of the spatial filter query depict different attribute data than was depicted by the locate cities by population spatial search query. Thus, the outputs of the spatial search queries and the spatial filter queries are configurable and may show different features and/or data set attributes.

Figure 17:
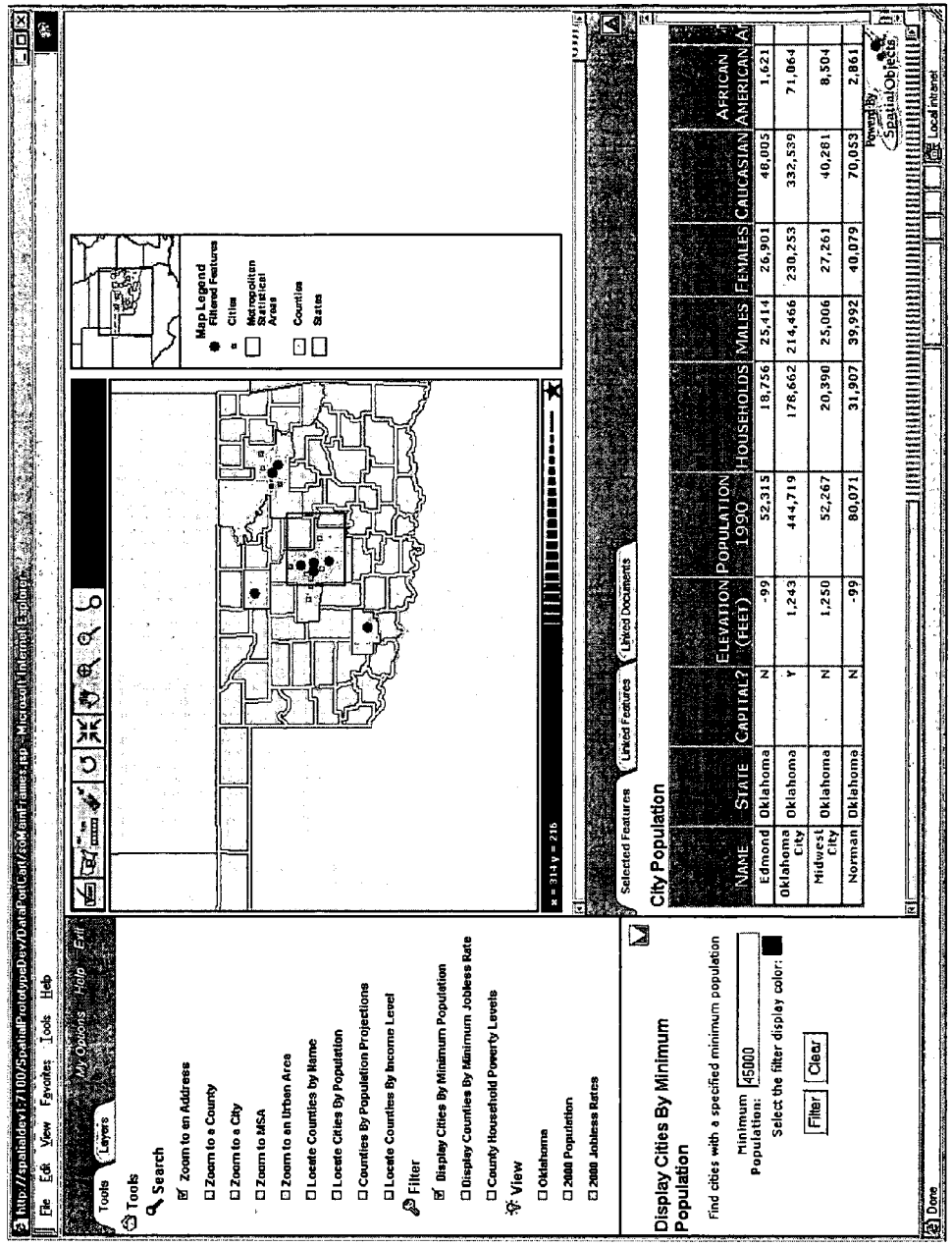

FIG. 17 depicts an example of a rubber-band zoom. In this screen, a user selected an area around four cities that are highlighted. This selection is depicted by the square surrounding these selected cities.

Figure 18:
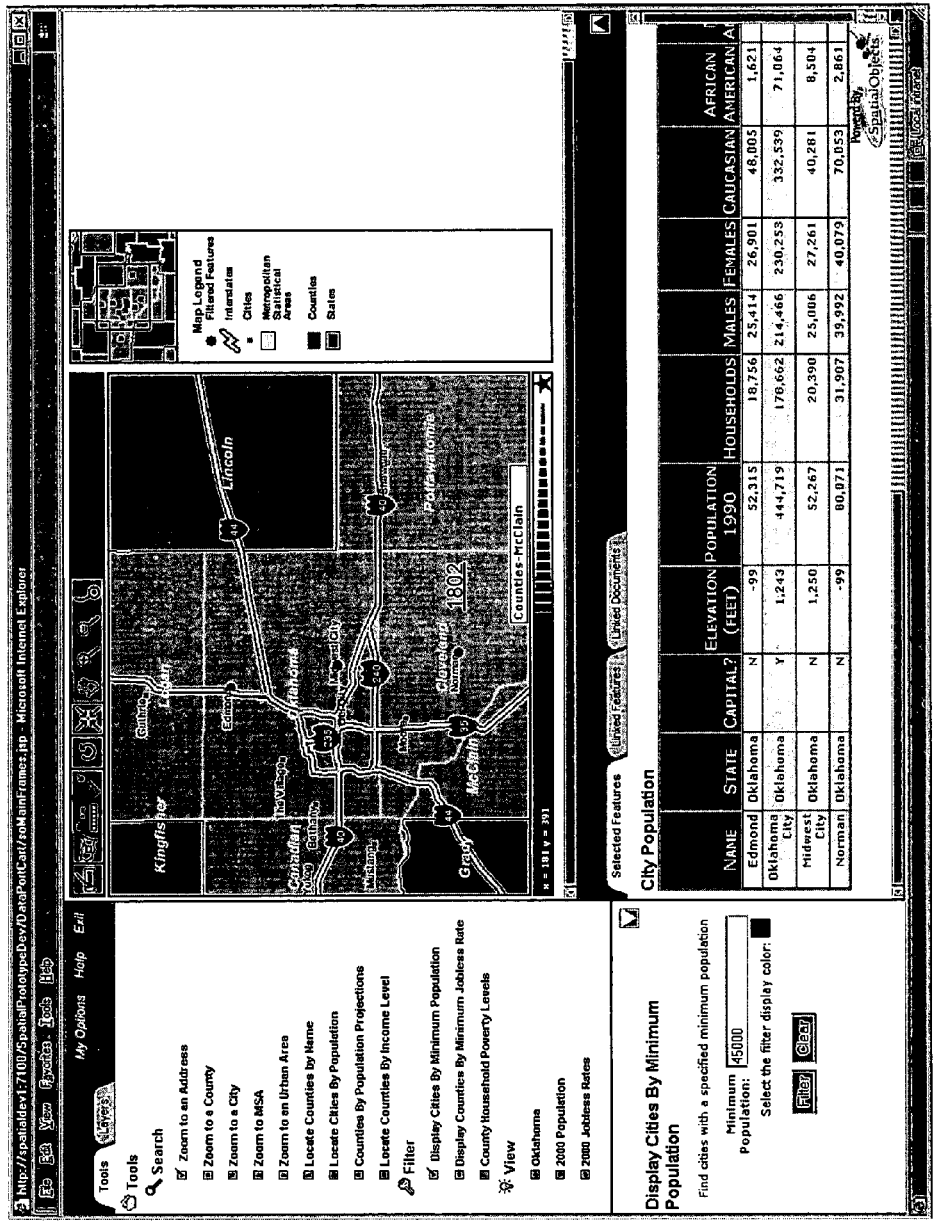

FIG. 18 depicts an example of the results of the rubber-band zoom of FIG. 17. The map display area 1802 is reduced relative to the area shown in the previous screen to more closely identify the selected features. The data set attributes that result from the filter operation are altered to include the matching features within the current map display area 1802.

Figure 19:
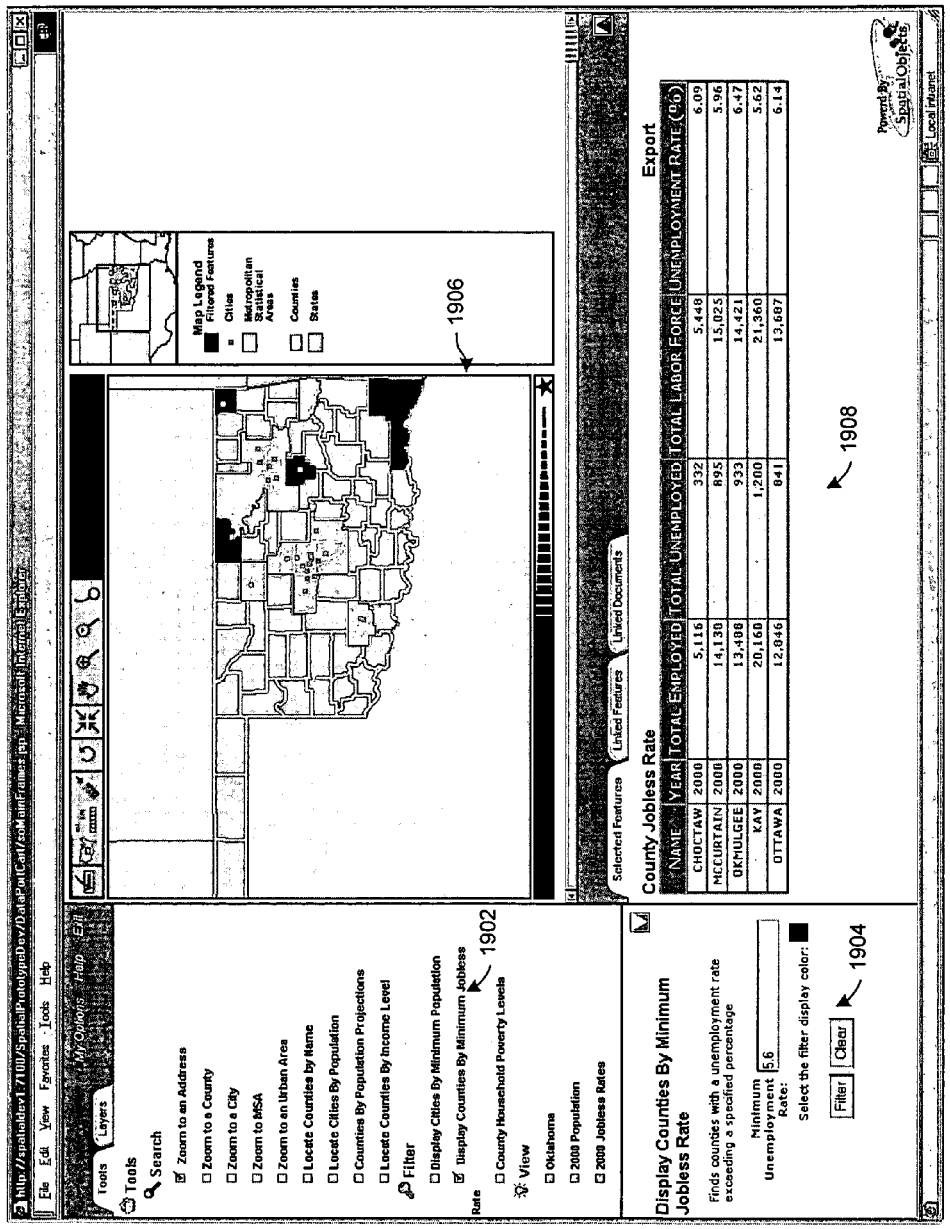

FIG. 19 depicts another example of a spatial filter query. The spatial filter for display counties by minimum jobless rate 1902 results in a corresponding tool query input 1904 for minimum unemployment rate. The spatial filter for display counties by minimum jobless rate 1902 uses the unemployment rate data attribute from a linked data set to restrict the set of features included in the filter results. The selected features included in the filter results are depicted in the map image display 1906. Corresponding data attributes are depicted in the feature display frame 1908.

It will be appreciated that features can be depicted using feature designations other than a filter display color, including crosshatching or other patterns, outlining, and other feature designations.

Figure 20:
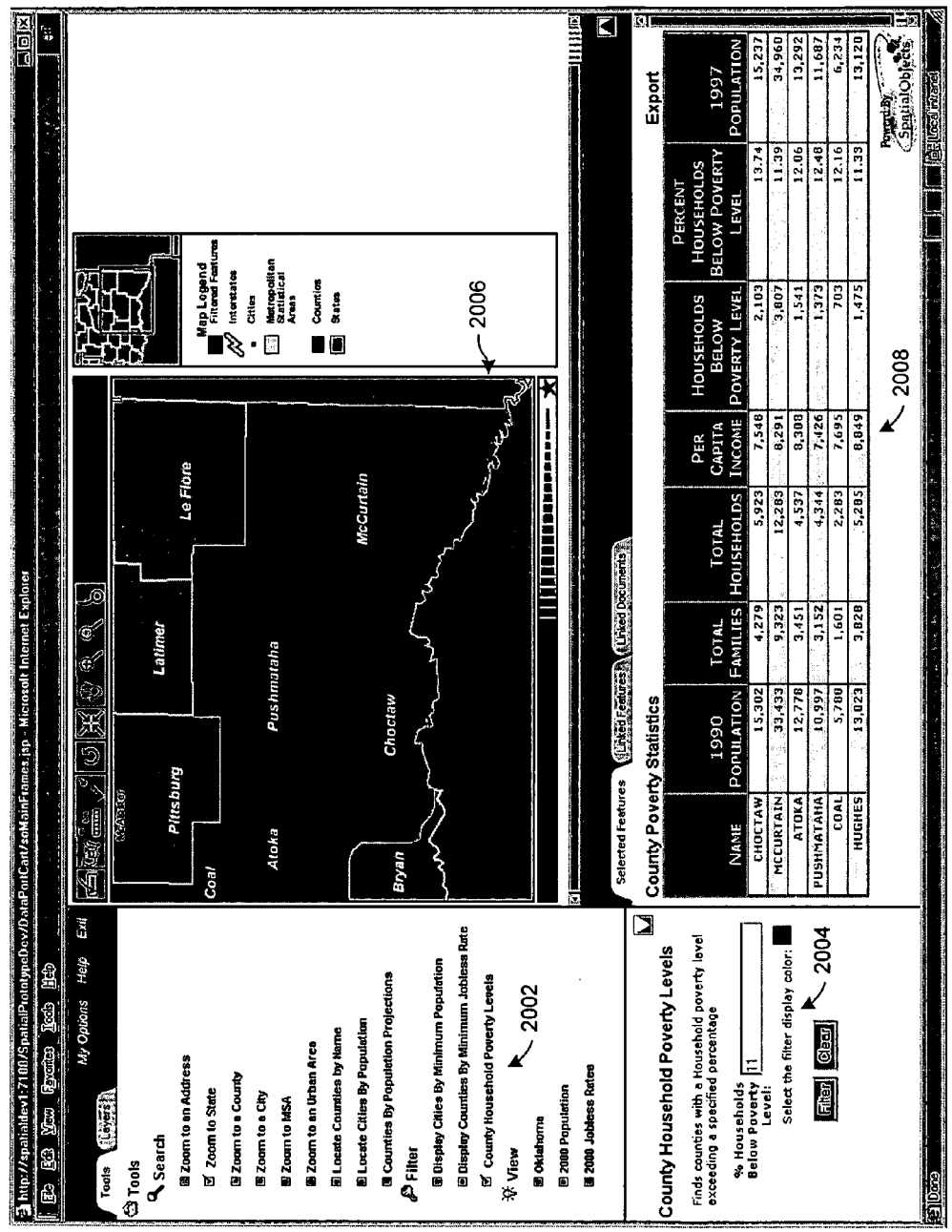

FIG. 20 depicts another spatial filter for household poverty levels 2002. The query tool input 2004 enables entry of a minimum percentage of households below a poverty level. Effecting the query search causes the matched features to be depicted in the image display area 2006. Corresponding data set attributes are depicted in the feature display frame 2008.

Figure 21:
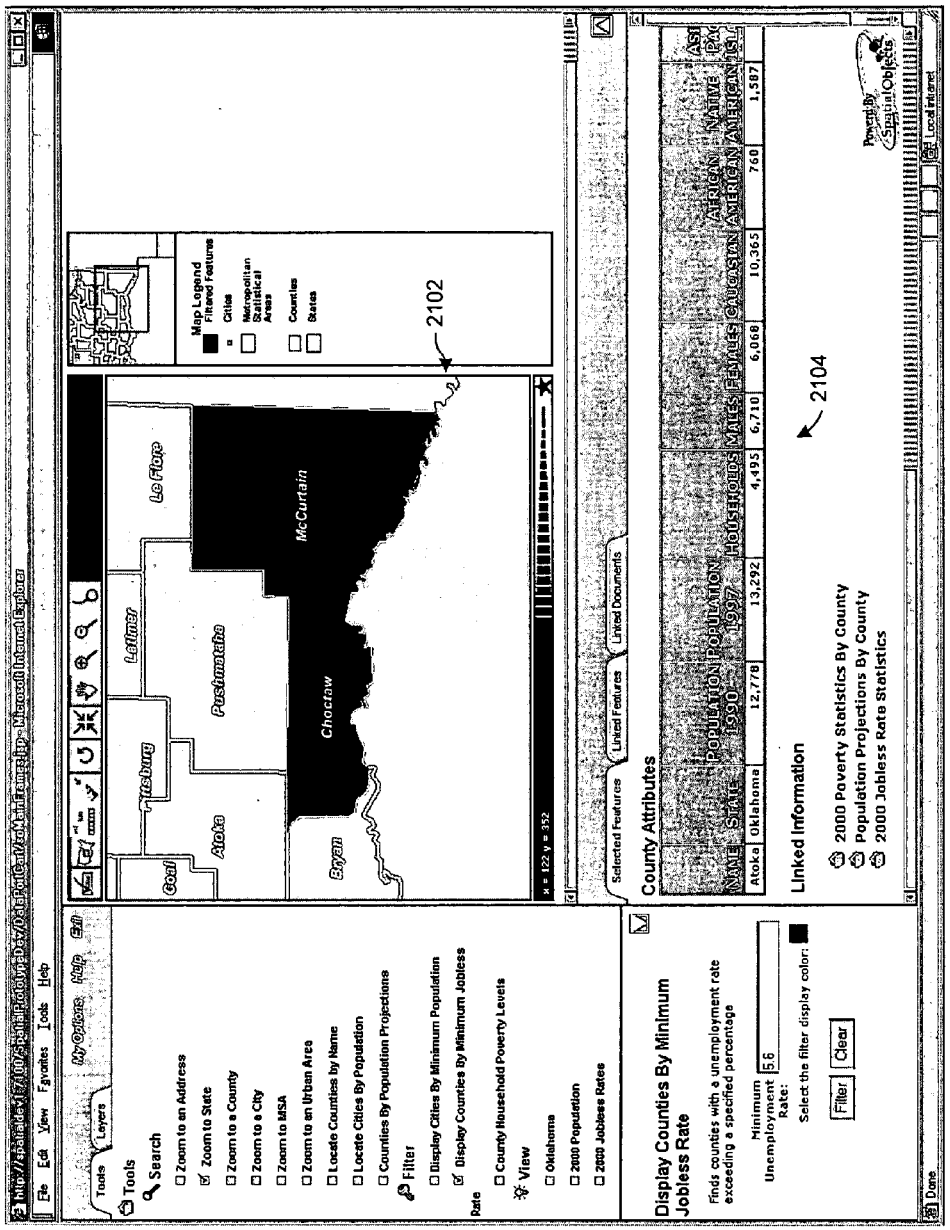

FIG. 21 depicts an example of features in the map display area 2102 being enabled as hot spots. A hot spot is a selectable area on an image display area. Selecting the hot spot results in attribute data and linked information being presented in the feature display frame 2104. In the example of FIG. 21, the Atoka County was selected from the map image display 2102. Because the county layer was enabled for hot spots, the data set attributes for the counties layer are displayed. Additionally, the datasets that are linked to the counties layer are displayed.

Figure 22:
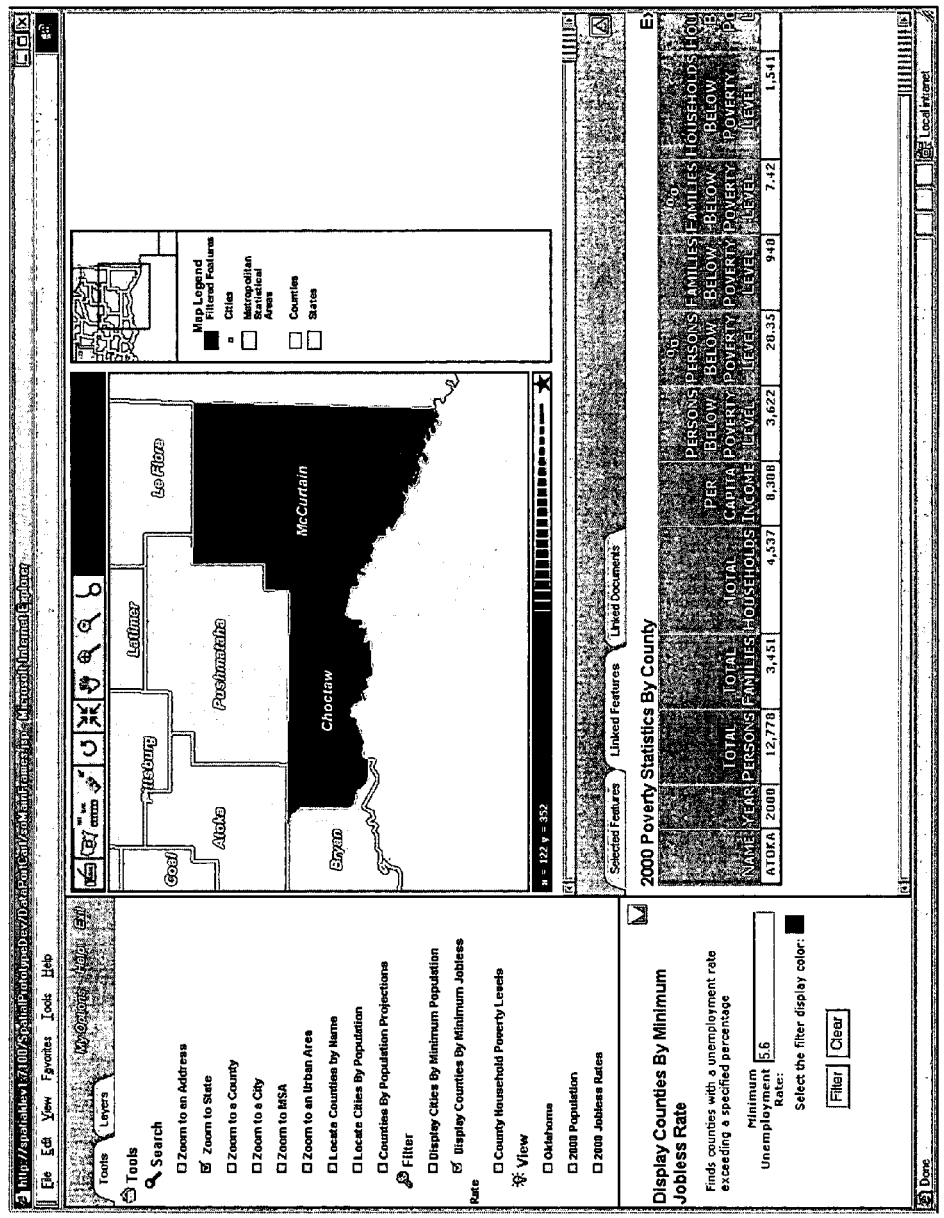

FIG. 22 depicts a screen in which the 2000 poverty statistics by county linked feature from FIG. 21 was selected. The spatially linked data set's attributes are displayed in tabular form in the linked features tab.

Figure 23:
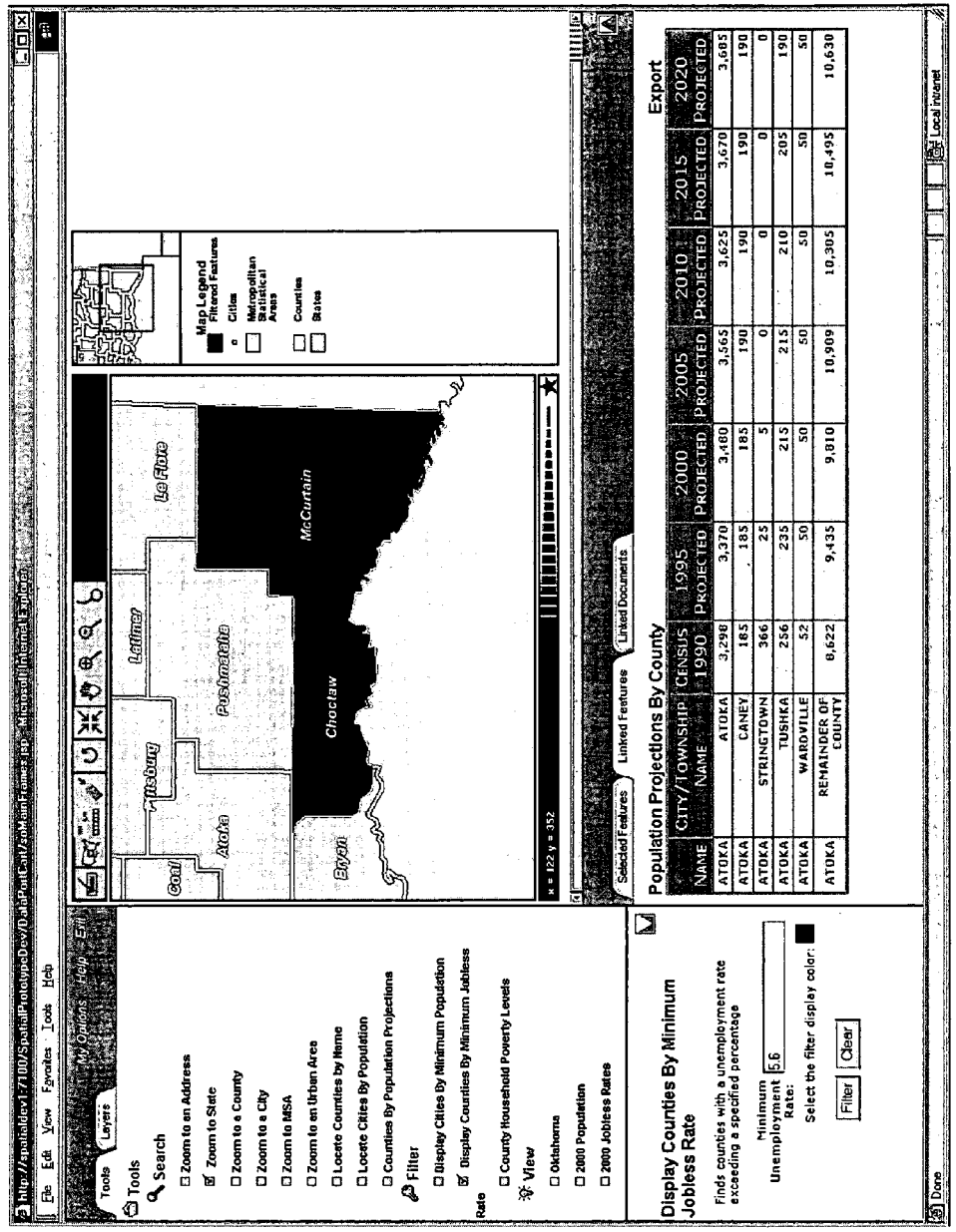

FIG. 23 depicts a selection of another linked data set from the feature results of FIG. 21. In this example, the population projections by county linked data set were selected, and the data set's attributes are shown in the linked features tab.

Figure 24:
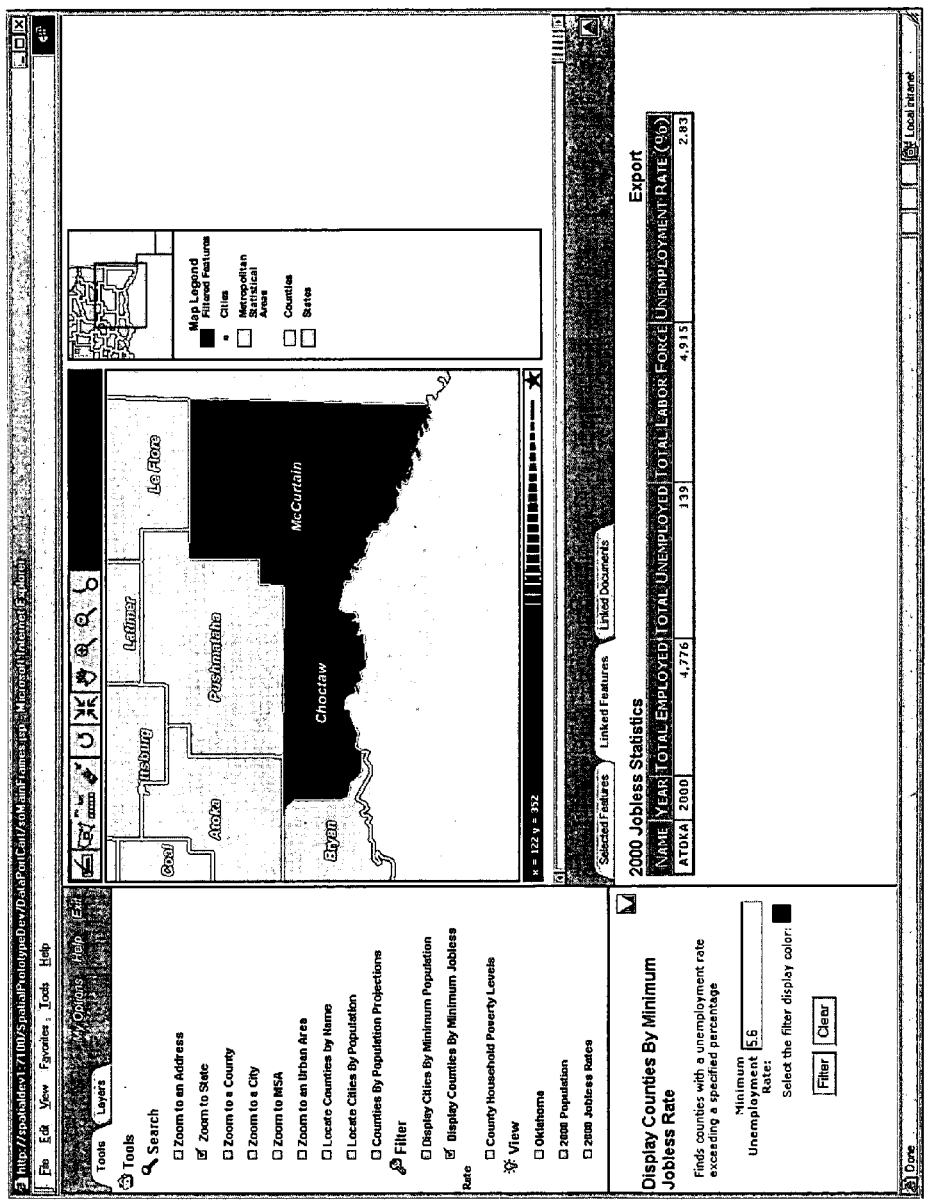

FIG. 24 depicts a selection of another linked data set from FIG. 21. The linked data set for 2000 jobless statistics was selected, and the data set's attributes are displayed in the linked features tab.

Figure 25:
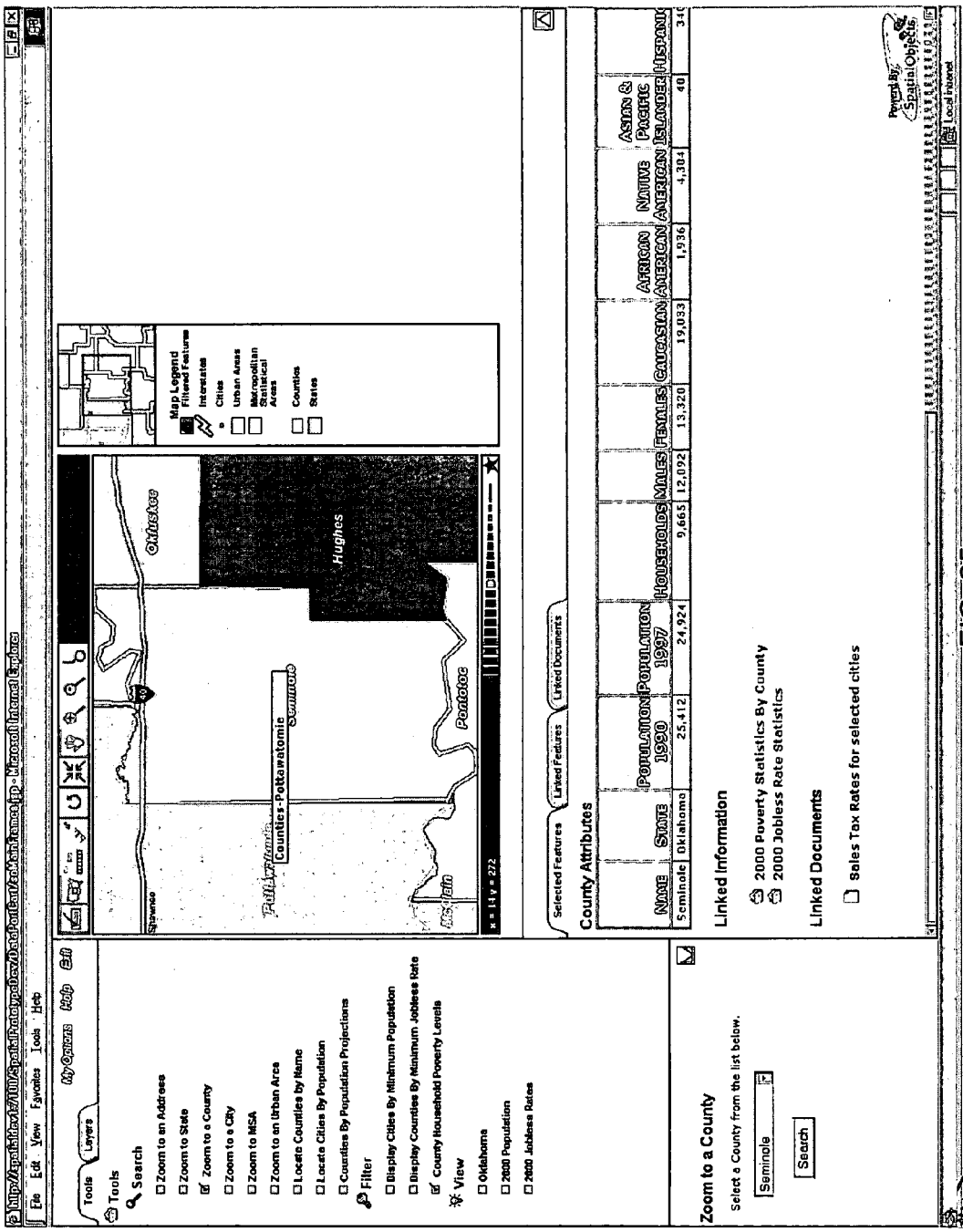

FIG. 25 depicts an example of both linked datasets and linked documents. In this example, selection of Seminole County causes the filter query results to be presented for the matching data set attributes, the linked datasets, and the linked documents.

Figure 26:
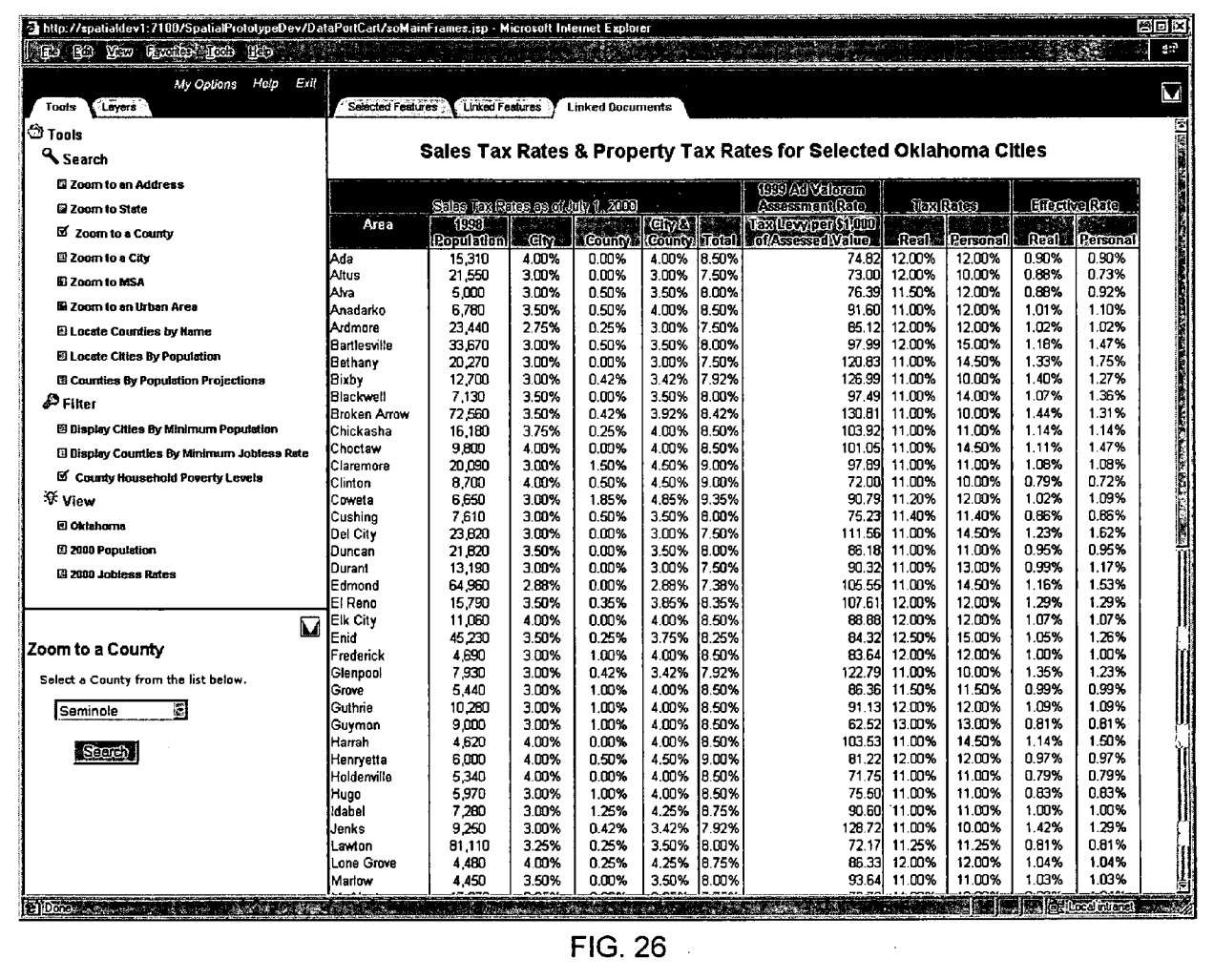

FIG. 26 depicts an example in which a linked document was selected from the filter query results of FIG. 25. In the example of FIG. 26, the sales tax rates for selected cities document was selected causing the document to be displayed in the linked documents tab.

Figure 27:
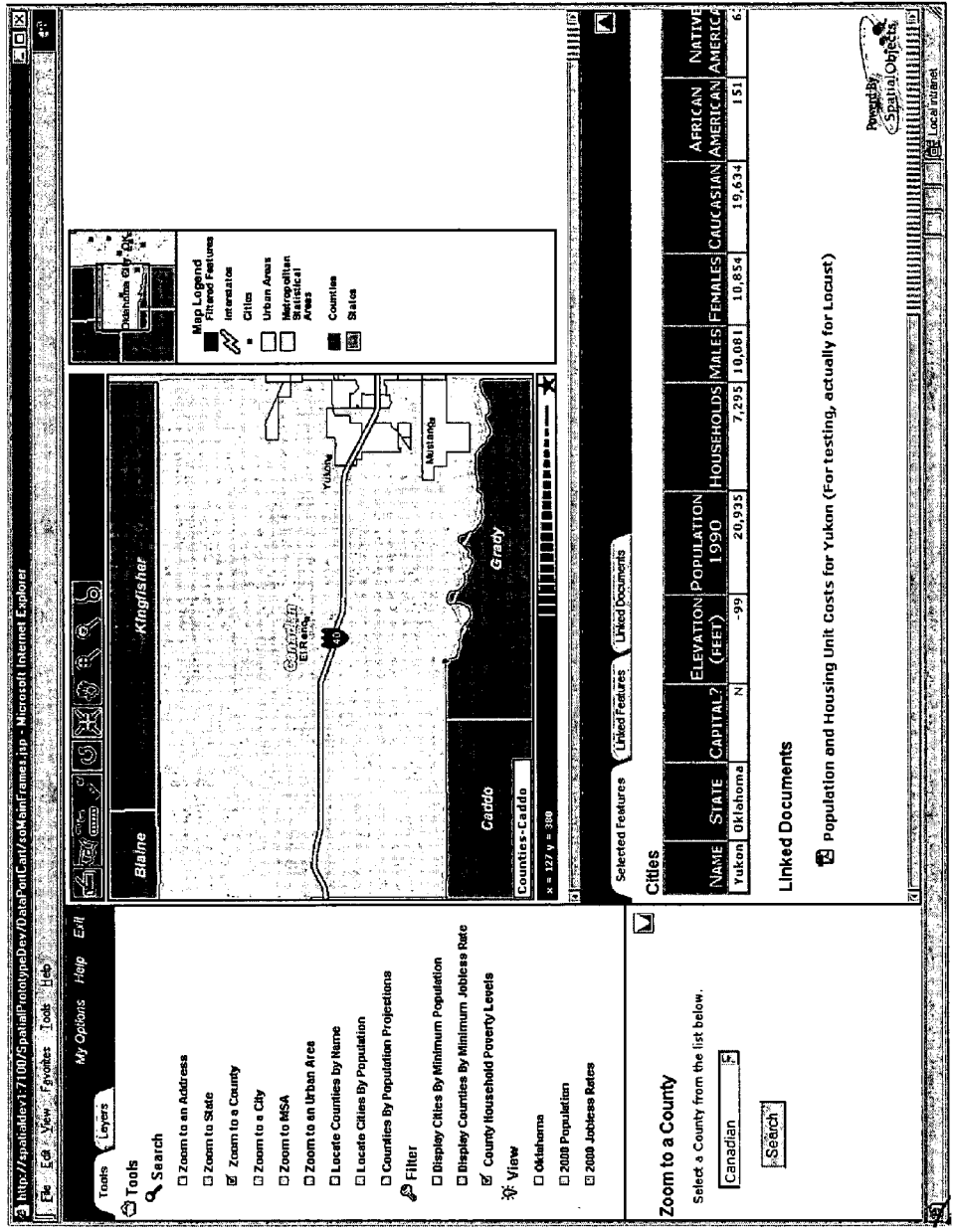

FIG. 27 depicts an example in which multiple different types of documents are supported as linked documents. In the example of FIG. 27, a PDF document is provided as a linked document. Other document types, including spreadsheets, word processing documents, HTML documents, CSV files, and other document types are supported.

Figure 28:
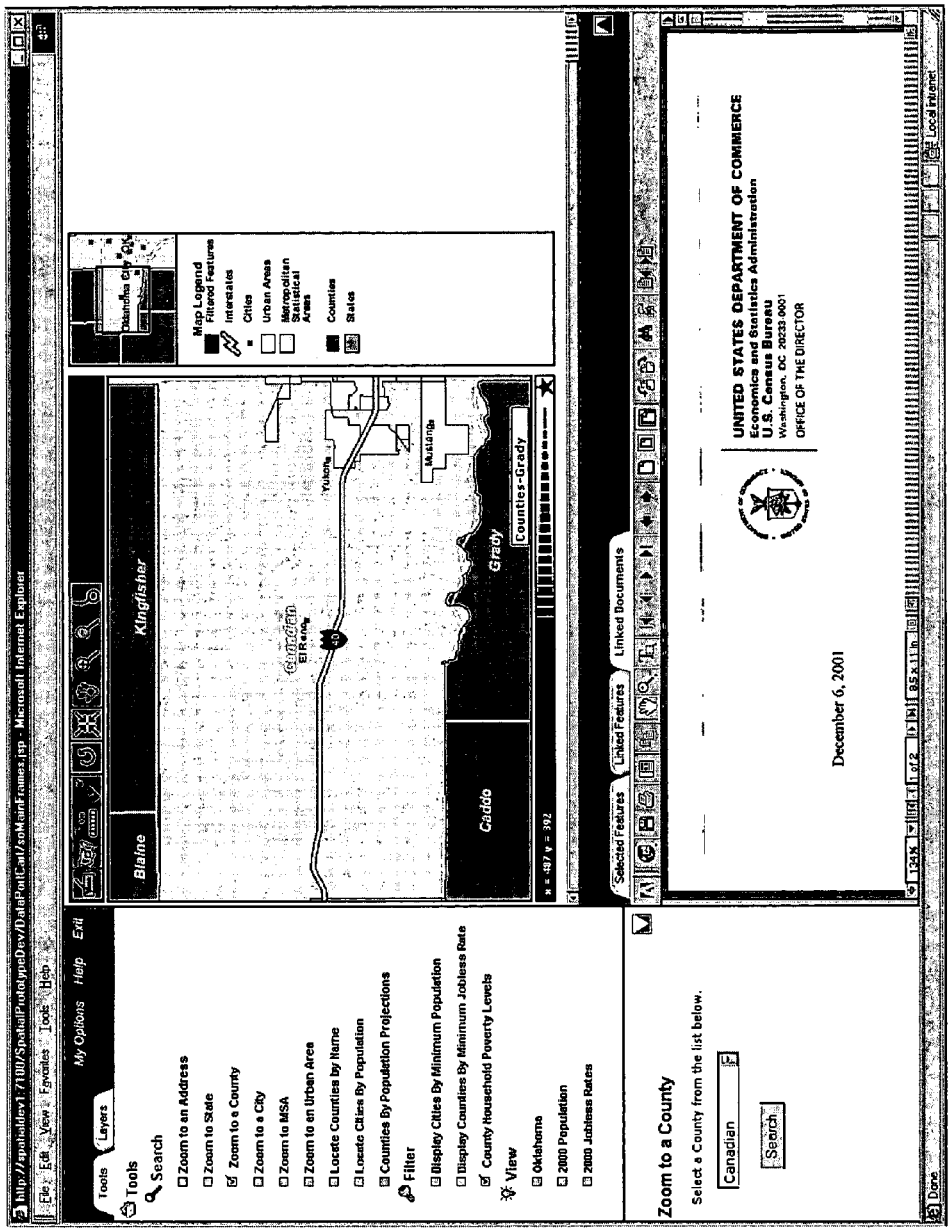

FIG. 28 depicts an example in which a PDF document is selected. The PDF document is displayed in the linked documents tab.

Figure 29:
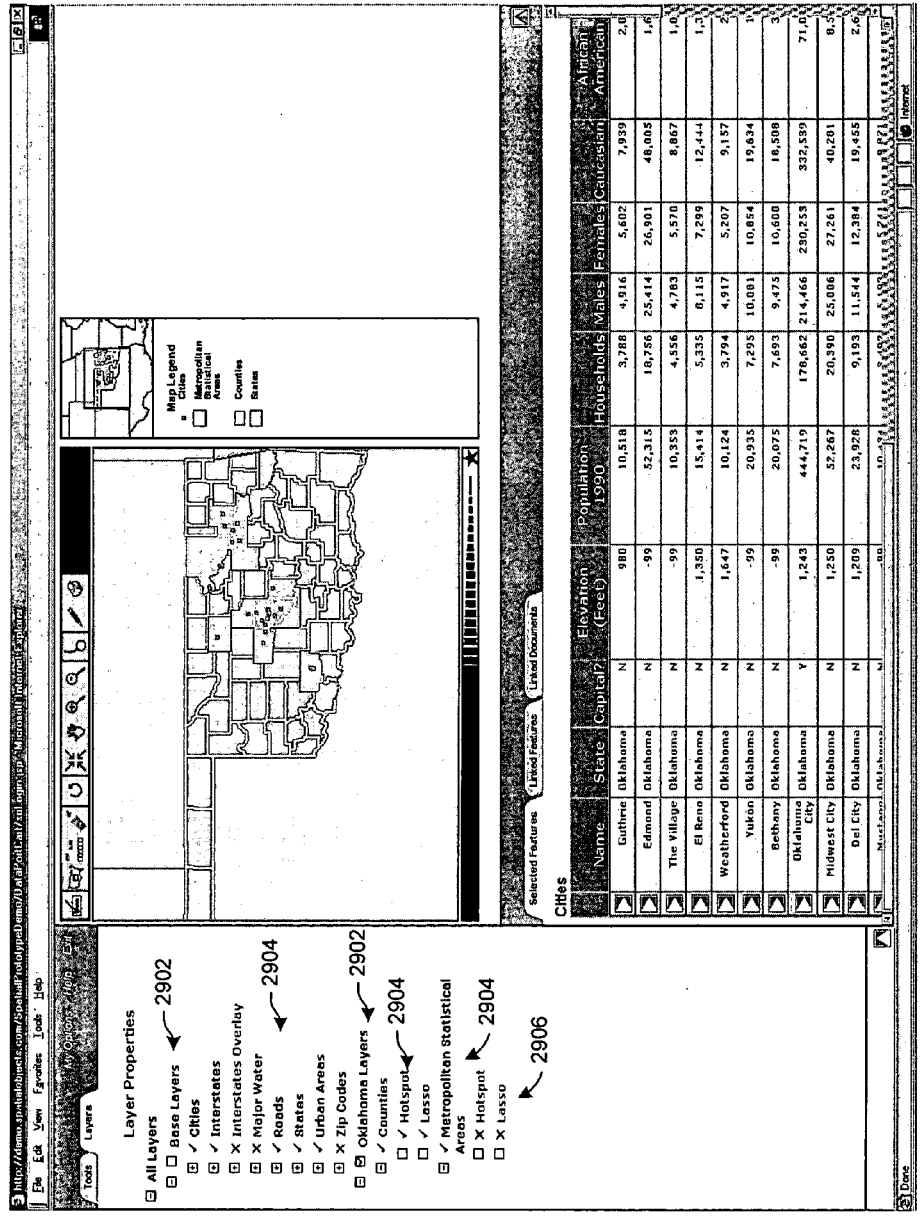

FIG. 29 depicts an embodiment of a layers tab configuration. The layer configuration may be different for each application. In the example of FIG. 29, the layer configuration includes layer groups 2902, layers 2904, and layer properties 2906. The layer groups 2902 are configured groupings of layers. A layer 2904 may be selected to enable the layer, if disabled, or disable the layer, if enabled. Likewise, the layer properties 2906 may be selected to enable the layer property, if disabled, and to disable the layer property, if enabled.

Figure 30:
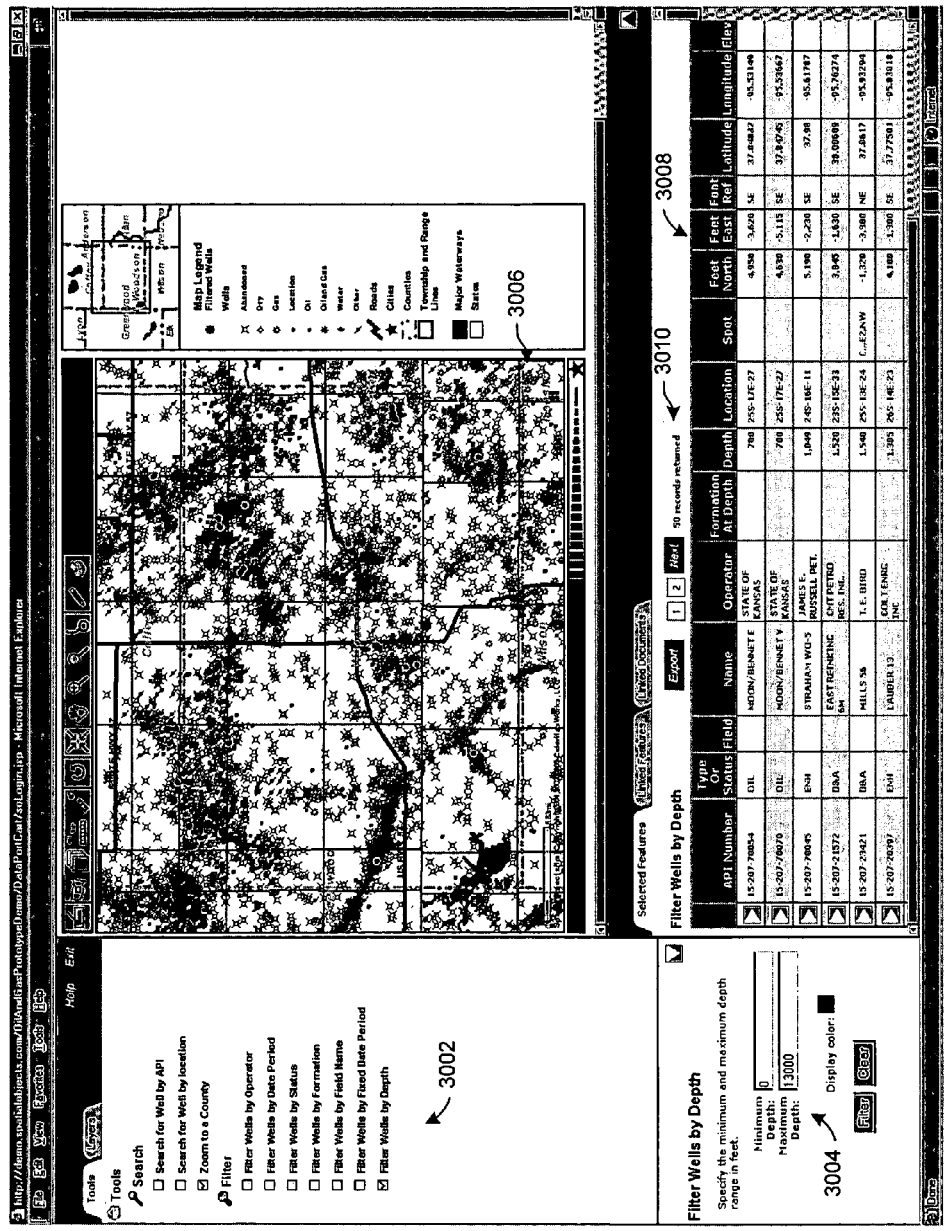
Figure 31:
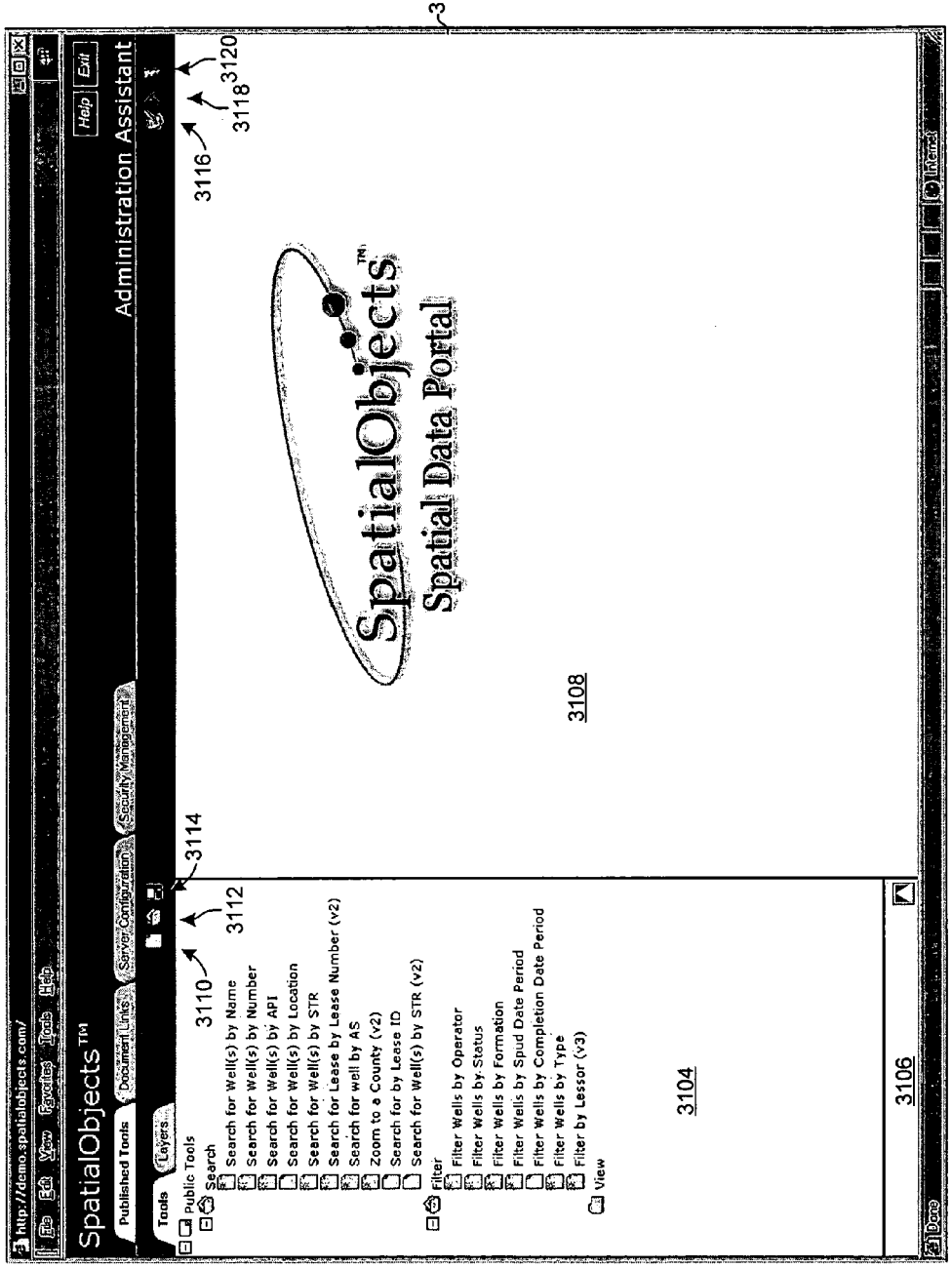
FIGS. 31-55 are screen diagrams of an administrative assistant of a user interface for a spatial system in accordance with an embodiment of the present invention.

FIG. 30 depicts another application in which disparate datasets are spatially linked. The example of FIG. 30 depicts an application for oil and gas wells. The tools 3002 include spatial search tools and spatial filter tools for identifying oil and/or gas wells. The query tool input 3004 depicts an example of multiple inputs that can be entered for a filter wells by depth filter. The results of the filter query are depicted in the map image display 3006 with the matching features identified by a selected color. It will be appreciated that feature designations other than a specific color may be used. The data attributes matching the selected features are depicted in the selected features tab of the feature display frame 3008. Linked datasets and linked documents also may be provided. In the example of FIG. 30, the first fifty records are returned, and the next group of records may be selected by selecting the Next button.

FIGS. 31-55 depict an exemplary embodiment of an administration assistant used for creating spatial tools and user interfaces and for further defining linked datasets and features. The examples of FIGS. 31-55 depict an administration assistant 3102 for an oil and gas application. However, the administration assistant 3102 may be used for other applications, including a population statistics application and other applications in which disparate datasets are spatially linked using a spatial layer.

The administration assistant 3102 is used to create public tools identified in the tool selection frame 3104, including spatial search tools, spatial filter tools, and spatial view tools. After a tool is created, a tool may be selected, and the tool's input is presented in a tool prototype input frame 3106. Tools that are being created or edited are presented in a tool configuration frame 3108.

The administration assistant 3102 has command buttons that enable a user to create, modify, or delete tools. A new tool button 3110 enables a user to create a new tool. An import tool definitions button 3112 enables a user to import tool definitions from other sources into the current tool definitions. An export tool definitions button 3114 enables a user to export one or more tool definitions from a current tool definition to another source, such as to an XML file.

An edit tool button 3116 enables a user to modify an existing tool. A delete tool button 3118 enables a user to delete a currently designed tool. In one embodiment, if a tool is published, the tool must be unpublished/revoked before it can be deleted. A published/revoked tool button 3120 enables a user to publish a tool for general use or to revoke a published tool from general use.

Figure 32:
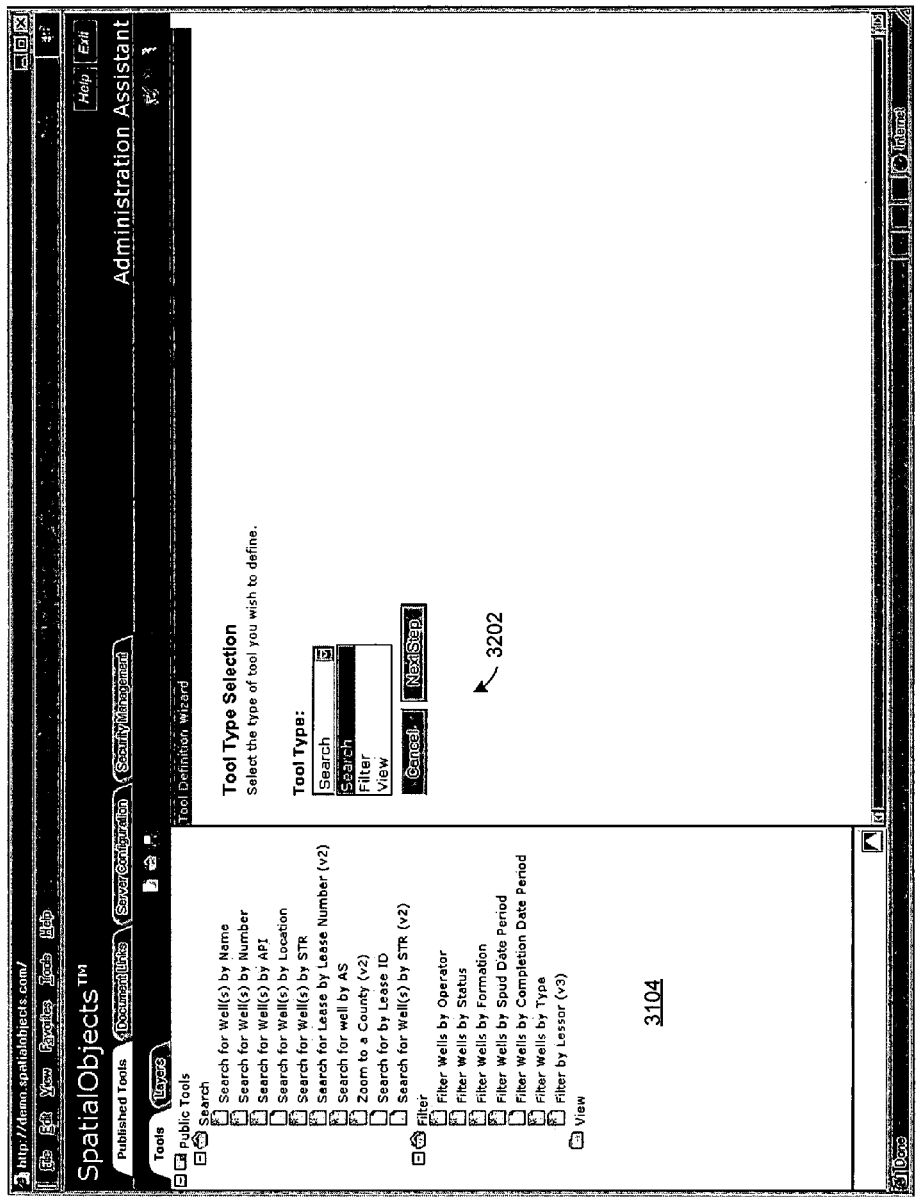

FIG. 32 depicts an example of different tool types and how the tool types are selected to create a new tool or to modify an existing tool. The type of tool may be selected from a tool type drop-down list 3202 in the example of FIG. 32. The defined tool types then may be depicted in the tool selection frame 3104, including a search tool list, a filter tool list, and a view tool list.

Figure 33:
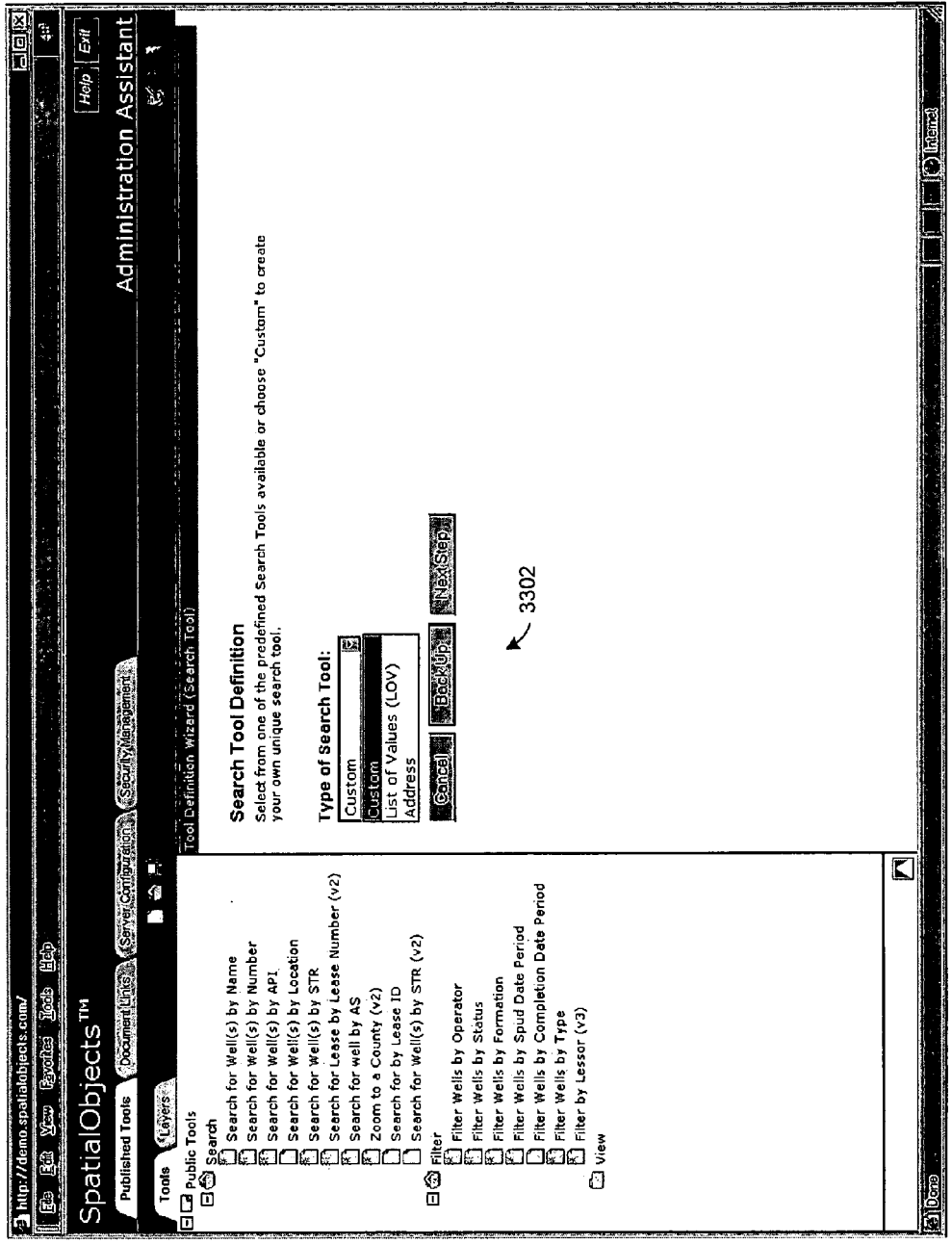

FIG. 33 depicts a screen in which a search tool type is defined for a search tool using a search tool type drop-down list 3302. The search tool type drop-down list 3302 enables a user to select the type of search tool to be created. In the example of FIG. 33, search types include custom, list of values (LOVs), and address. Custom search tools enable a user to create a spatial query that can incorporate data from spatial layers and disparate datasets. LOVs produce a drop-down list of values from a data field of a spatial layer. Address search tools enable a user to locate a geographic point based on entry of an address or a partial address.

Figure 34:
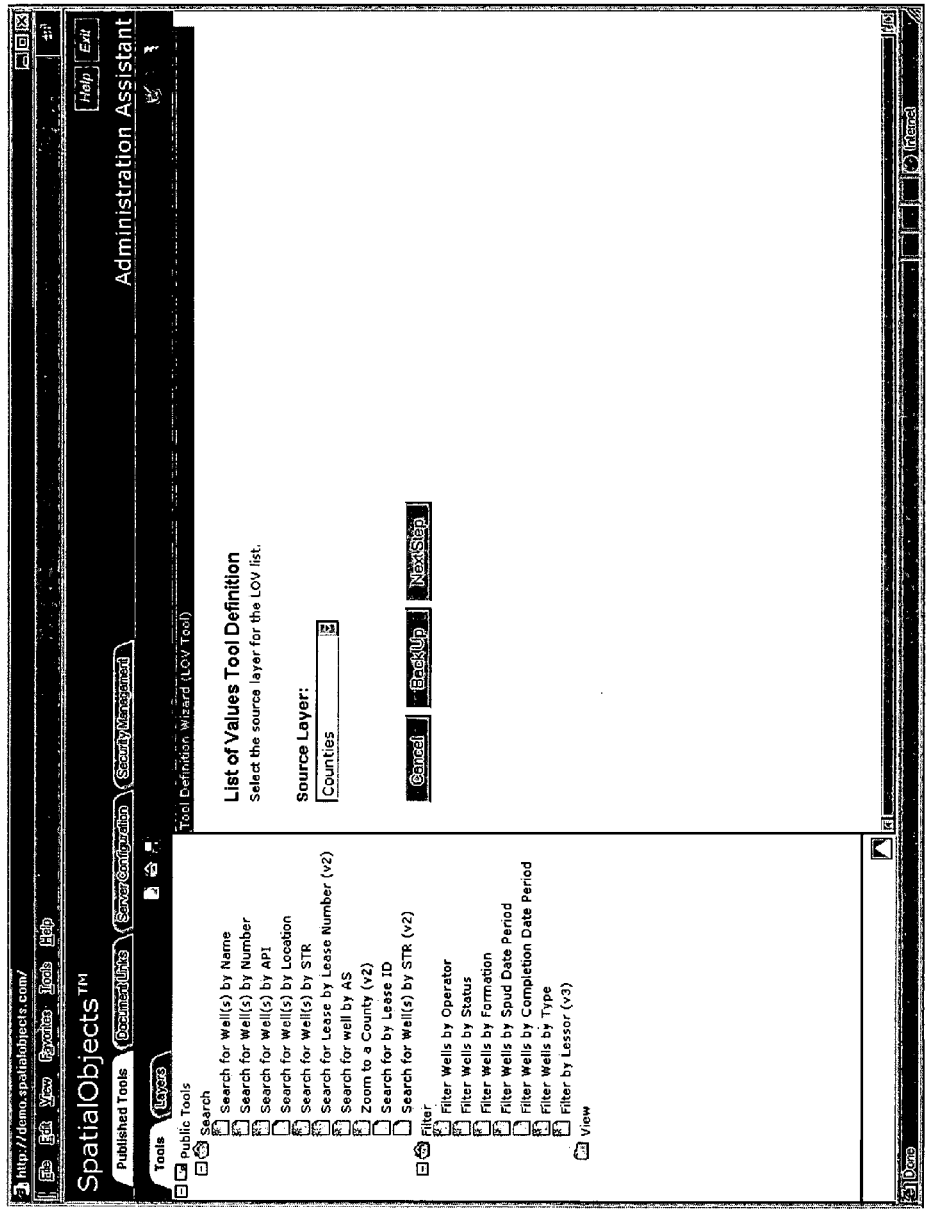

FIG. 34 depicts a screen that enables a user to define a source layer for an LOV tool. In the example of FIG. 34, a user may select a source layer from a drop-down list for selection of the layer that will be used as the source of data for the LOV tool.

Figure 35:
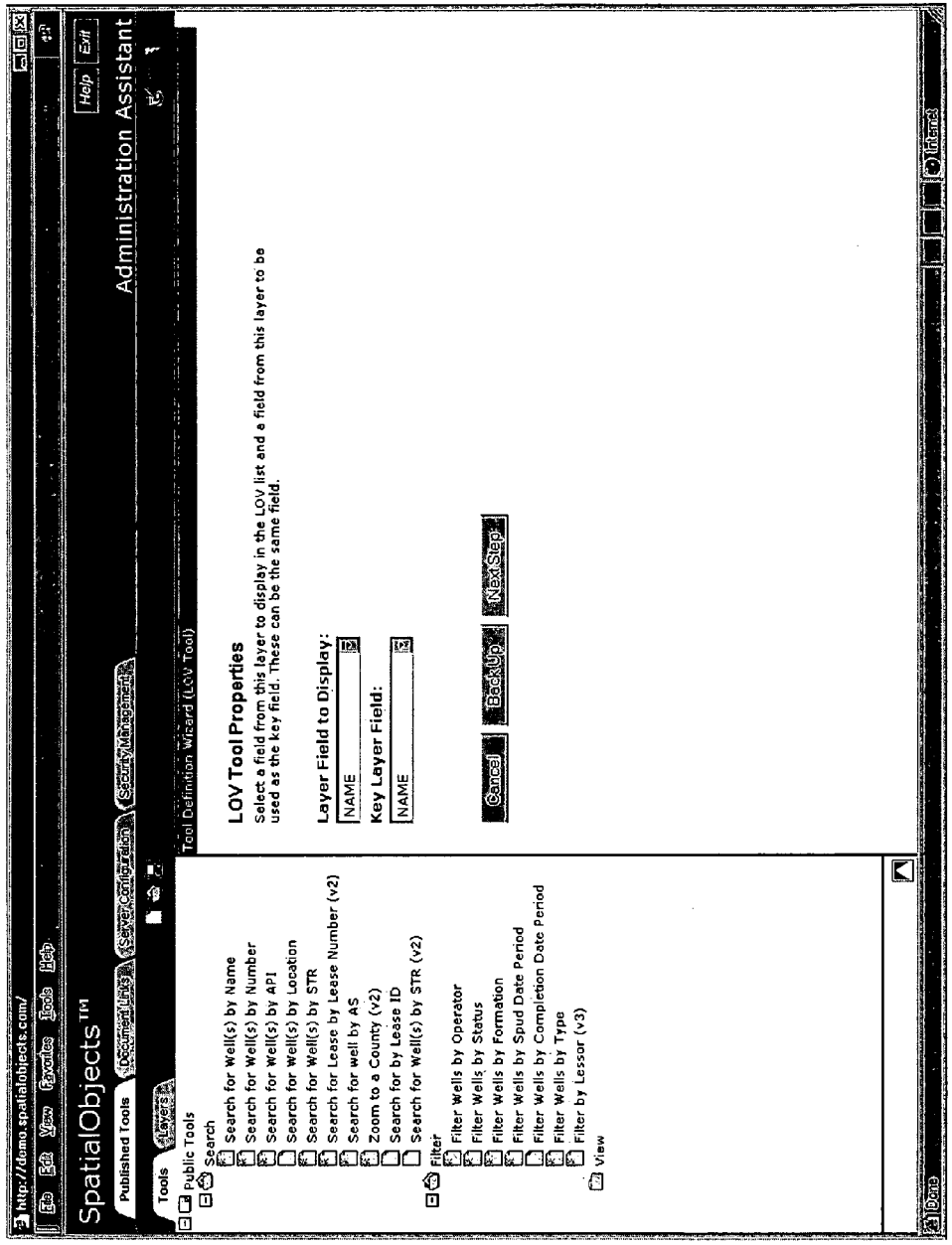

FIG. 35 depicts a screen that enables a user to select the data field to be used for display for the LOV tool and the data field to be used as a key value for a search. The drop-down lists include all of the fields of the previously chosen layer. The drop-down lists are used to select the data field to display to the user in the LOV list and the data field to be used when querying the spatial layer for a query match.

Figure 36:
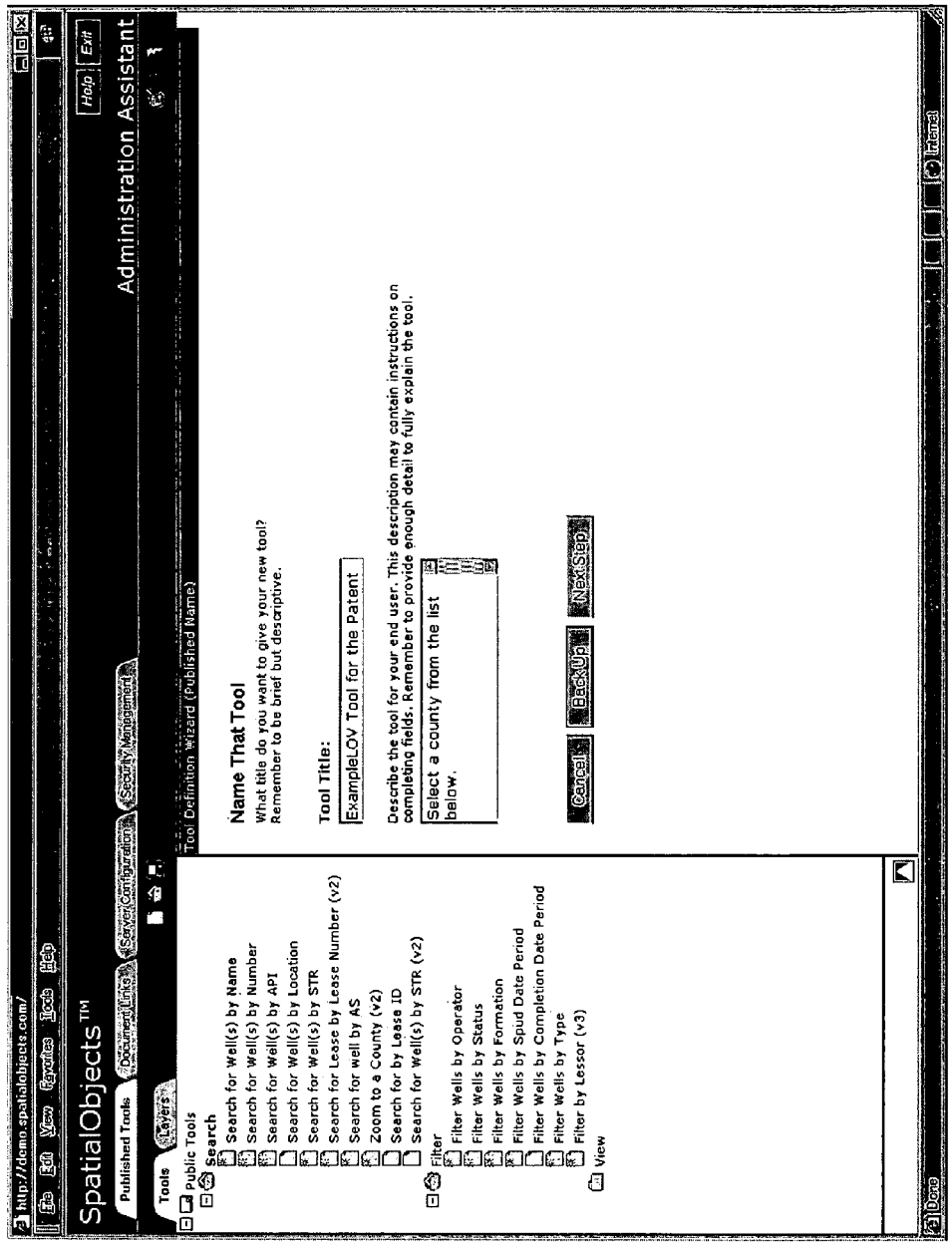

FIG. 36 depicts a screen that enables a user to provide a title and a description of the tool. Instructions for the tool's use also can be provided in a description field.

Figure 37:
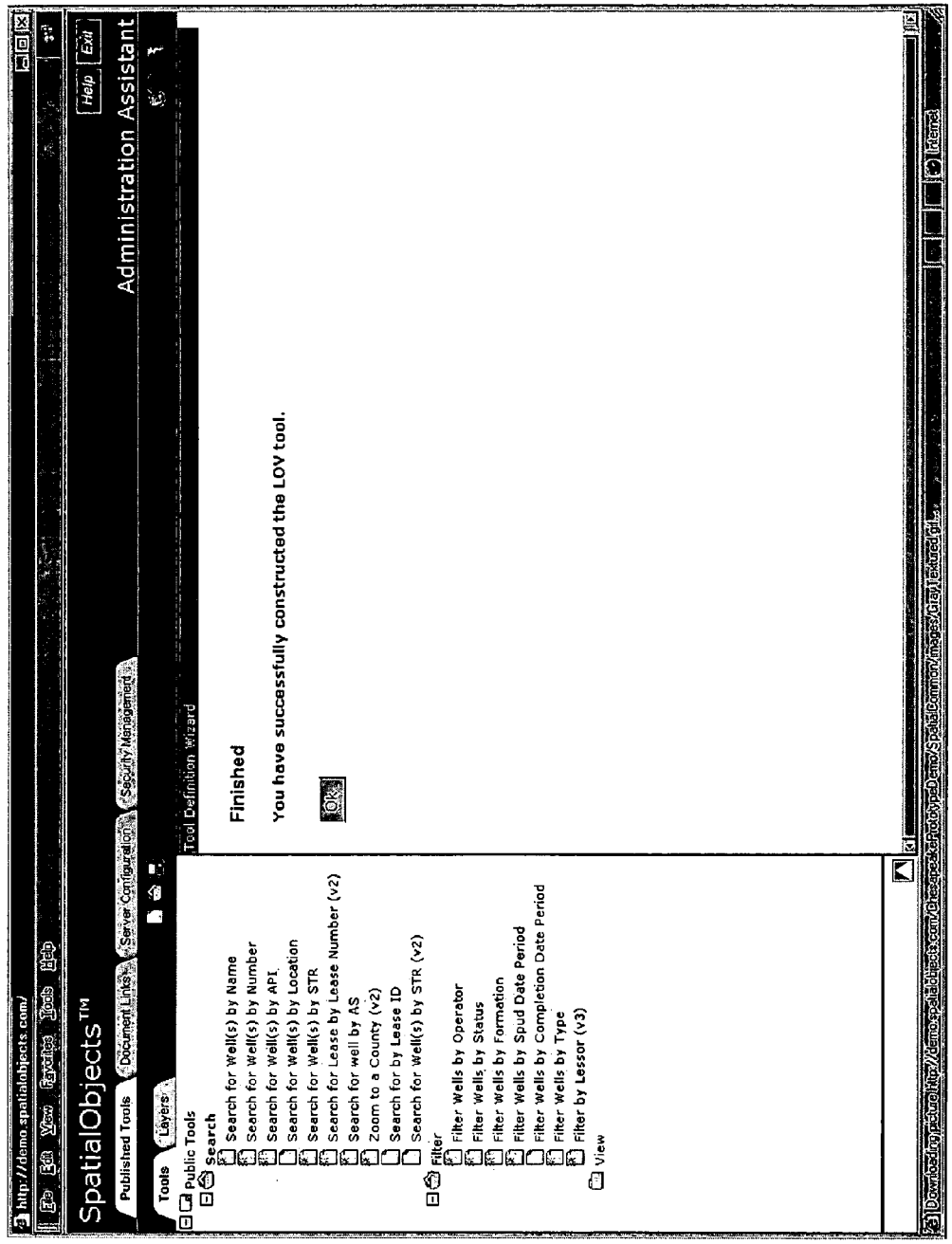

FIG. 37 depicts an exemplary screen used to confirm that the new tool has been created. Selecting the OK button completes creation of the tool.

Figure 38:
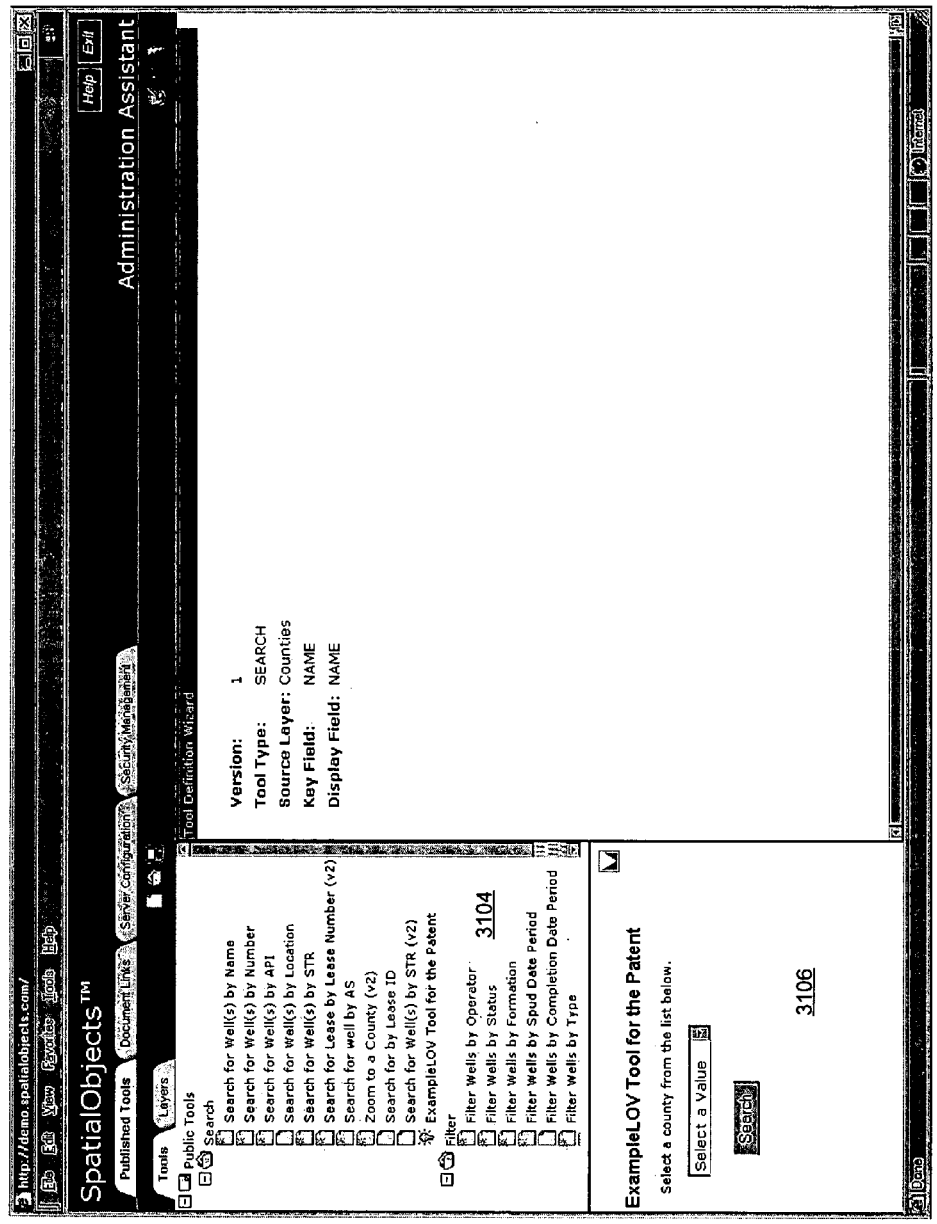

FIG. 38 depicts a screen used to display a summary of a tool's attributes. The summary screen typically is displayed after creation of a tool or when a tool is chosen from the tool selection frame 3104. The tool is grouped by its main tool type, such as search, filter, or view. Selecting a tool from the tool selection menu causes the tools inputs to be presented in the tool prototype input frame 3106. Once the tool is selected, the tool can be tested by entering an input and pressing the search button.

Figure 39:
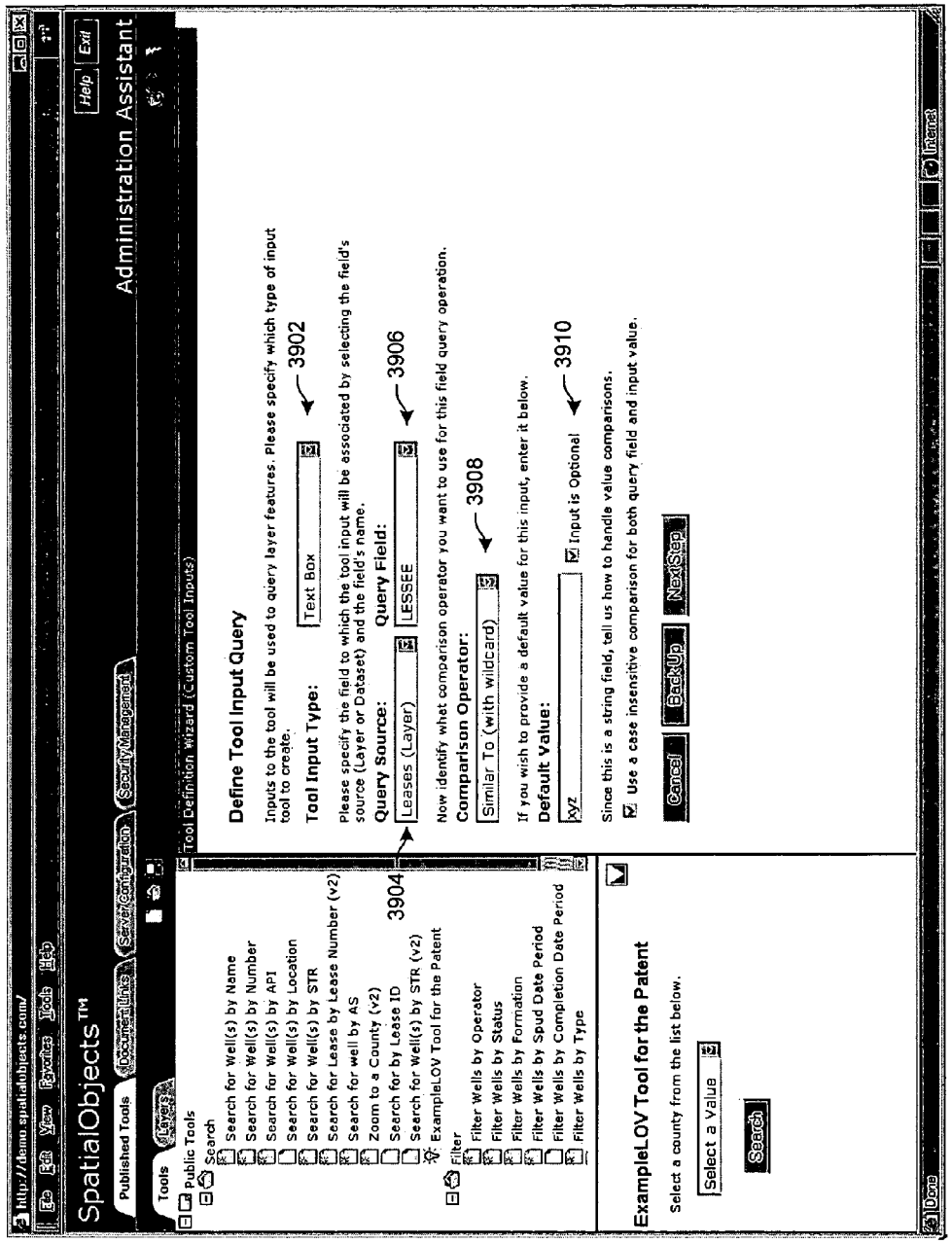

FIG. 39 depicts an exemplary screen used to define a "custom" search tool or a "custom" filter tool drop-down list 3902, which enables a user to select the type of input field that will be used to gather the input from the user. In the example of FIG. 39, the tool input type drop-down list may be either a text field or an LOV. The query source 3904 enables a user to select the source of the field that will be compared to the input value. The query field is designated in the query field list 3906. Sources can be the tool's associated spatial layer or a linked data set. A query comparison type selector 3908 enables a user to select a type of comparison that will be made between the input value and the selected source field. A default value field 3910 enables a user to specify a default input field.

Figure 40:
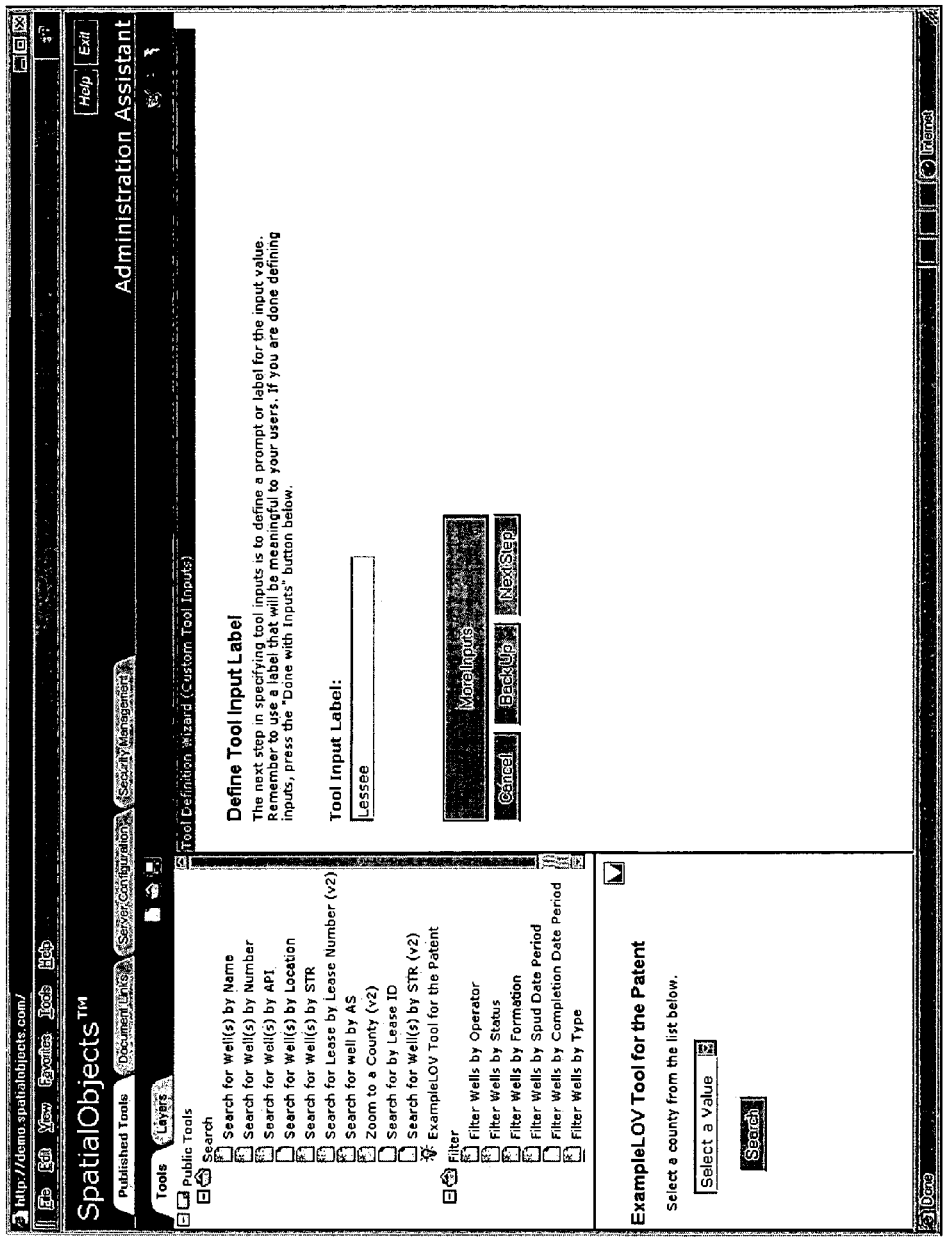

FIG. 40 depicts a screen that enables a user to title individual tool inputs. A prompt or label may be provided.

Figure 41:
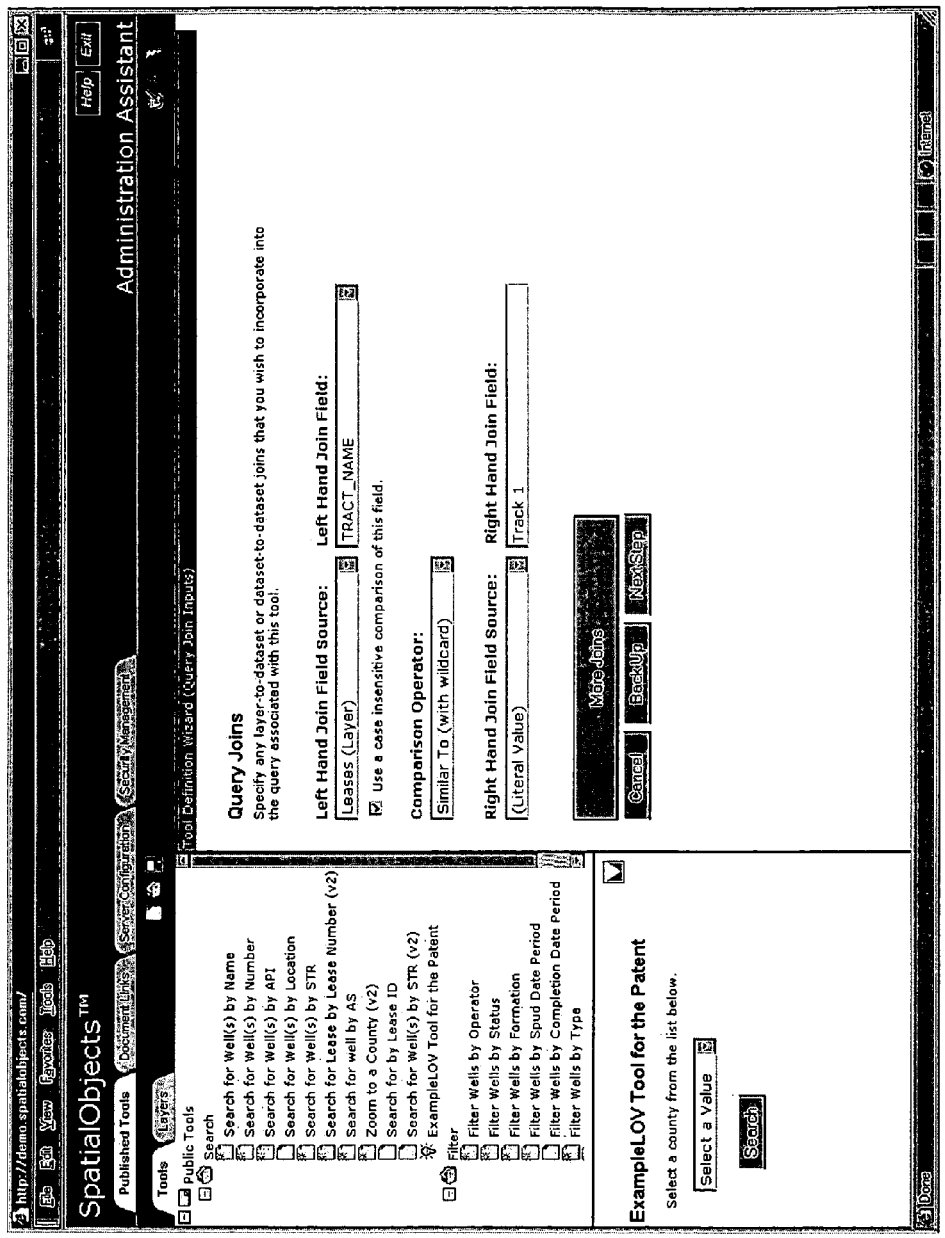

FIG. 41 depicts a screen that enables a user to refine definitions of linkages between a spatial layer and a dataset. A query joins wizard allows the user to join data fields within the tool's associated spatial layer with those of a linked dataset during the query operation to provide a custom linkage between a spatial layer and the dataset. This wizard can also be used to compare a spatial layer field or dataset column to a literal value. In this example, a user selects a layer and a field or a dataset and a dataset field, such as a business table column, for the left hand side of the comparison. The user then selects a comparison operator. A dataset and dataset field or spatial layer and field are selected for the right hand side of the query "where clause" like component.

Figure 42:
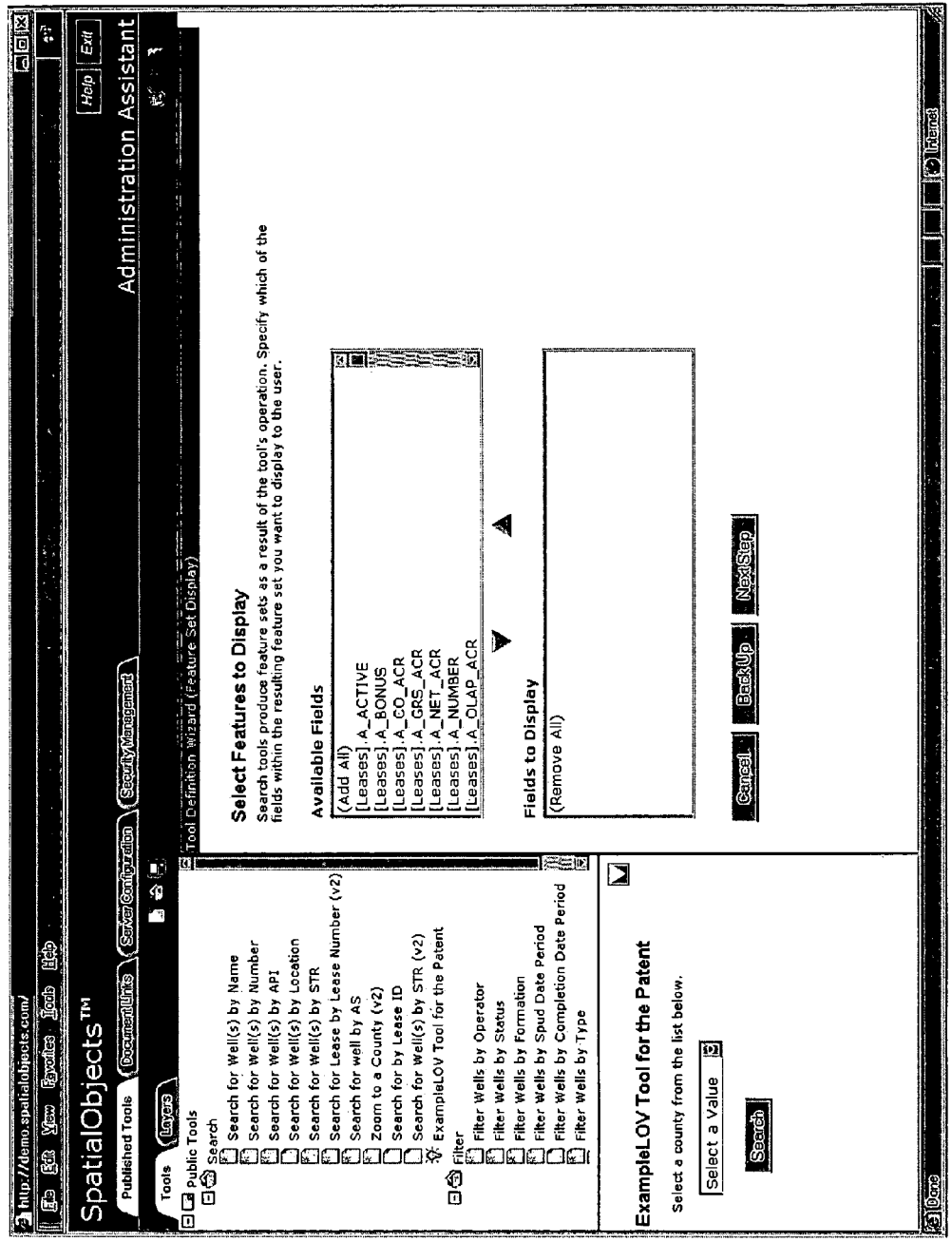

FIG. 42 depicts a screen that enables a user to select data attributes from a selected spatial layer or dataset. The data attributes are displayed to the user when the tool is executed. The available fields initially include all of the data attributes from the tool's associated spatial layer and any datasets that have been linked (joined) as part of the query operation. As data attributes are chosen for display, they are added to the fields to display box.

Figure 43:
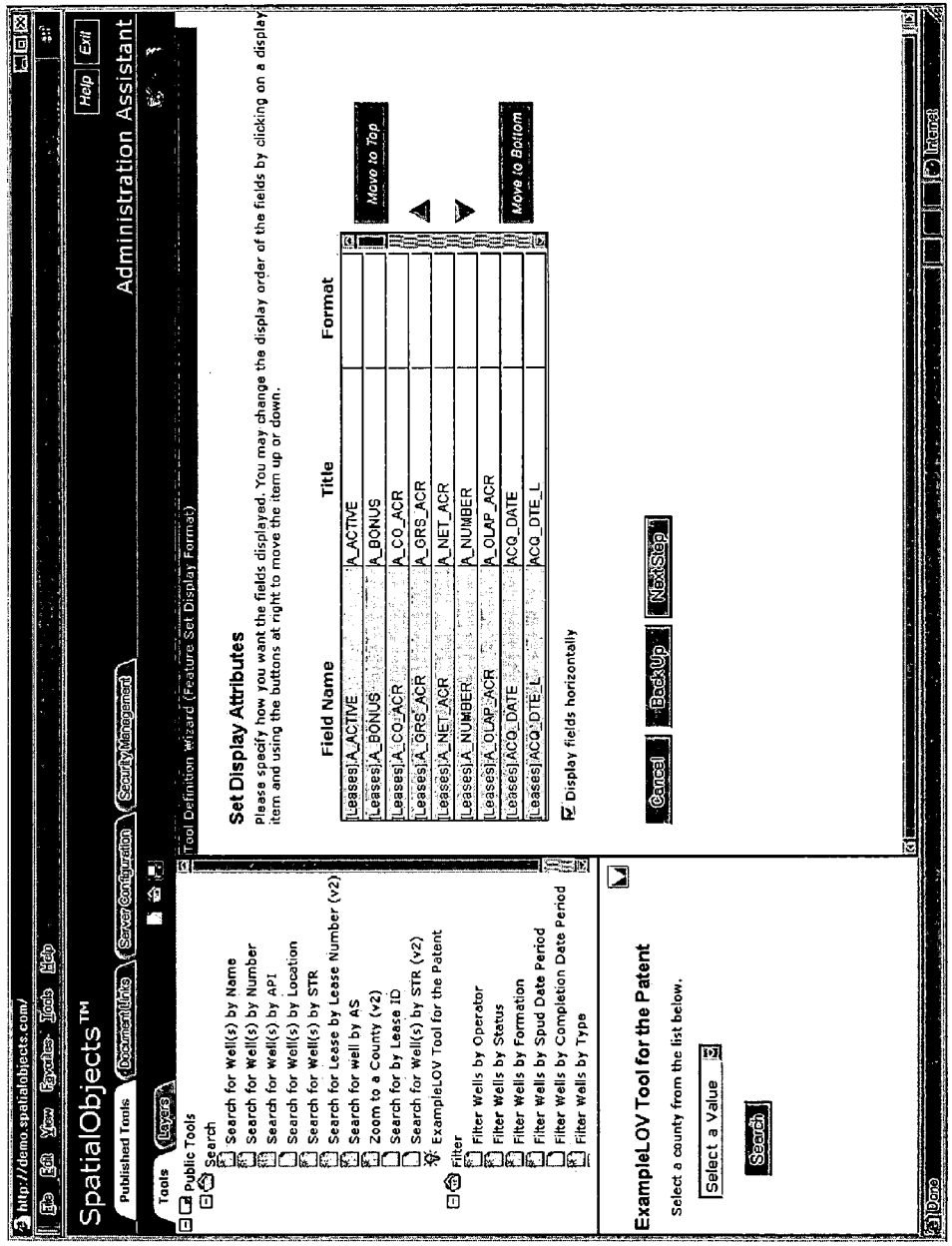

FIG. 43 depicts a screen that enables a user to change titles, assign display formats, and change the display order associated with the data attributes that have been chosen for display. If the data attribute must be displayed in a format other than its native form, the user can enter a display format specification in the format field to alter the formatting of the field. For example, the format field might be used to enter a date format to alter the display format of the date value.

Figure 44:
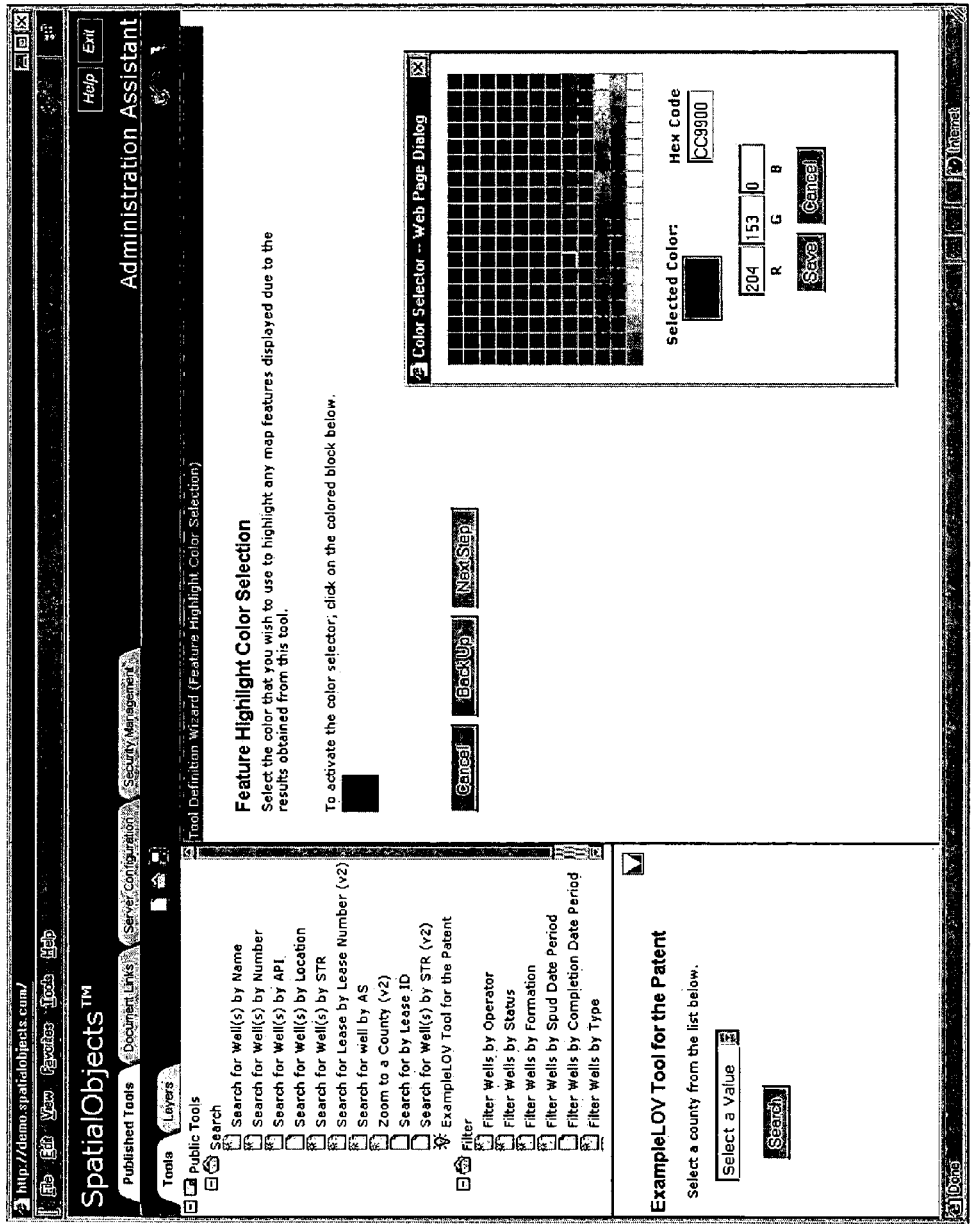

FIG. 44 depicts a screen that enables a user to assign a color to the features selected during execution of the tool.

Figure 45:
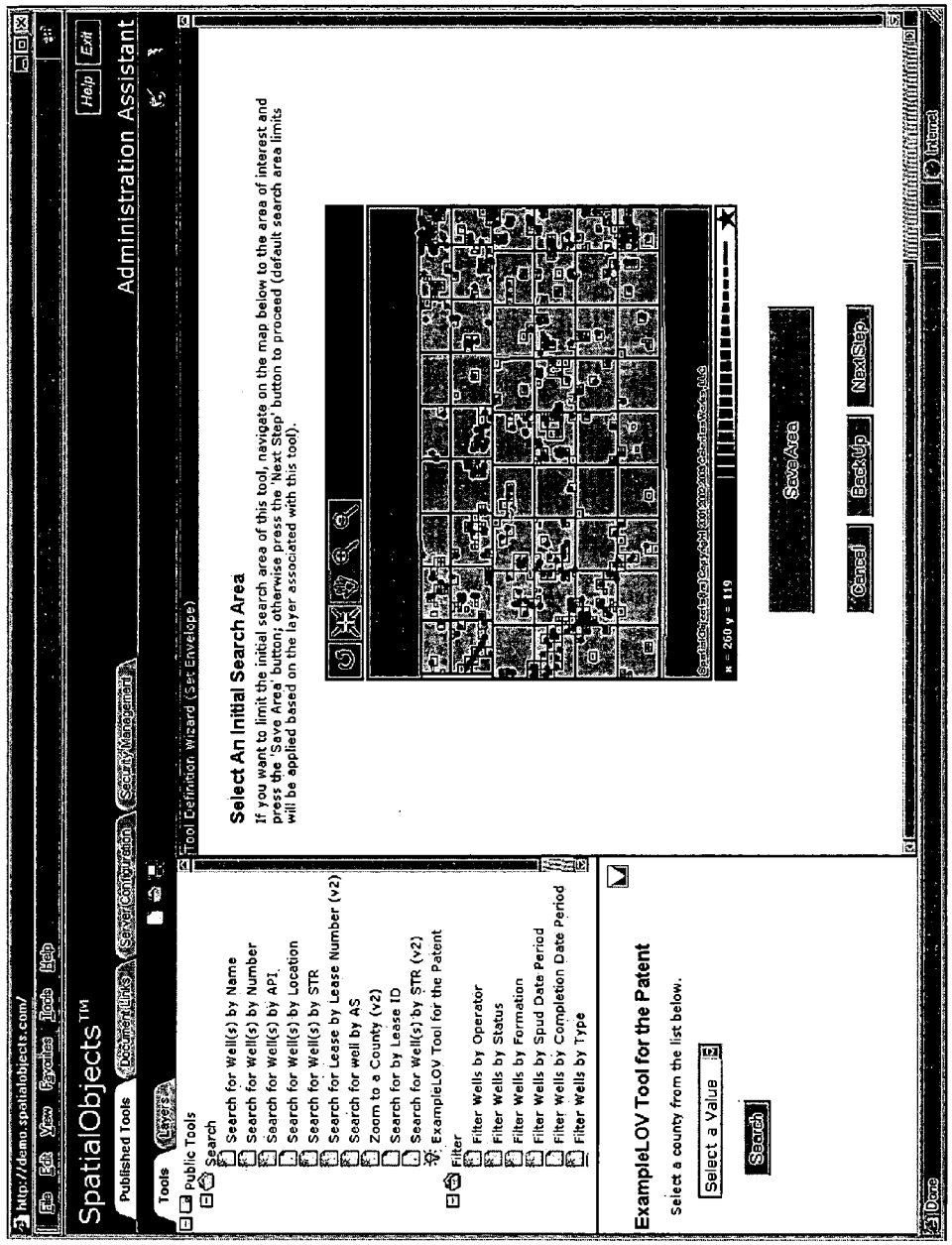

FIG. 45 depicts a screen that enables a user to set the initial map area that will be considered during the execution of the tool.

Figure 46:
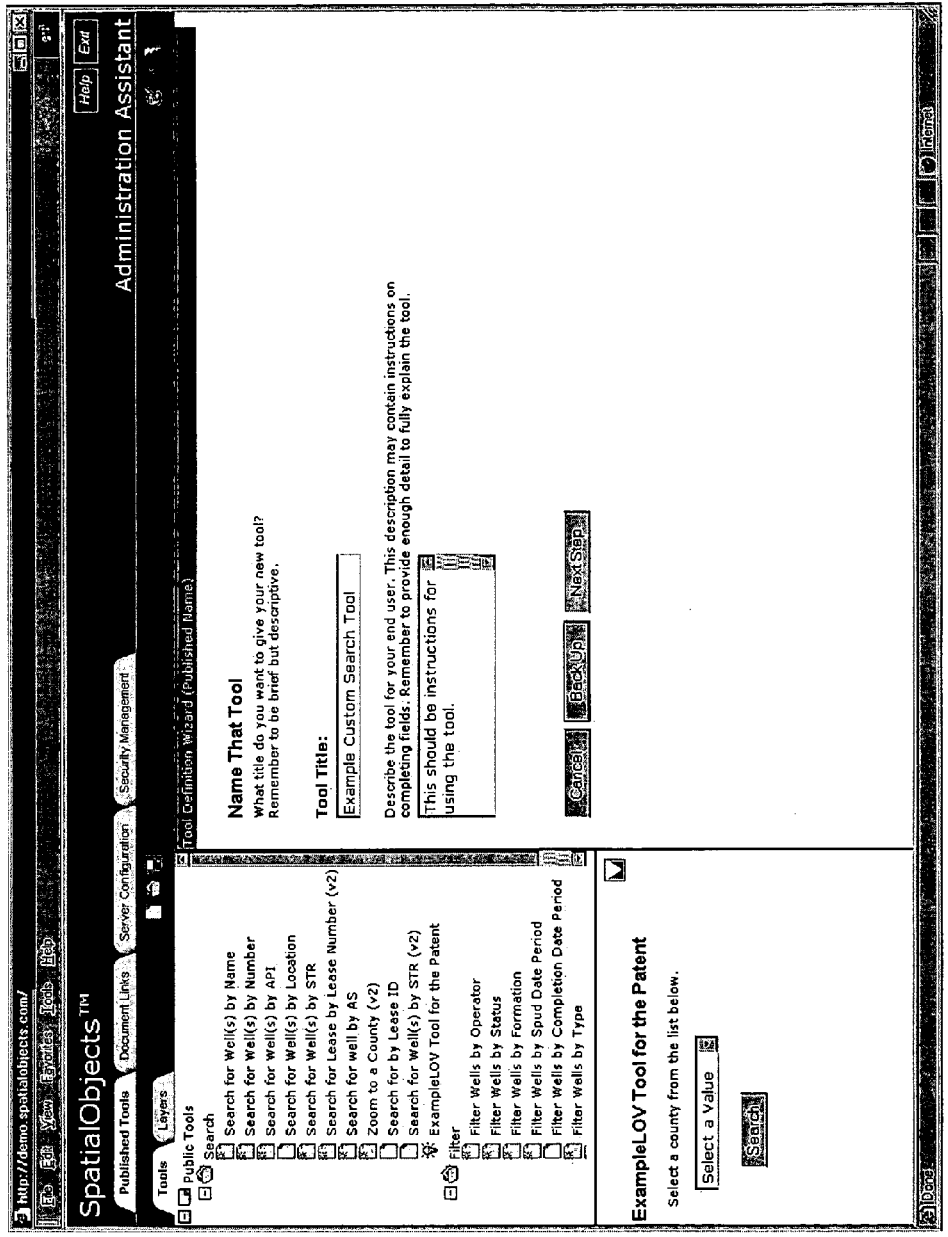

FIG. 46 depicts a screen that enables a user to establish a title for the tool and to provide instructions for the tool's use.

Figure 47:
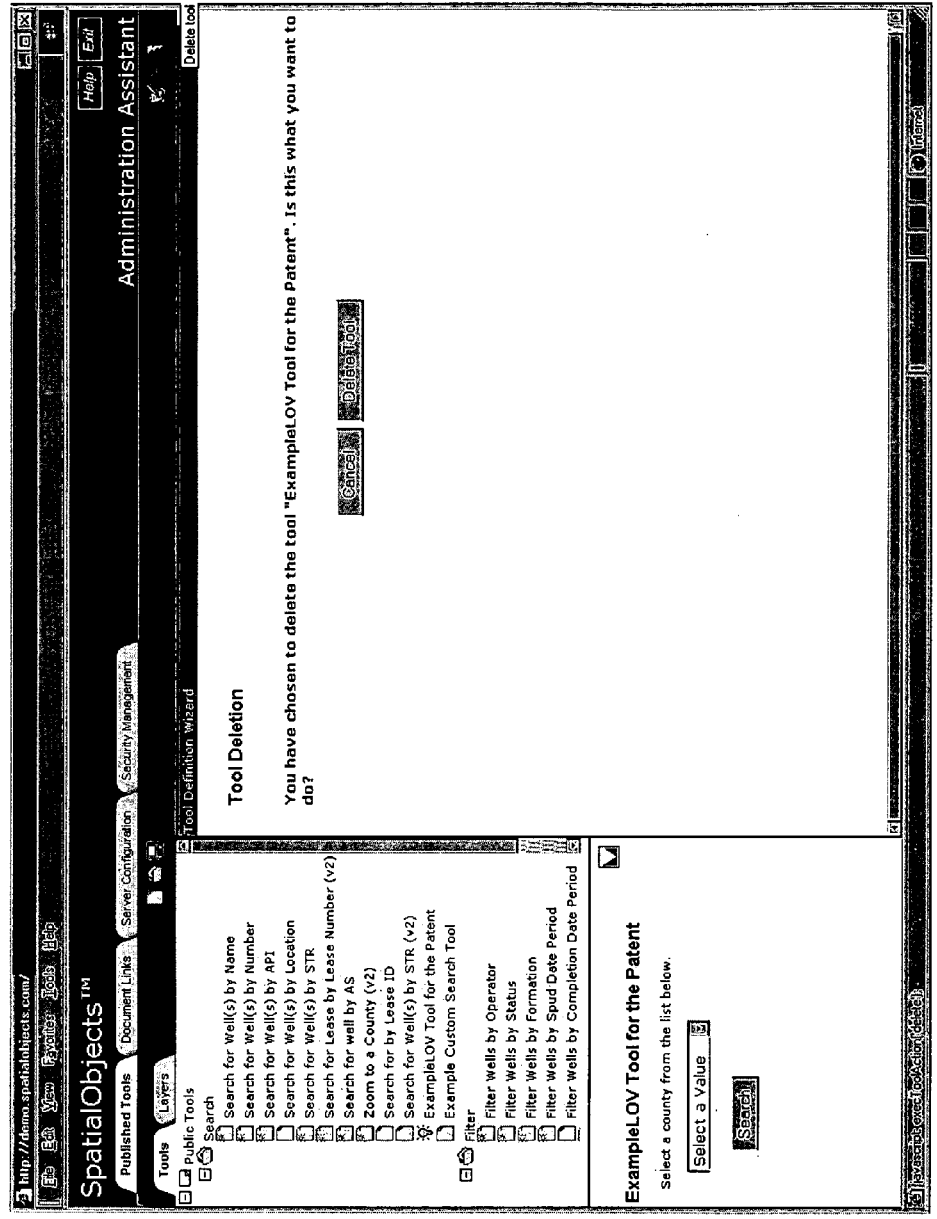

FIG. 47 depicts a screen in which a tool is being deleted.

Figure 48:
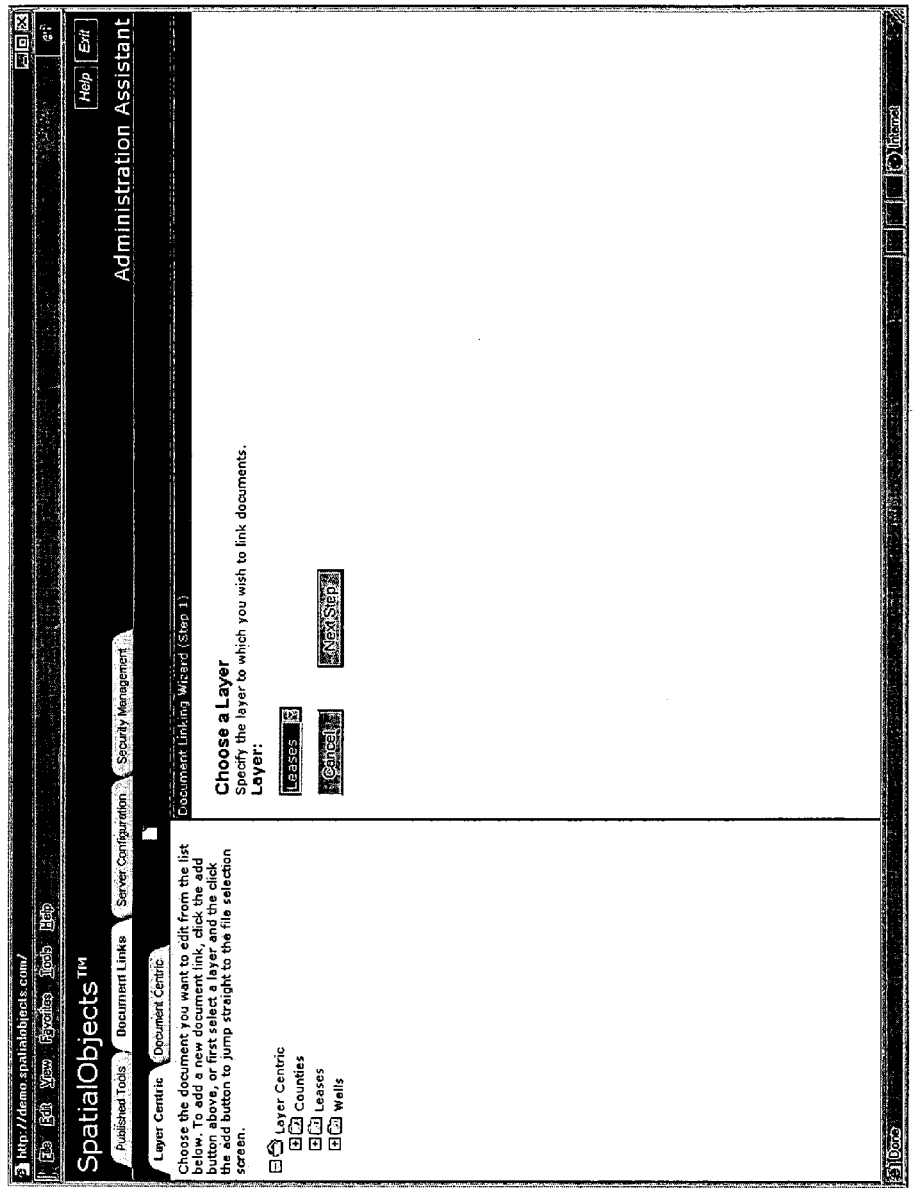

FIG. 48 depicts a screen depicts the initial display of a document linking wizard when the "Document Links" tab is selected in the administrative assistant. Users can manage and view existing linked documents from the Layer Centric or Document Centric tabs. These tabs allow the user to access linked documents from a spatial layer perspective or from a document perspective. The layer centric view allows the user to navigate through a treed menu of layers and features to the documents that have been linked. The document centric view allows a user to navigate a treed menu of documents to the features and layers to which the documents have been linked. New documents can be linked by pressing this New Link button. The layer centric view allows navigation through this tree menu of layers and features to documents linked to features.

Figure 49:
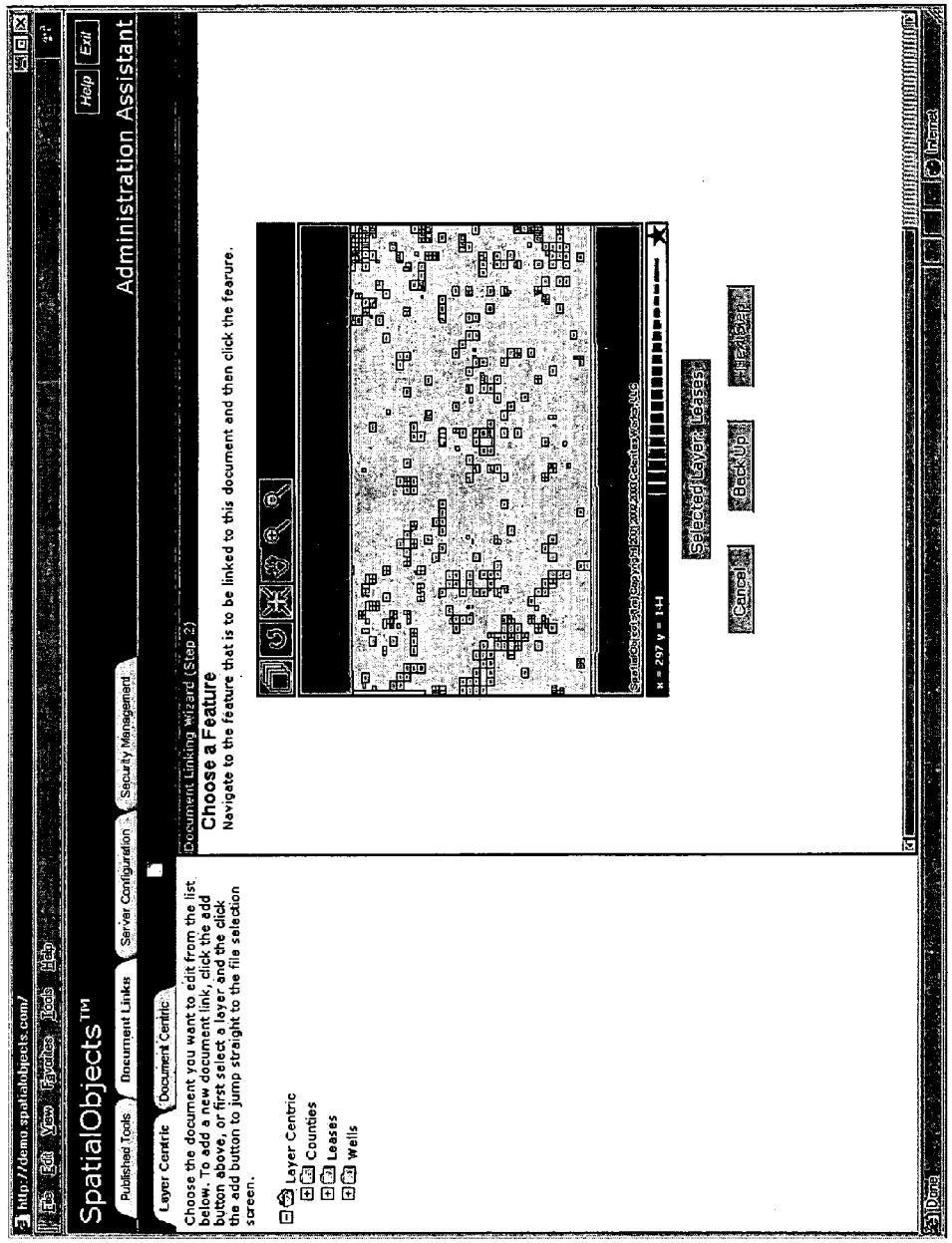

FIG. 49 depicts a screen that enables a user to select the feature to which the document or documents will be linked.

Figure 50:
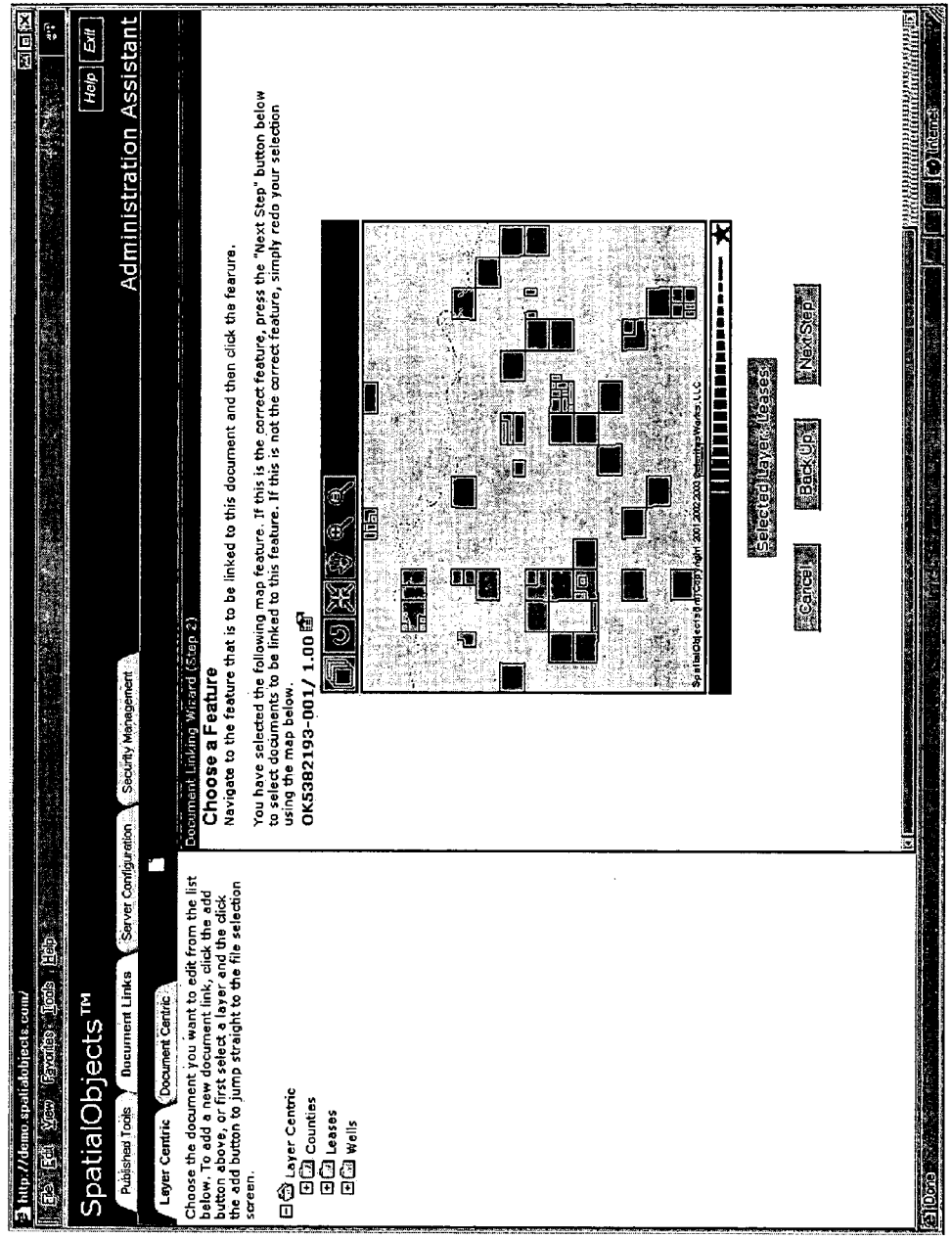

FIG. 50 depicts a screen with a second step for linking a document. Once a feature has been selected, the feature identifier will be shown on this screen. The user can select the feature identifier text to display a pop-up dialog displaying the selected features data attributes.

Figure 51:
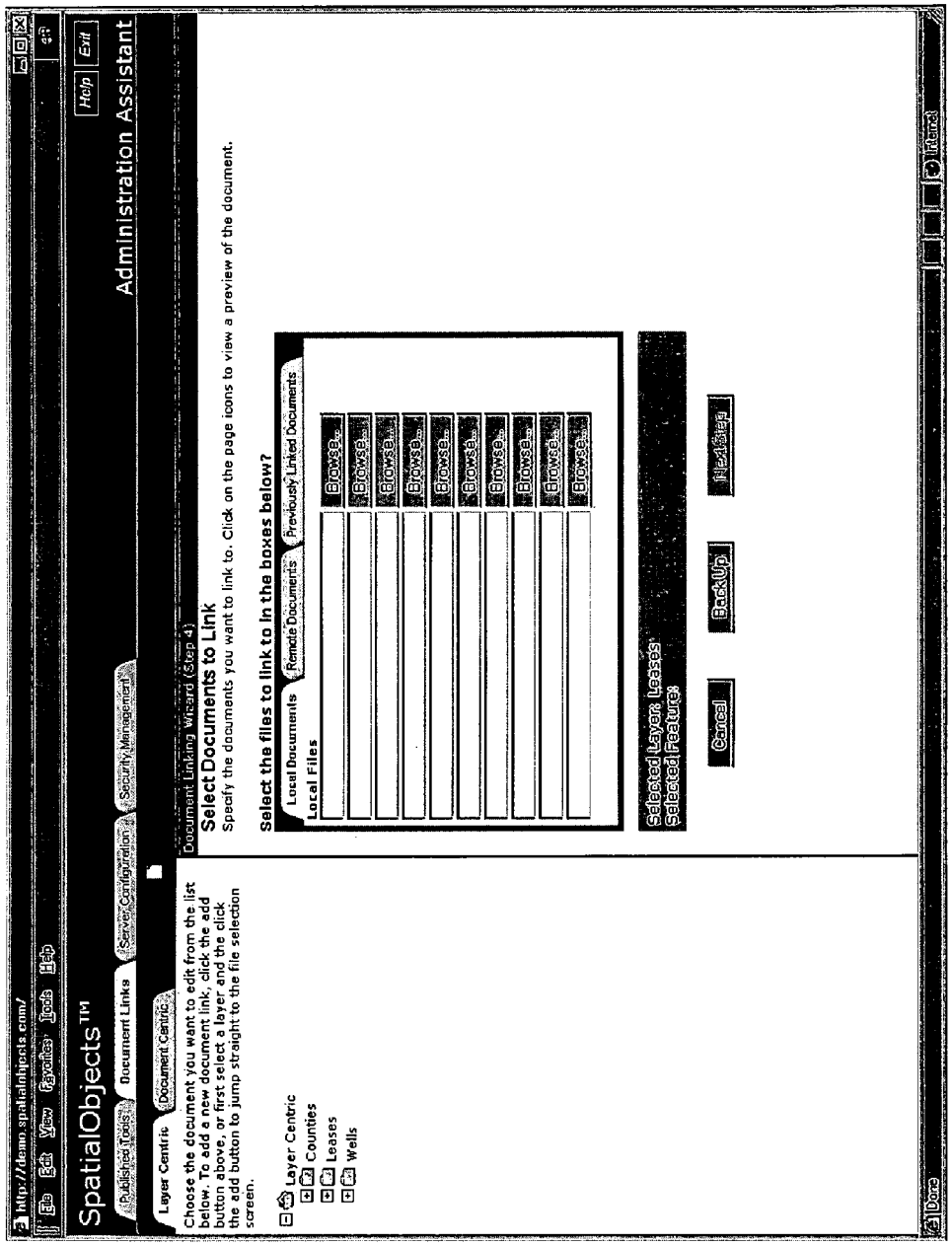

FIG. 51 depicts a screen that enables a user to specify one or more files to be uploaded and linked to the previously selected spatial feature (FIG. 50). Files specified via this page will be uploaded from the user's (client side) system to the spatial processing system 104.

Figure 52:
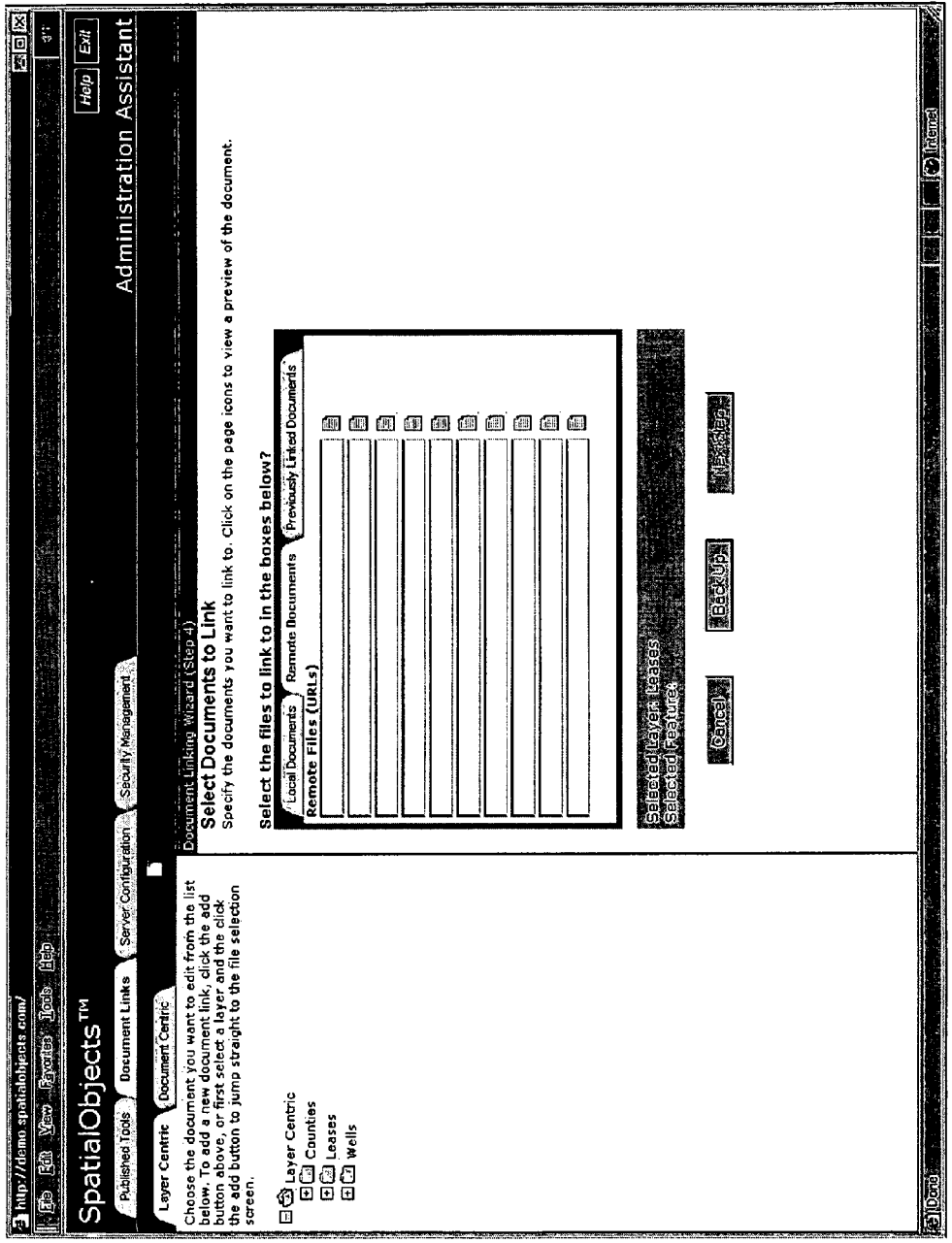

FIG. 52 depicts a screen that enables a user to specify one or more remote files to be linked to the previously selected spatial feature (FIG. 50). In this example, URLs are entered.

Figure 53:
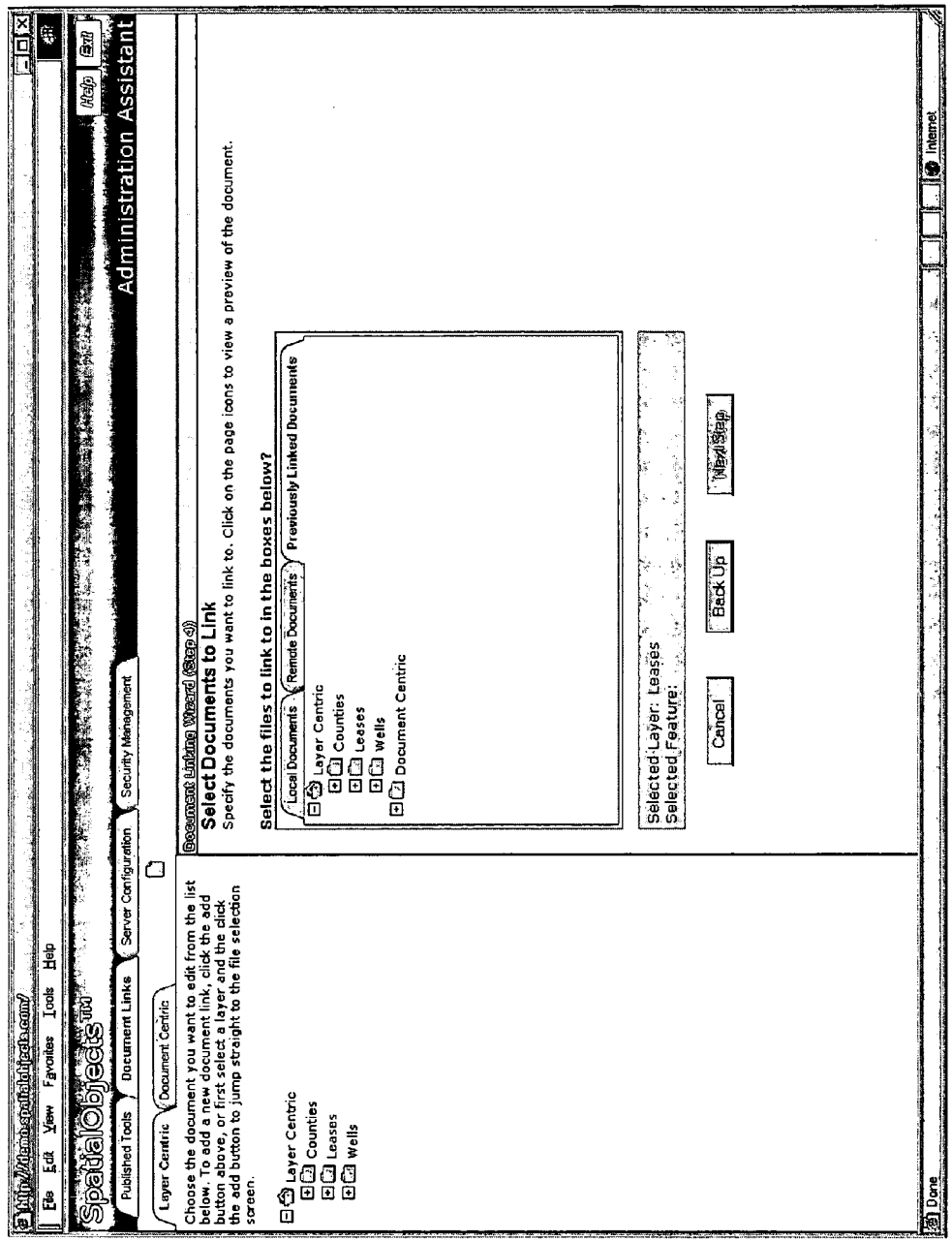

FIG. 53 depicts a screen that enables a user to specify one or more documents (that have already been linked to other features) to be linked to the selected spatial feature. The user may use either the layer centric or document centric trees to navigate to a document that has previously been linked to a feature other than the feature currently selected.

Figure 54:
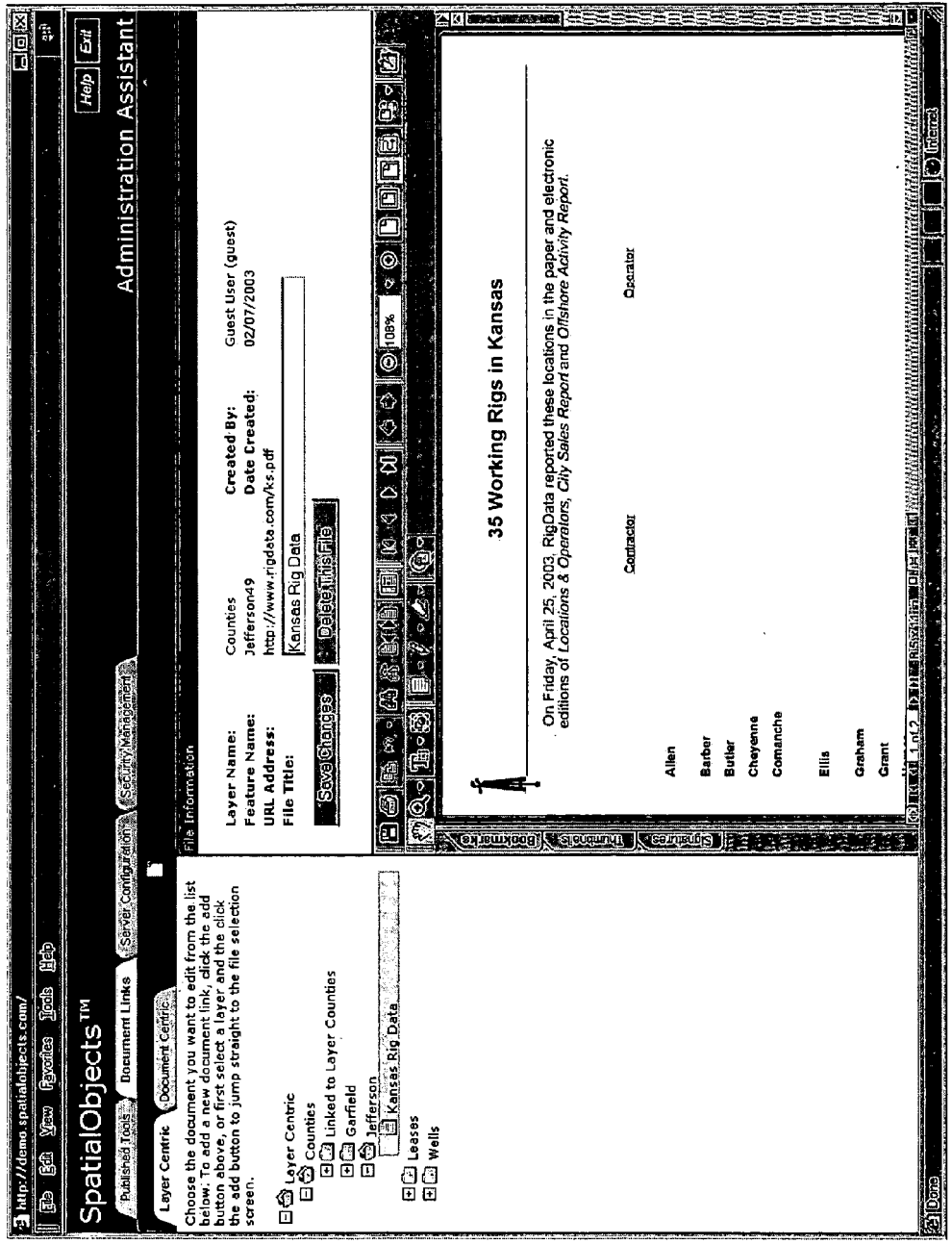

FIG. 54 depicts a screen that displays a selected document and its associated data attributes. The user also can use this screen to alter the document link title or delete the documents link. A document link can be deleted by pressing the "Delete This File" button. In one embodiment, this document was uploaded (not linked via URL) and it is only linked to a single feature, the physical document file will be removed from the system. In another embodiment, if the document is linked to more than one feature or the document is linked via a URL, only the linking information is deleted when this option is selected.

Figure 55:
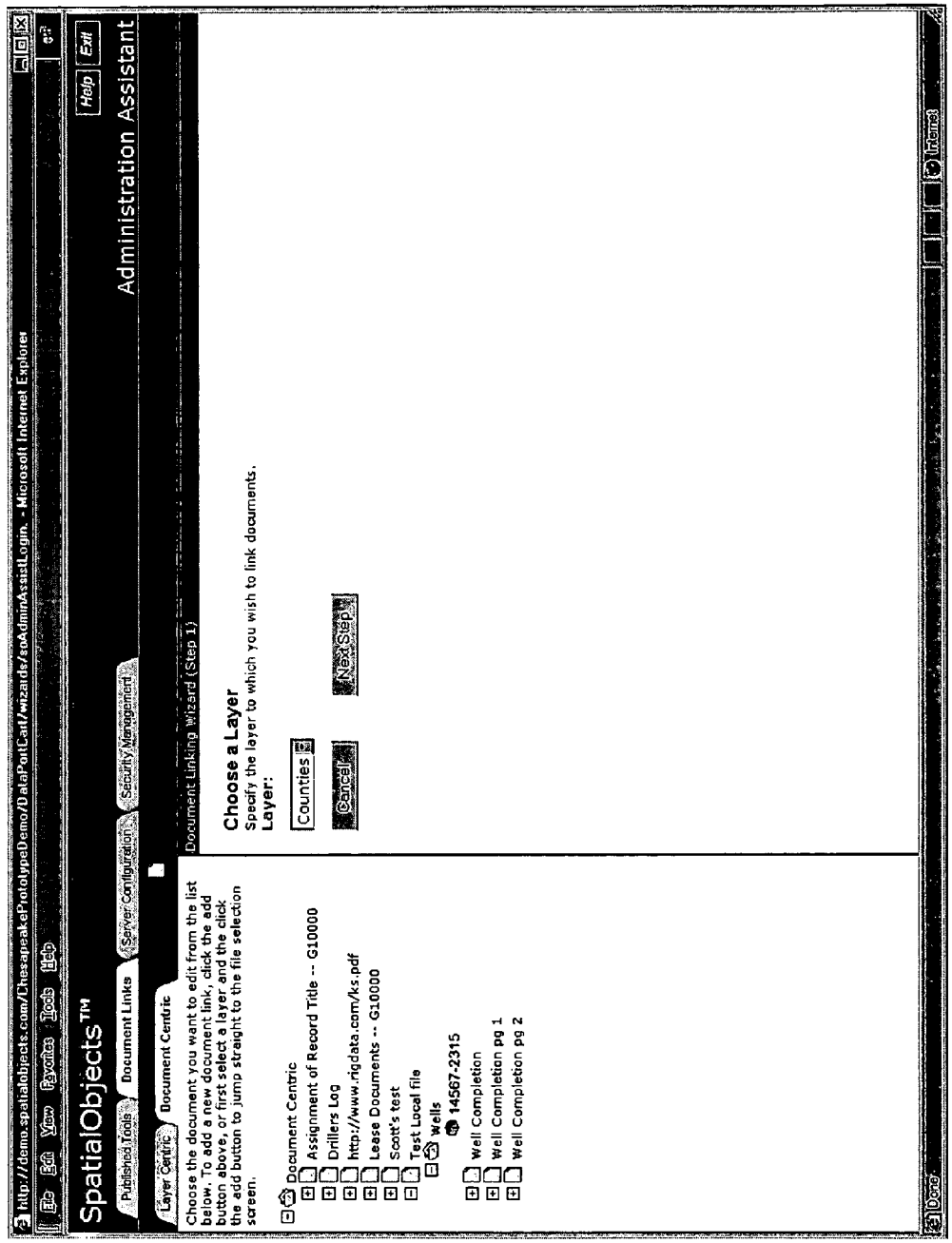

FIG. 55 depicts a screen with a Document Centric document navigation tree. The "Document Centric" tab is selected to view document links from a document centric vantage point. In the document centric view, documents have associated layers and features as is illustrated in this expanded document node, showing the layer (Wells) and the feature ("14567-2315") to which this document is linked.

Those skilled in the art will appreciate that variations from the specific embodiments disclosed above are contemplated by the invention. The invention should not be restricted to the above embodiments, but should be measured by the following claims.

What is claimed is:

1. A method for spatially associating disparate data comprising:
    selecting a spatial layer from at least one data system, the spatial layer having a plurality of spatial layer data attributes;
    selecting a non-spatial layer disparate dataset from the at least one data system, the non-spatial layer disparate dataset having a plurality of dataset data attributes;
    selecting a common data attribute that is common to at least one spatial layer data attribute and at least one dataset data attribute of the non-spatial layer disparate dataset;
    storing a configuration definition in a memory, the configuration definition defining a linking relationship between the selected spatial layer common data attribute and the selected dataset common data attribute;
    processing the configuration definition to spatially link the non-spatial layer disparate dataset and the spatial layer at a spatial processing system executing on at least one processor to create a spatially linked dataset;
    spatially accessing the spatially linked dataset using the spatial processing system and, in response thereto, selecting at least a portion of the spatial layer data attributes from the spatial layer and at least another portion of the dataset data attributes from the non-spatial layer disparate dataset; and
    using the spatial processing system, generating the selected portion of the spatial layer data attributes and the selected other portion of the dataset data attributes for display.

2. A method for spatially associating disparate data comprising:
    selecting at least one spatial layer from at least one data system, the at least one spatial layer having spatial data comprising at least one spatial data attribute;
    selecting a plurality of non-spatial layer disparate datasets from the at least one data system, each dataset having feature data comprising at least one feature data attribute;
    configuring at least one configuration element to spatially link the disparate datasets and the at least one spatial layer at a spatial processing system executing on at least one processor to create spatially linked datasets; and
    spatially accessing the spatially linked disparate datasets with a query from the spatial processing system and selecting at least a portion of the spatial data from the at least one spatial layer and at least another portion of the feature data from at least one disparate dataset in response thereto.

3. The method of claim 2 wherein configuring the at least one configuration element to spatially link the disparate datasets and the at least one spatial layer to create the spatially linked datasets comprises:
    identifying at least one attribute common to the spatial layer and the plurality of disparate datasets; and
    defining a linking relationship for the at least one common attribute between the spatial layer and the plurality of disparate datasets.

4. The method of claim 2 wherein configuring the at least one configuration element to spatially link the disparate datasets and the at least one spatial layer to create the spatially linked datasets comprises at least one method selected from a group consisting of:
    identifying at least one common data attribute in the spatial layer and the plurality of disparate datasets, identifying locations for the common data attribute in the spatial layer and the plurality of disparate datasets, and linking the common data attribute at the locations between the spatial layer and the plurality of disparate datasets; and
    identifying at least a first common data attribute and a second common data attribute, wherein the first common data attribute is common to the spatial layer and a first disparate dataset and the second common data attribute is common to the spatial layer and a second disparate dataset, and further comprising:
    identifying first locations for the first common data attribute in the spatial layer and the first disparate dataset and linking the first common data attribute at the first locations between the spatial layer and the first disparate dataset; and
    identifying second locations for the second data attribute in the spatial layer and the second disparate dataset and linking the second common data attribute at the second locations between the spatial layer and the second disparate dataset.

5. The method of claim 2 wherein accessing the spatially linked disparate datasets with the query comprises:
    querying the spatial layer to identify if at least the portion of the spatial data matches the query; and
    querying the plurality of spatially linked disparate datasets to identify if at least the other portion of the feature data matches the query.

6. The method of claim 2 wherein spatially accessing the spatially linked disparate datasets with the query comprises performing at least one member of a group consisting of a search and a filter.

7. The method of claim 2 further comprising generating the selected spatial data for a map image for display.

8. The method of claim 2 further comprising generating the selected feature data for display.

9. The method of claim 8 further comprising generating the selected feature data for at least one member of a group consisting of a list of feature data attributes and a feature display frame.

10. The method of claim 2 further comprising generating at least one linked feature reference for display.

11. The method of claim 2 wherein spatially accessing the spatially linked disparate datasets with the query further comprises:
    querying a first spatially linked disparate dataset;
    identifying at least one first feature data matching the query in at least a second spatially linked disparate dataset; and
    generating at least one linked feature reference for the at least one first feature data for display.

12. The method of claim 2 further comprising:
    linking at least one document to the at least one spatial data attribute in the spatial layer; and
    generating at least one linked document reference for the at least one linked document for display.

13. The method of claim 12 further comprising generating the at least one linked document for display upon selection of the at least one linked document reference.

14. The method of claim 2 further comprising:
    generating the selected spatial data to a map image with spatial features;
    linking at least one document to the at least one spatial data attribute in the spatial layer; and
    generating at least one linked document reference for the at least one linked document for display if at least one spatial feature is selected on the map image.

15. The method of claim 2 further comprising:
    linking at least one document to at least one first feature data attribute in at least one disparate dataset; and generating at least one linked document reference for the at least one linked document for display.

16. The method of claim 2 wherein:
selecting the plurality of disparate datasets each with feature data comprises at least one member of a group consisting of selecting population data for an entity and selecting well data for another entity; and
selecting the at least one spatial layer with spatial data comprises selecting at least one member of a group consisting of spatial attributes for a geographic element and other spatial attributes for another geographic element.

17. A method for spatially associating disparate data comprising:
selecting at least one spatial layer with spatial data comprising at least one spatial attribute from at least one data system;
selecting at least one non-spatial layer disparate dataset with feature data comprising at least one feature data attribute from the at least one data system;
selecting at least one common data attribute common to the at least one disparate dataset and the at least one spatial layer;
storing a configuration definition in a memory, the configuration definition defining a linking relationship between the at least one disparate dataset and the at least one spatial layer through the at least one common data attribute to create at least one spatially linked dataset;
spatially linking the at least one disparate dataset and the at least one spatial layer through the at least one common data attribute by processing the configuration definition at a spatial processing system executing on at least one processor to create the at least one spatially linked dataset;
accepting a query at the spatial processing system;
initiating a search of the spatially linked dataset for the query at the spatial processing system; and
returning at least one result from the spatial processing system if at least one match is determined for the query, the at least one result comprising at least one member of a group consisting of at least a portion of the spatial data and at least another portion of the feature data.

18. The method of claim 17 further comprising:
selecting at least one other disparate dataset with other feature data from the at least one data system, the other feature data comprising at least one other feature data attribute, the configuration definition further defining another linking relationship between the at least other one disparate dataset and the at least one spatial layer through at least one other common data attribute; and
spatially linking the at least one other disparate dataset and the at least one spatial layer at the spatial processing system through at least one other common data attribute by processing the configuration definition.

19. The method of claim 17 further comprising:
selecting at least one other spatial layer with other spatial data comprising at least one other spatial attribute, the configuration definition further defining another linking relationship between the at least one disparate dataset and the at least one other spatial layer through at least one other common data attribute; and
spatially linking the at least one disparate dataset and the at least one other spatial layer at the spatial processing system through at least one other common data attribute by processing the configuration definition.

20. The method of claim 17 further comprising:
selecting at least one other disparate dataset with other feature data from the data system, the other feature data comprising at least one other feature data attribute, the configuration definition further defining another linking relationship between the at least one other disparate dataset and the at least one spatial layer through the at least one common data attribute; and
spatially linking the at least one other disparate dataset and the at least one spatial layer at the spatial processing system through the at least one common data attribute by processing the configuration definition.

21. The method of claim 17 further comprising:
associating at least one document to data for at least one other member of another group consisting of the spatial data and the feature data.

22. The method of claim 21 further comprising generating a link for the associated at least one document and generating the at least one document for display upon selection of the link.

23. The method of claim 17 wherein storing the configuration definition in the memory comprises storing a configuration file in the memory.

24. The method of claim 17 further comprising rendering the at least one result for display at a user interface.

25. The method of claim 24 further comprising querying using at least one other member of another group consisting of a search tool for entering a search parameter for the query and a filter tool for entering a filter parameter for the query.

26. The system of claim 24 further comprising accepting entry of the query using a tool input.

27. A system for spatially associating disparate data comprising:
a spatial processing system executable on at least one processor to:
select a spatial layer having a plurality of spatial layer data attributes from at least one data system;
select a non-spatial layer disparate dataset having a plurality of feature data attributes from the at least one data system;
select at least one common data attribute that is common to the spatial layer and the non-spatial layer disparate dataset;
store a configuration definition in a memory, the configuration definition defining a linking relationship for the selected common data attribute between the selected non-spatial layer disparate dataset and the selected spatial layer;
process the configuration definition to spatially link the non-spatial layer disparate dataset and the spatial layer to create a spatially linked dataset;
spatially access the spatially linked dataset and, in response thereto, select at least a portion of the spatial layer data attributes from the spatial layer and at least another portion of the feature data attributes from the non-spatial layer disparate dataset; and
generate the selected portion of the spatial layer data attributes and the selected other portion of the feature data attributes for display.

28. A system for spatially associating disparate data, the system comprising:
at least one data system comprising:
at least one spatial layer with spatial data comprising at least one spatial data attribute; and
a plurality of non-spatial layer disparate datasets each with feature data comprising at least one feature data attribute;

at least one configuration element configured to spatially link the disparate datasets and the at least one spatial layer to create spatially linked datasets; and a spatial processing system executable on at least one processor to spatially access the spatially linked disparate datasets with at least one query and to select at least a portion of the spatial data from the at least one spatial layer and at least another portion of the feature data from at least one disparate dataset in response thereto.

29. The system of claim 28 wherein the at least one configuration element is configured to spatially link the disparate datasets and the at least one spatial layer to create the spatially linked datasets by identifying at least one attribute common to the spatial layer and the plurality of disparate datasets and defining at least one linkage a linking relationship for the at least one common attribute between the spatial layer and the plurality of disparate datasets.

30. The system of claim 28 wherein the configuration element is configured to spatially link the disparate datasets and the at least one spatial layer to create the spatially linked datasets by at least one member selected from a group consisting of:
identifying at least one common data attribute in the spatial layer and the plurality of datasets, identifying locations for the common data attribute in the spatial layer and the plurality of disparate datasets, and linking the common data attribute at the locations between the spatial layer and the plurality of disparate datasets; and
identifying at least a first common data attribute and a second common data attribute, wherein the first common data attribute is common to the spatial layer and a first disparate dataset and the second common data attribute is common to the spatial layer and a second disparate dataset, and further comprising:
identifying first locations for the first common data attribute in the spatial layer and the first disparate dataset and linking the first common data attribute at the first locations between the spatial layer and the first disparate dataset; and
identifying second locations for the second data attribute in the spatial layer and the second disparate dataset and linking the second common data attribute at the second locations between the spatial layer and the second disparate dataset.

31. The system of claim 28 wherein the at least one query comprises a first query to the spatial layer to identify if at least the portion of the spatial data matches the first query and at least a second query to the plurality of spatially linked disparate datasets to identify if at least the other portion of the feature data matches the second query.

32. The system of claim 28 wherein the at least one query comprises at least one member of a group consisting of a search and a filter.

33. The system of claim 28 wherein the spatial processing system further is configured to generate the selected spatial data for a map image for display.

34. The system of claim 28 wherein the spatial processing system further is configured to generate the selected feature data for display.

35. The system of claim 34 wherein the spatial processing system further is configured to generate the selected feature data for at least one member of a group consisting of a list of feature data attributes and a feature display frame.

36. The system of claim 28 wherein the spatial processing system further is configured to generate at least one linked feature reference for display.

37. The system of claim 28 wherein the spatial processing system further is configured to query a first spatially linked disparate dataset, to identify at least one first feature data matching the query in at least a second spatially linked disparate dataset, and to generate at least one linked feature reference for the at least one first feature data for display.

38. The system of claim 28 wherein the spatial processing system further is configured to link at least one document to the at least one spatial data attribute in the spatial layer and to generate at least one linked document reference for the at least one linked document for display.

39. The system of claim 38 wherein the spatial processing system further is configured to generate the at least one linked document for display upon selection of the at least one linked document reference.

40. The system of claim 28 wherein the spatial processing system further is configured to generate the selected spatial data to a map image with spatial features, to link at least one document to the at least one spatial data attribute in the spatial layer, and to generate at least one linked document reference for the at least one linked document for display if at least one spatial feature is selected on the map image.

41. The system of claim 28 wherein the spatial processing system further is configured to link at least one document to at least one first feature data attribute in at least one disparate dataset and to generate at least one linked document reference for the at least one linked document for display.

42. The system of claim 28 wherein:
the feature data comprises at least one member of a group consisting of population data for an entity and well data for another entity; and
the spatial data comprises at least one member of a group consisting of spatial attributes for a geographic element and other spatial attributes for another geographic element.

43. A system for spatially associating disparate data, the system comprising:
at least one data system comprising:
at least one spatial layer with spatial data comprising at least one spatial attribute; and
at least one non-spatial layer disparate dataset with feature data comprising at least one feature data attribute;
wherein at least one common data attribute is common to the at least one disparate dataset and the at least one spatial layer;
a memory comprising at least one configuration definition defining a linking relationship for the at least one common data attribute between the at least one disparate dataset and the at least one spatial layer through the at least one common data attribute to create at least one spatially linked dataset; and
a spatial processing system executable on at least one processor to spatially link the at least one disparate dataset and the at least one spatial layer through the at least one common data attribute based on the linking relationship defined by the at least one the configuration definition to create the at least one spatially linked dataset, to accept a query, to initiate a search of the spatially linked dataset for the query, and to return at least one result when at least one match is determined for the query, the at least one result comprising at least one member of a group consisting of at least a portion of the spatial data and at least another portion of the feature data.

44. The system of claim 43 wherein the at least one configuration definition defines another linking relationship between at least one other disparate dataset and the at least one spatial layer through at least one other common data attribute.

45. The system of claim 43 wherein the at least one configuration definition defines another linking relationship between the at least one disparate dataset and at least one other spatial layer through at least one other common data attribute.

46. The system of claim 43 wherein the at least one configuration definition defines another linking relationship between at least one other disparate dataset and the at least one spatial layer through the at least one common data attribute.

47. The system of claim 43 wherein the spatial processing system is configured to associate at least one document to data for at least one other member of another group consisting of the spatial data and the feature data.

48. The system of claim 47 wherein the spatial processing system is configured to generate a link for the associated at least one document and to generate the at least one document for display upon selection of the link.

49. The system of claim 43 wherein the at least one configuration definition comprises a configuration file.

50. The system of claim 43 further comprising a user interface configured to render the at least one result for display.

51. The system of claim 50 wherein the user interface comprises at least one other member of another group consisting of a search tool configured to enter a search parameter for the query and a filter tool configured to enter a filter parameter for the query.

52. The system of claim 50 wherein the user interface further comprises a tool input configured to accept entry of the query.

* * * * *